United States Patent
Jeong et al.

(10) Patent No.: US 7,924,127 B2
(45) Date of Patent: Apr. 12, 2011

(54) ELECTRO-MAGNETIC FORCE DRIVING ACTUATOR AND CIRCUIT BREAKER USING THE SAME

(75) Inventors: Hyun-Kyo Jeong, Seongnam-si (KR); Jong-Ho Kang, Seoul (KR)

(73) Assignee: Ematech Inc., Seoul (KR)

( * ) Notice: Subject to any disclaimer, the term of this patent is extended or adjusted under 35 U.S.C. 154(b) by 253 days.

(21) Appl. No.: 12/109,901

(22) Filed: Apr. 25, 2008

(65) Prior Publication Data

US 2008/0272659 A1  Nov. 6, 2008

Related U.S. Application Data

(63) Continuation of application No. PCT/KR2006/004384, filed on Oct. 25, 2006.

(30) Foreign Application Priority Data

Oct. 25, 2005 (KR) .......... 10-2005-0100755
Dec. 10, 2005 (KR) .......... 10-2005-0121207

(51) Int. Cl.
  *H01F 7/08* (2006.01)
(52) U.S. Cl. .......... 335/222; 310/13; 335/180
(58) Field of Classification Search .......... 335/220–229, 335/180; 310/312–314
See application file for complete search history.

(56) References Cited

U.S. PATENT DOCUMENTS

| | | | | |
|---|---|---|---|---|
| 4,808,955 A * | 2/1989 | Godkin et al. | ............... | 335/222 |
| 4,910,486 A * | 3/1990 | Yumura et al. | ............... | 335/222 |
| 5,345,206 A * | 9/1994 | Morcos | ........................ | 335/222 |
| 6,417,583 B1 * | 7/2002 | Okada | ........................ | 310/12.25 |
| 6,847,132 B2 * | 1/2005 | Ukaji | ........................ | 310/12.24 |
| 7,040,481 B1 * | 5/2006 | Sommerhalter et al. | ....... | 198/619 |
| 7,455,466 B2 * | 11/2008 | Chang et al. | .................. | 396/508 |
| 7,573,163 B2 * | 8/2009 | Tu et al. | ..................... | 310/12.21 |
| 2002/0117904 A1 * | 8/2002 | Godkin | ........................ | 310/12 |
| 2010/0060393 A1 * | 3/2010 | Joo et al. | ....................... | 335/180 |

* cited by examiner

*Primary Examiner* — Elvin G Enad
*Assistant Examiner* — Bernard Rojas
(74) *Attorney, Agent, or Firm* — NSIP Law

(57) ABSTRACT

An electromagnetic force driving actuator and a circuit breaker using the same is disclosed. The actuator comprises a casing that forms two paths having a certain length in longitudinal direction, and forms a middle wall by the two paths; a main magnetic field generation element that is allocated on the both face wall of the two paths of the casing; and a moving element that, as the middle wall is located in the center, a coil, which is bound in the orthogonal direction to longitudinal direction of the paths, is in a body that its left and right sides passes through the paths and its front and back side are exposed to outside, when forward direction or reverse direction current is provided in the coil, moves forward and backward along the longitudinal direction of the paths.

29 Claims, 44 Drawing Sheets

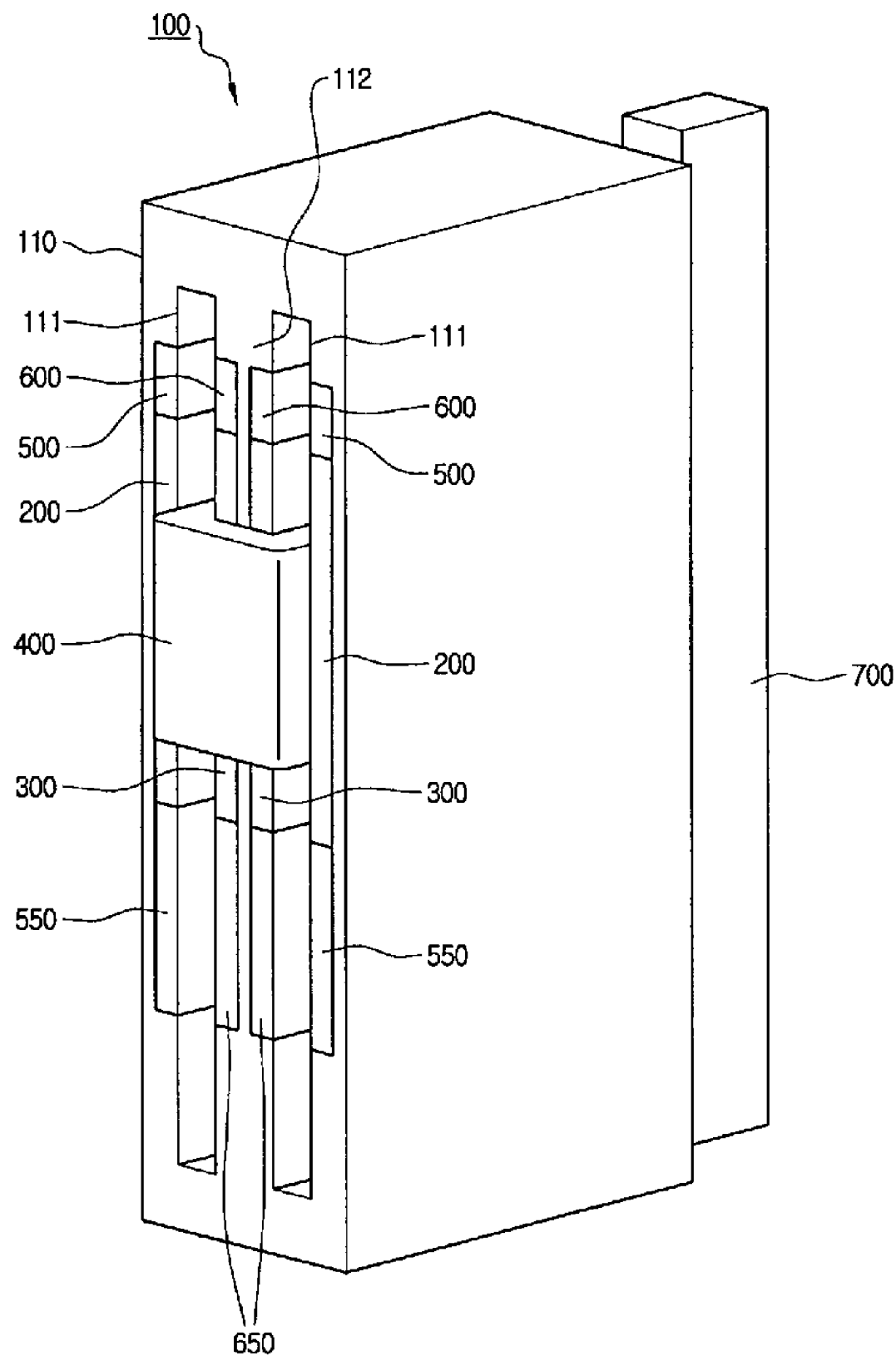
【Figure 4】

【Figure 5】
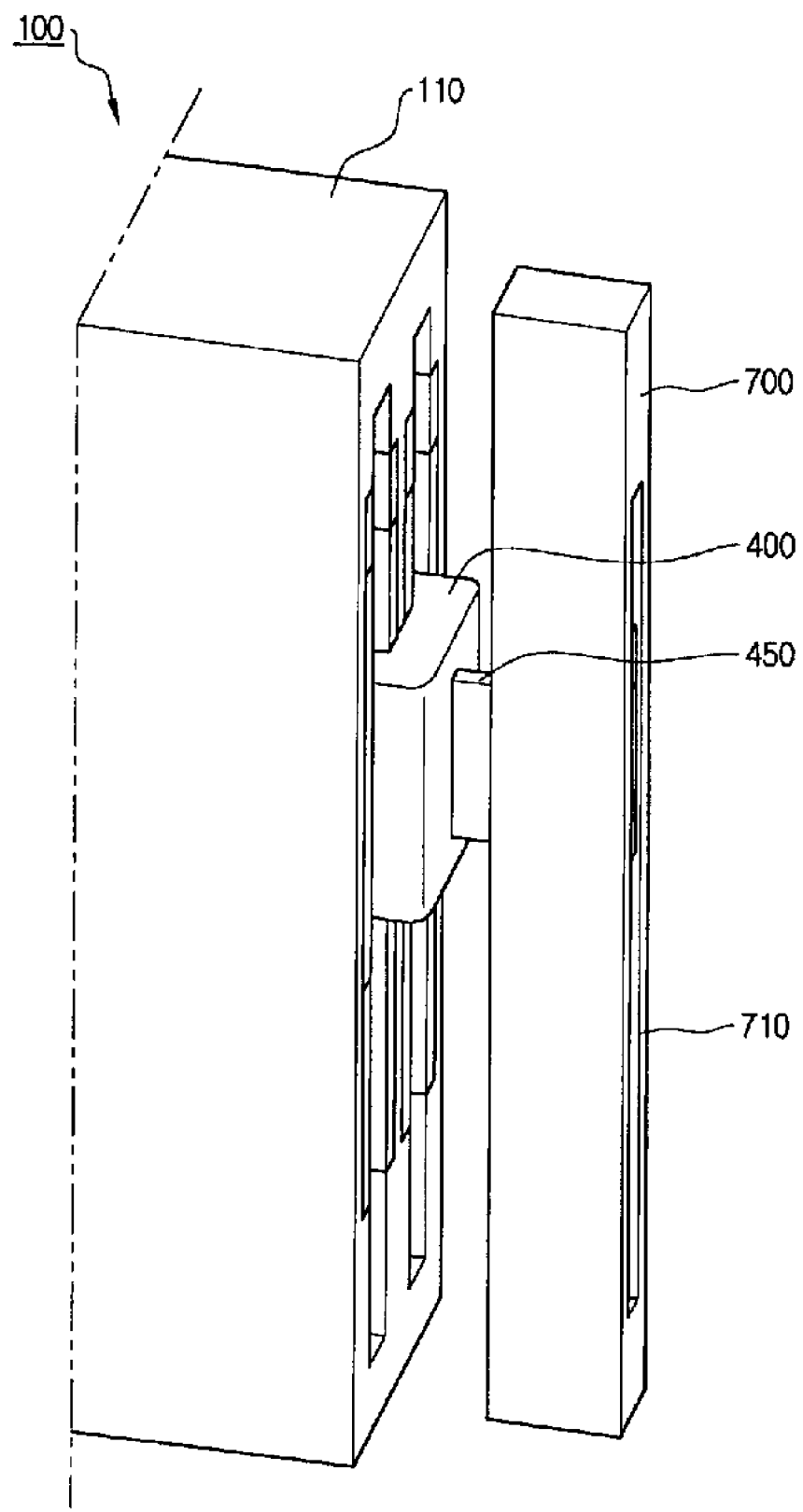

【Figure 6】
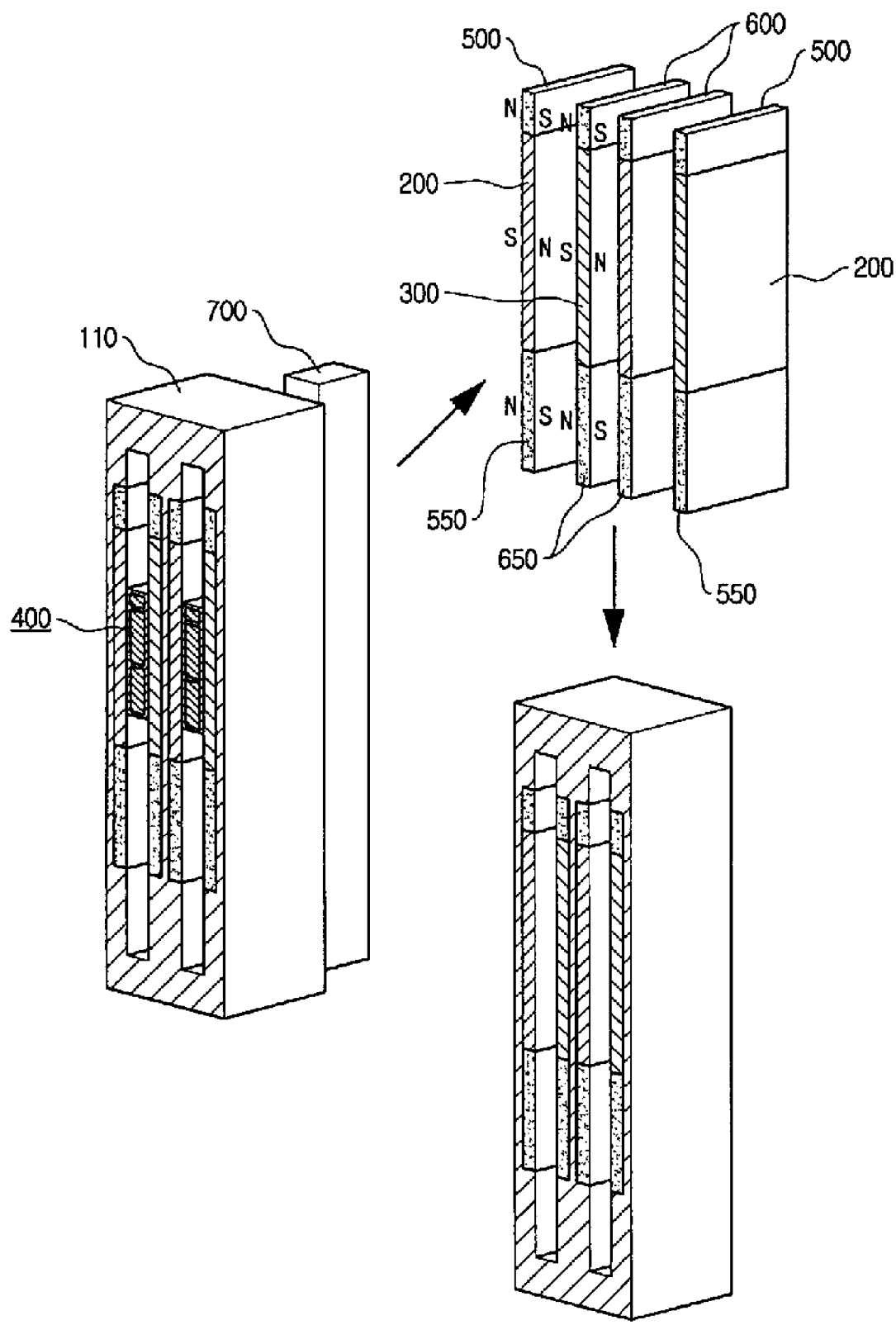

【Figure 7】
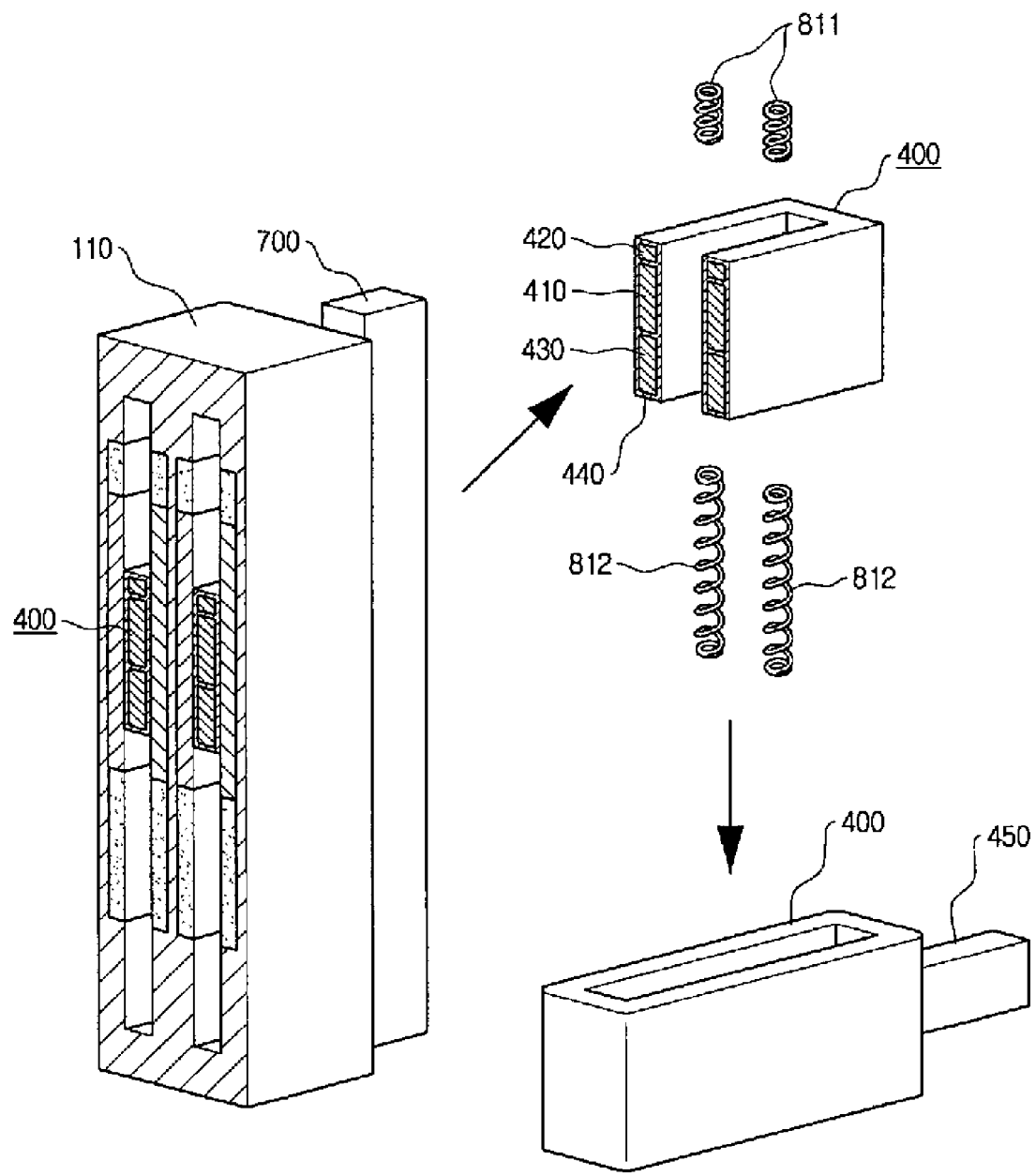

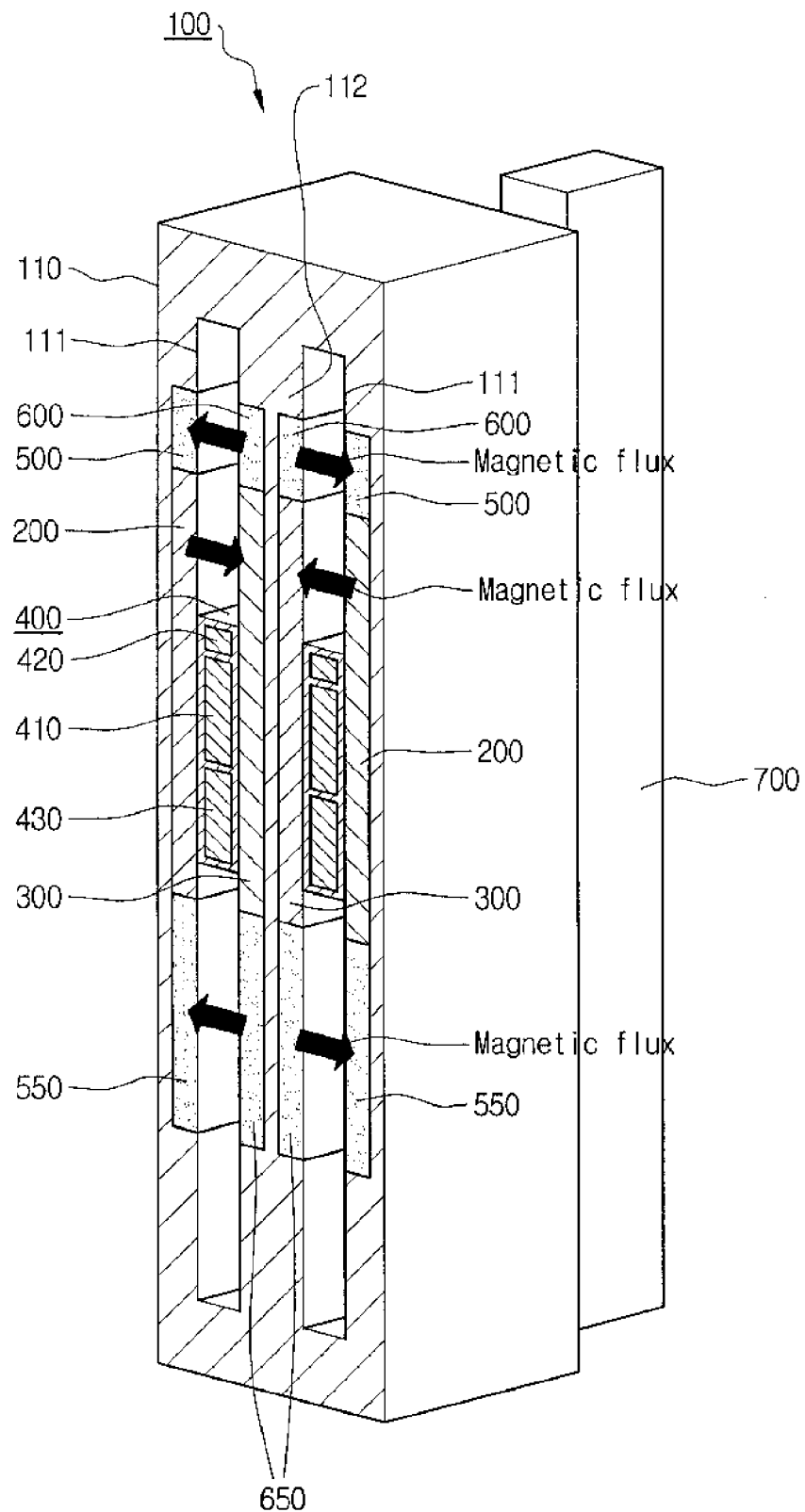
[Figure 8]

[Figure 9]
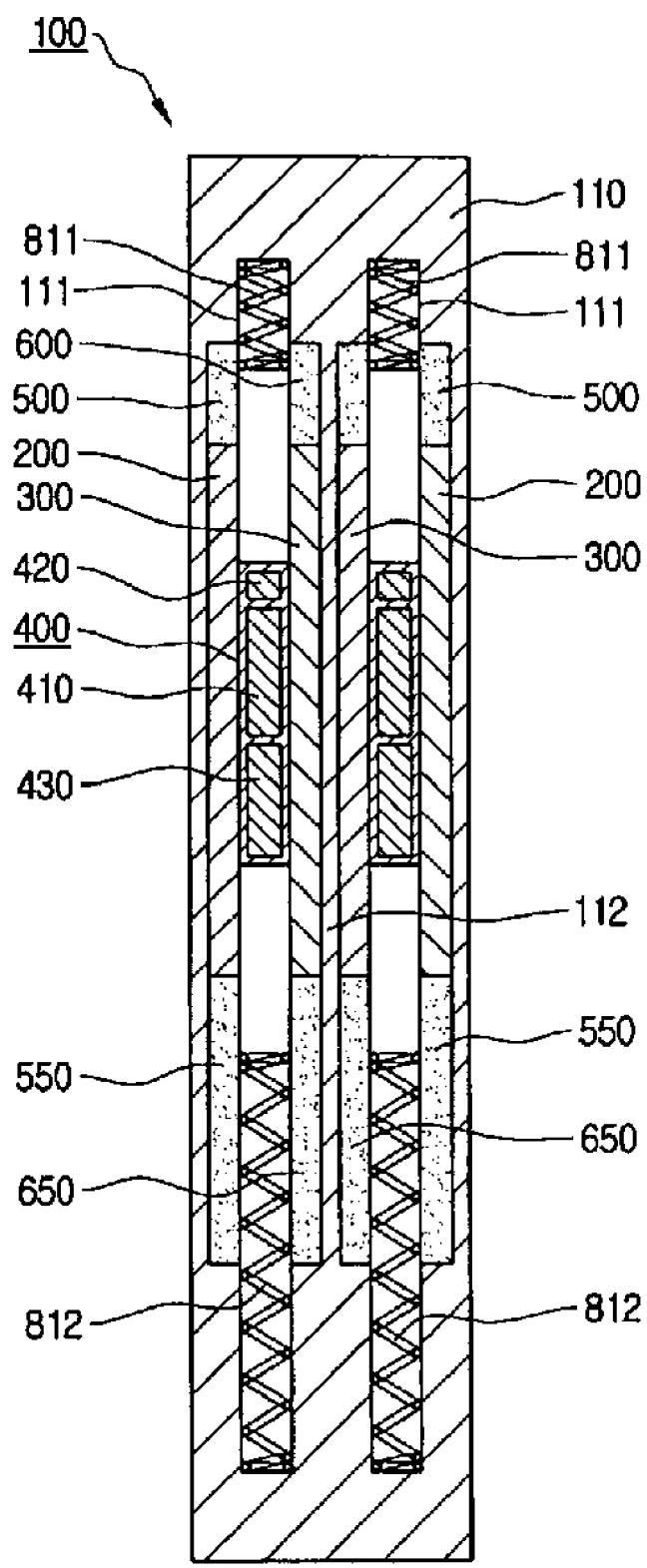

[Figure 10]
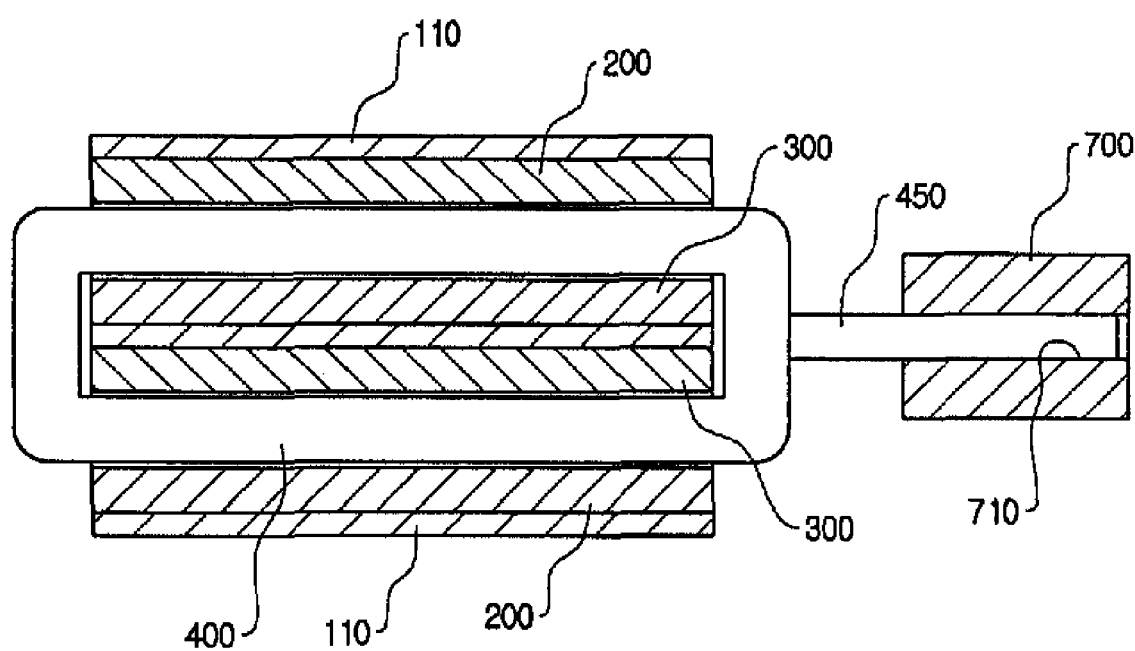

【Figure 11】
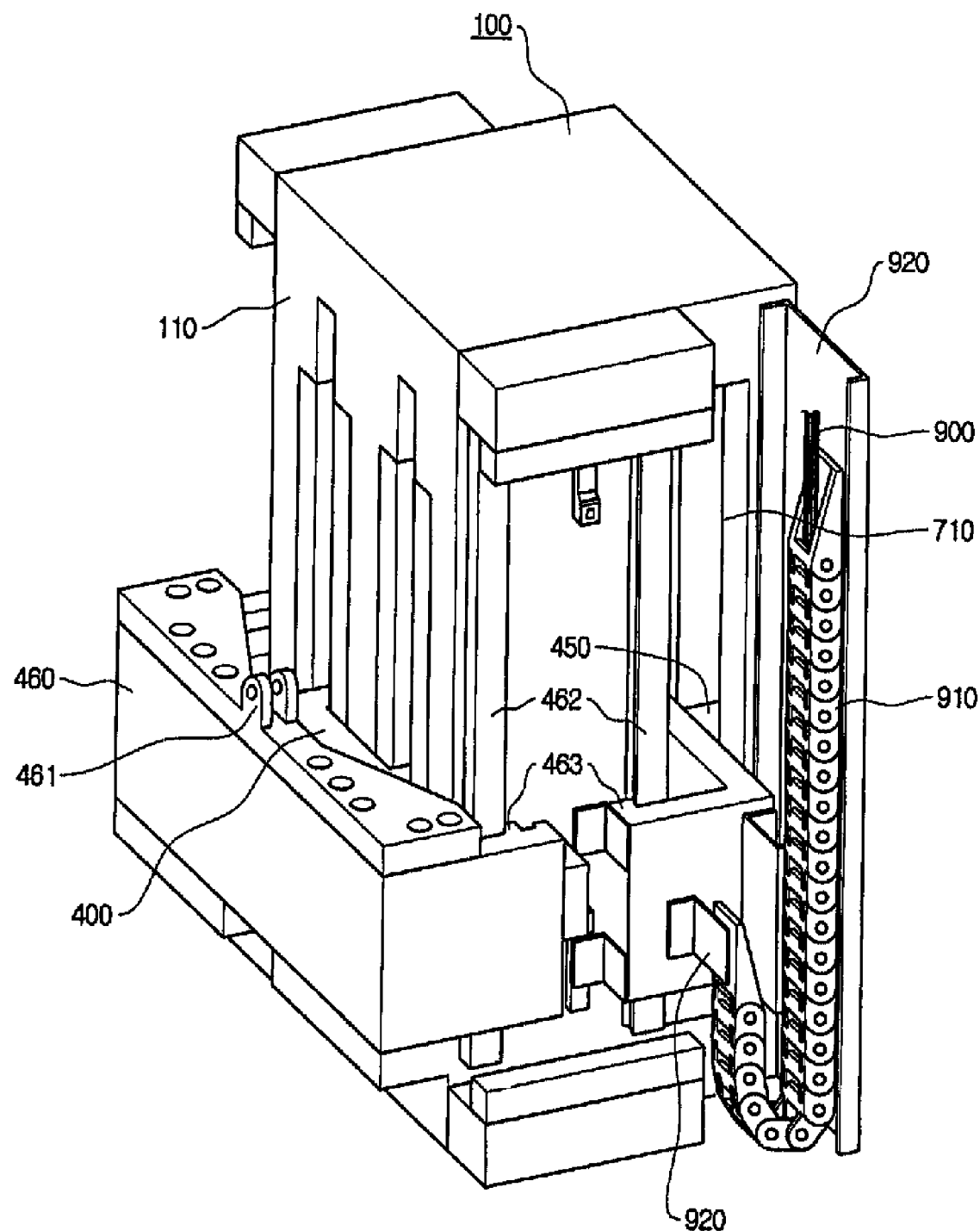

【Figure 12】
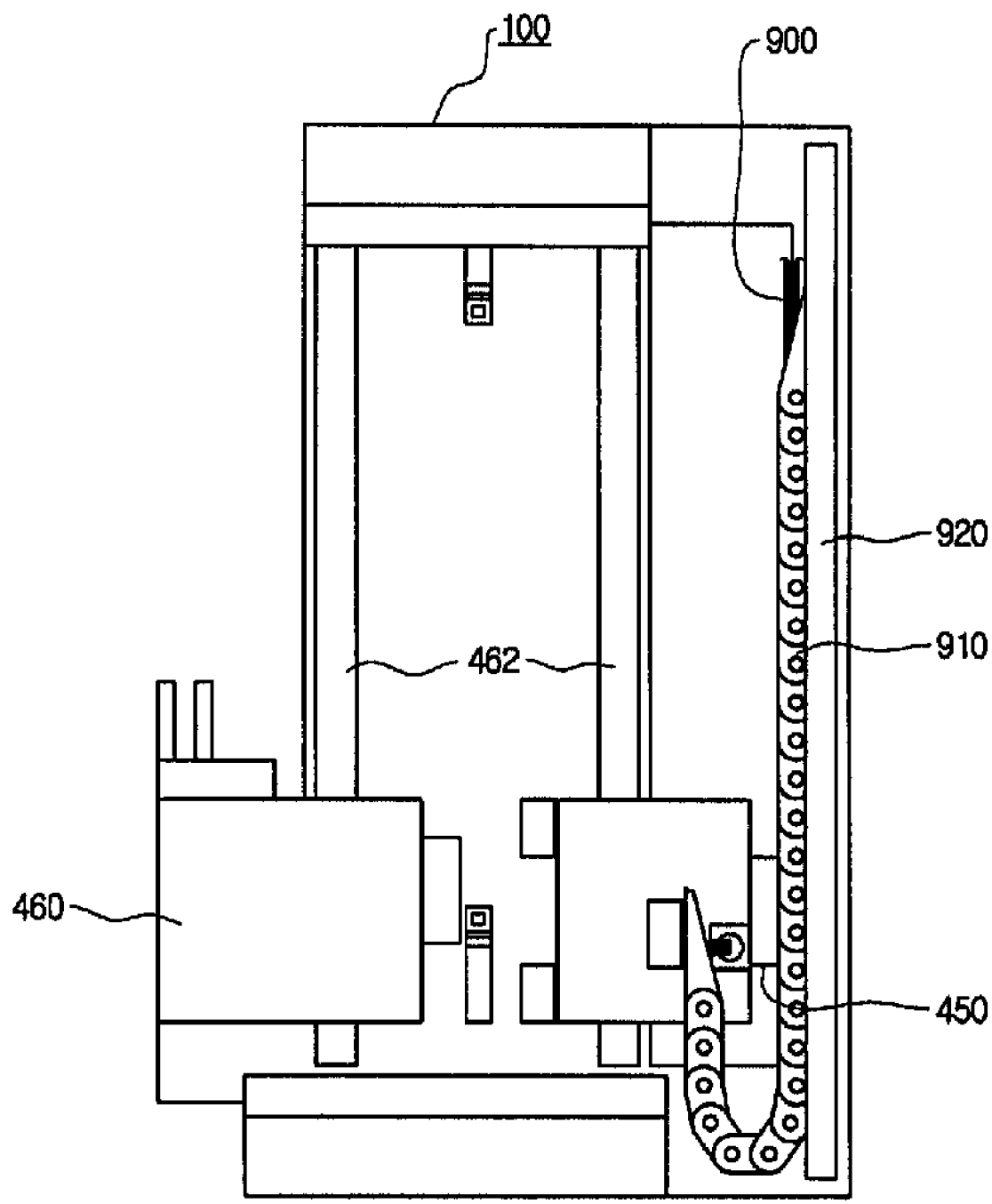

[Figure 13]
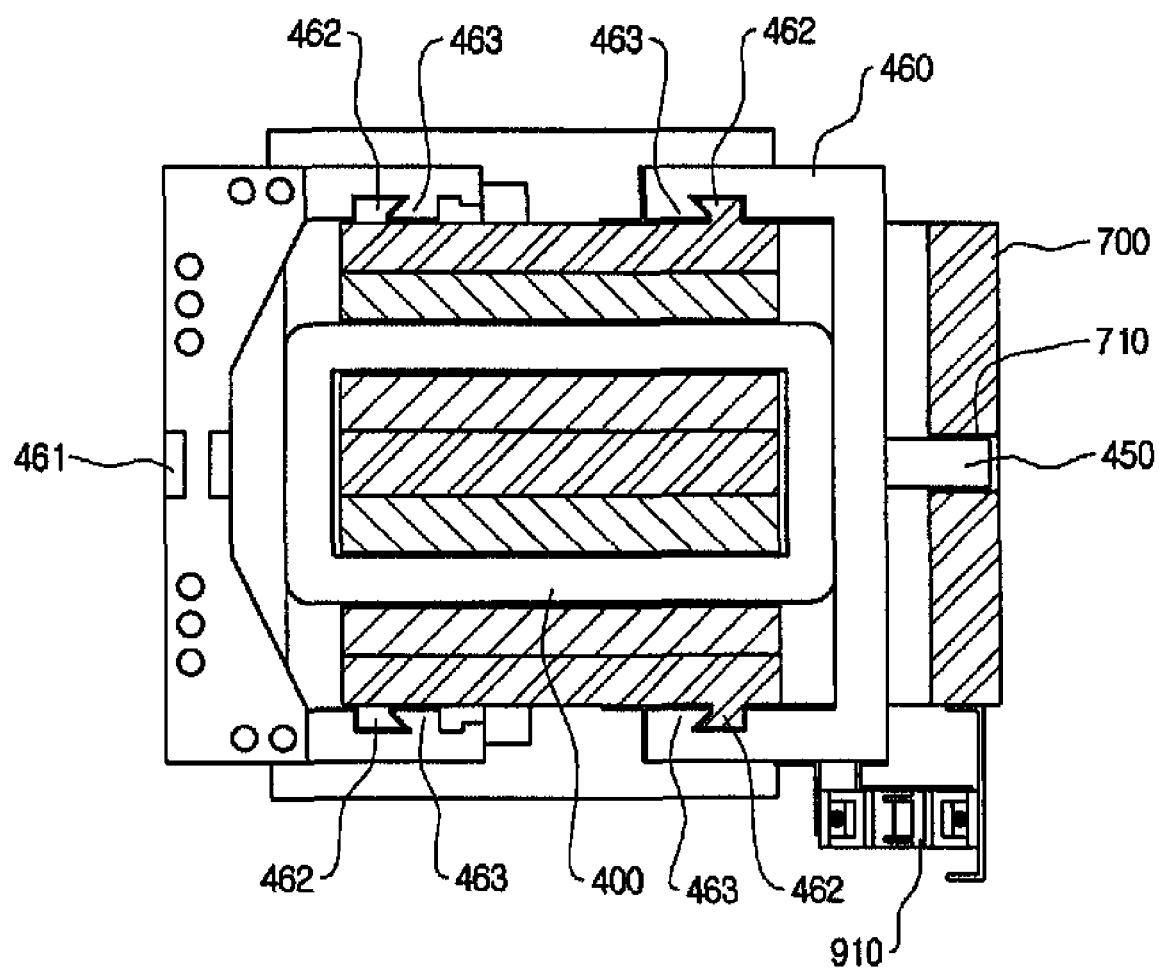

【Figure 14】
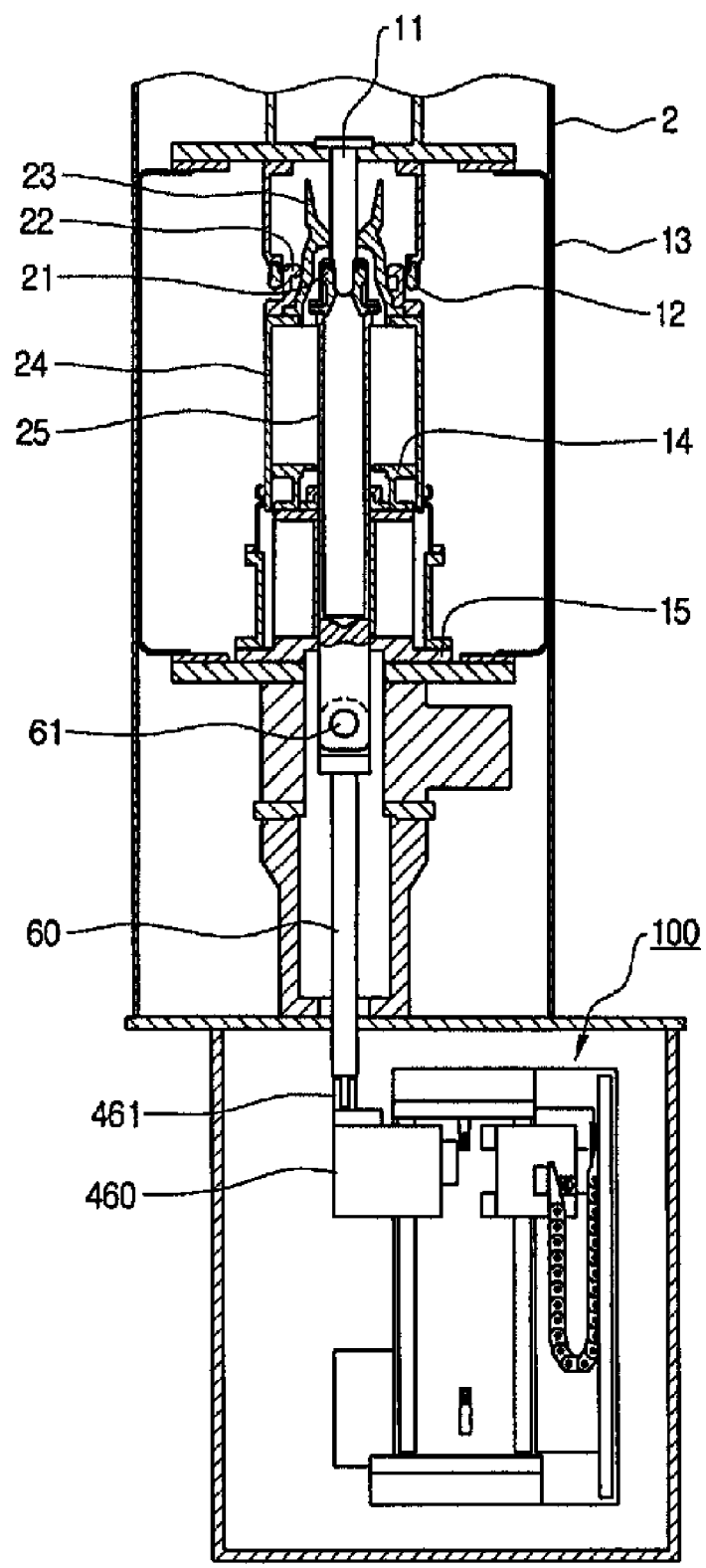

[Figure 15]
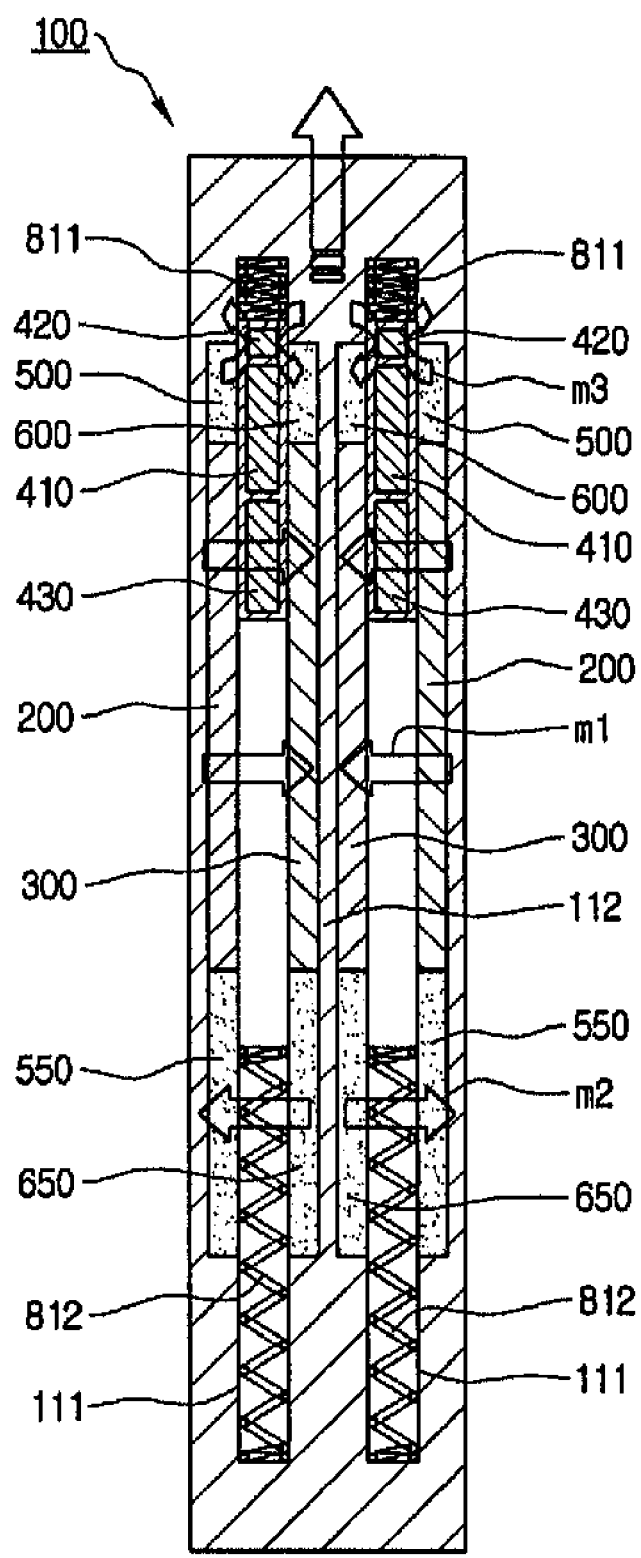

[Figure 16]
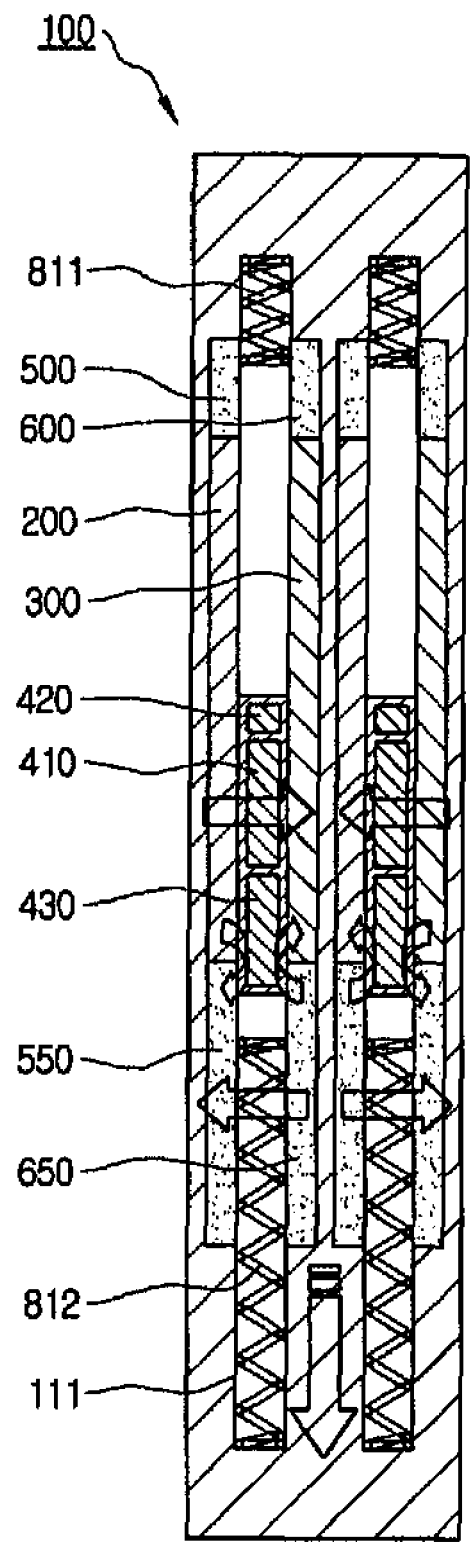

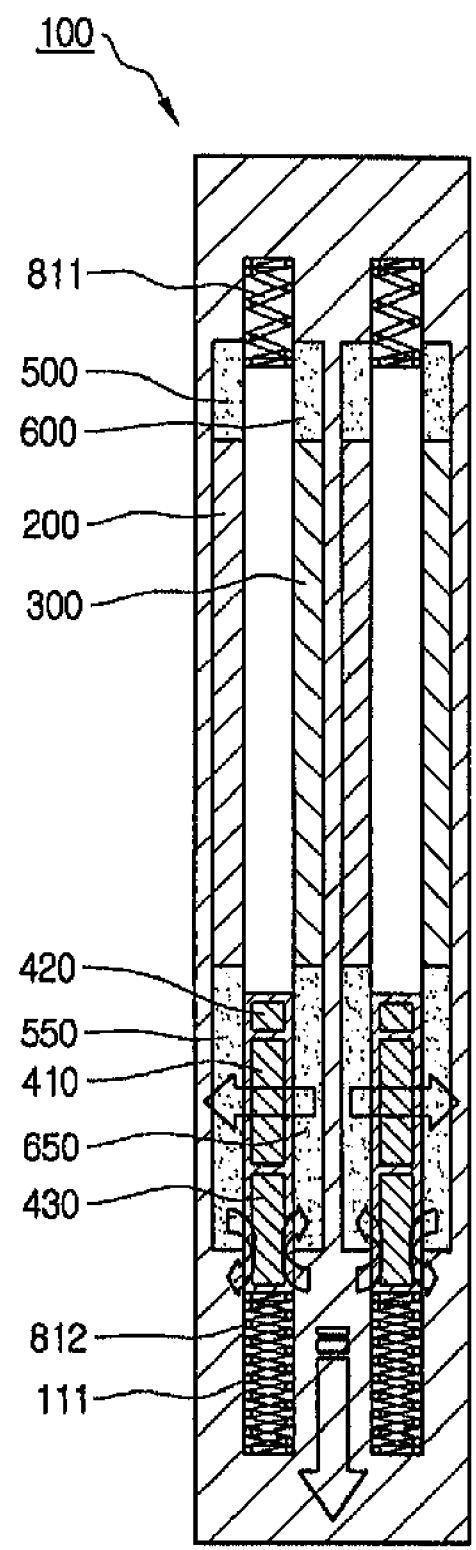
[Figure 17]

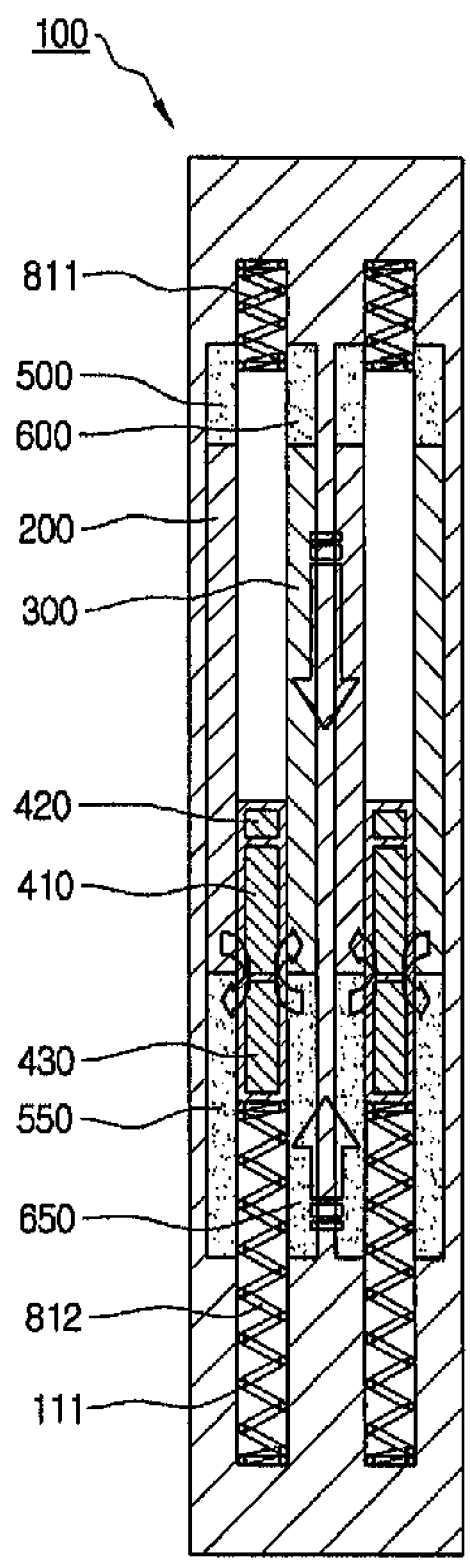
[Figure 18]

【Figure 19】
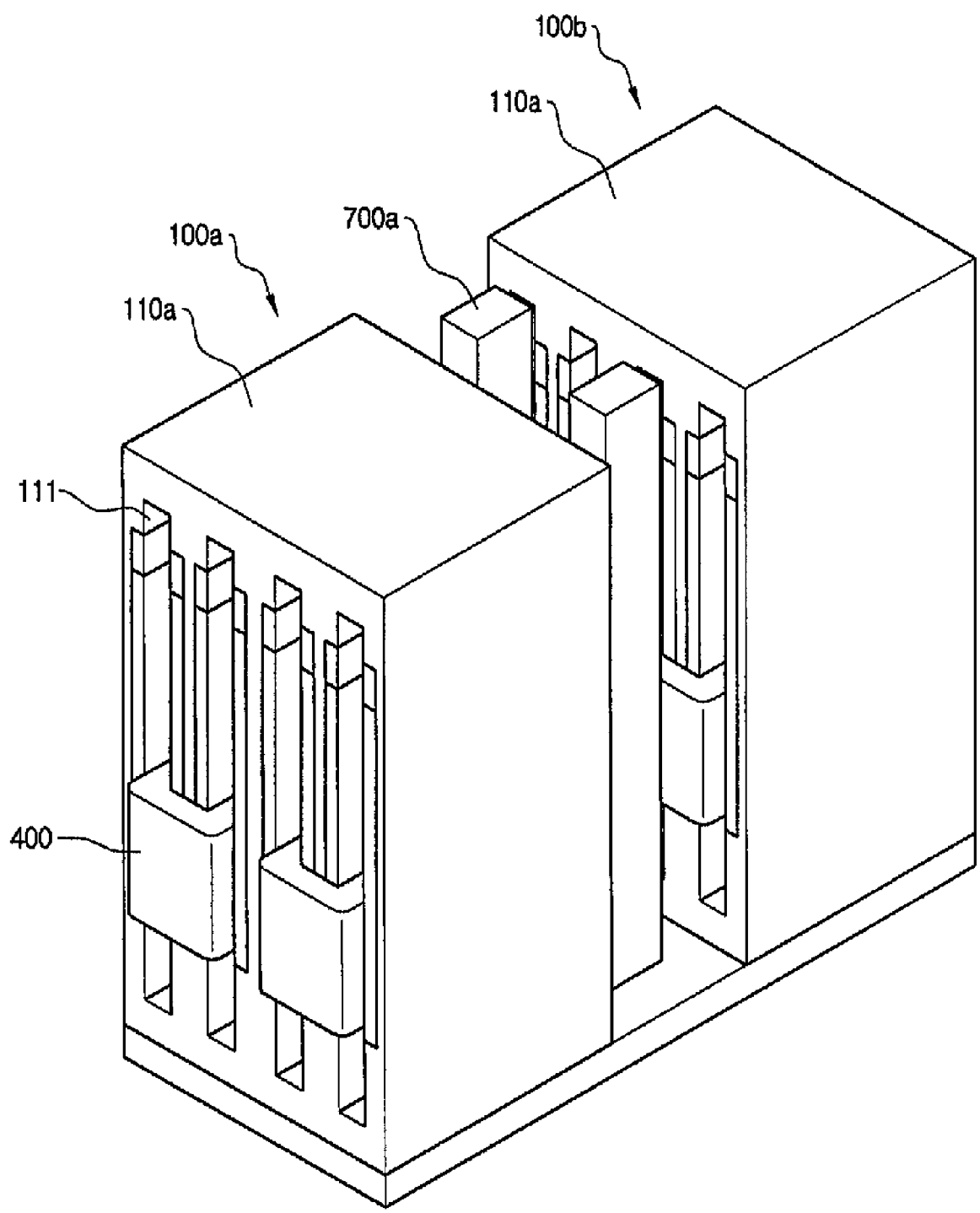

[Figure 20]
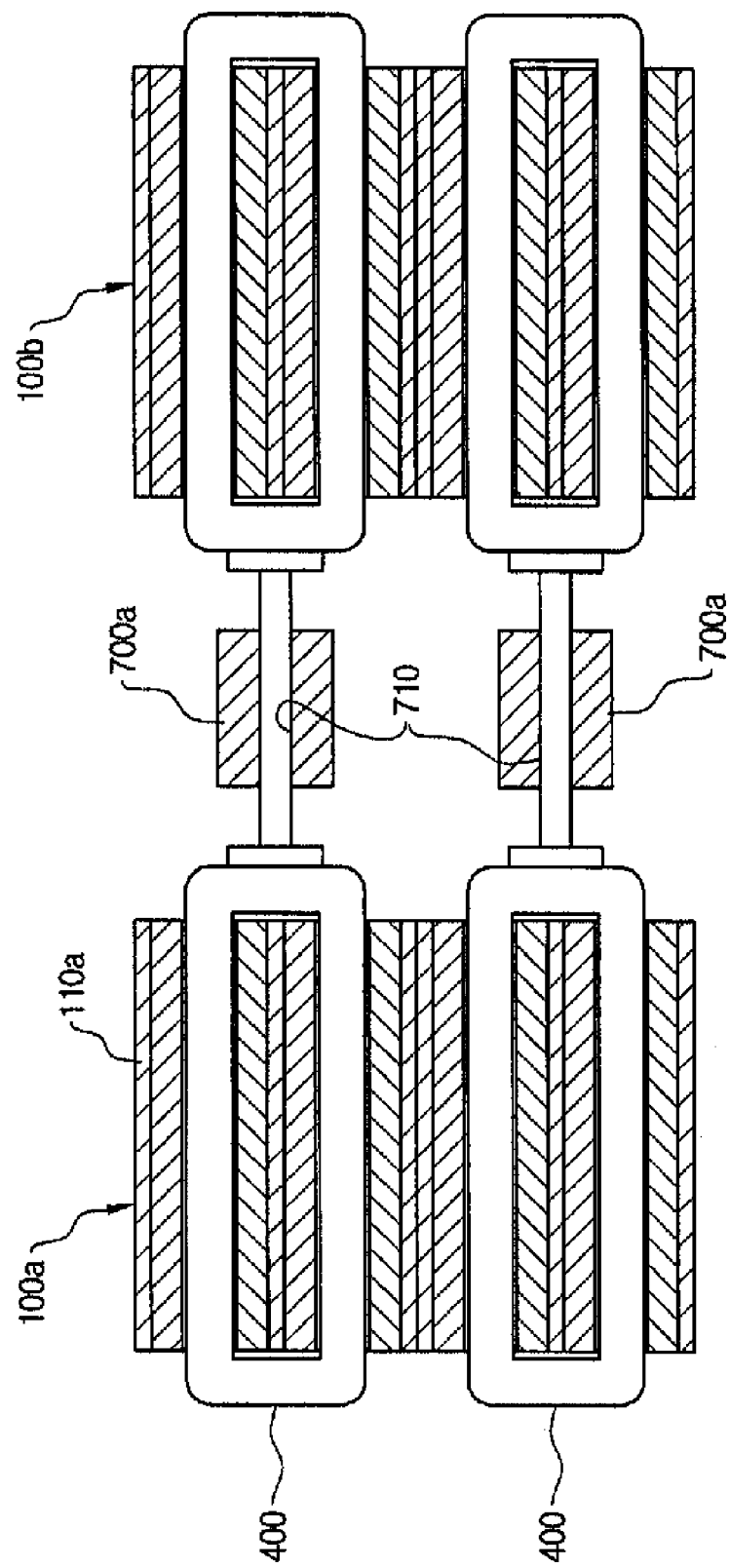

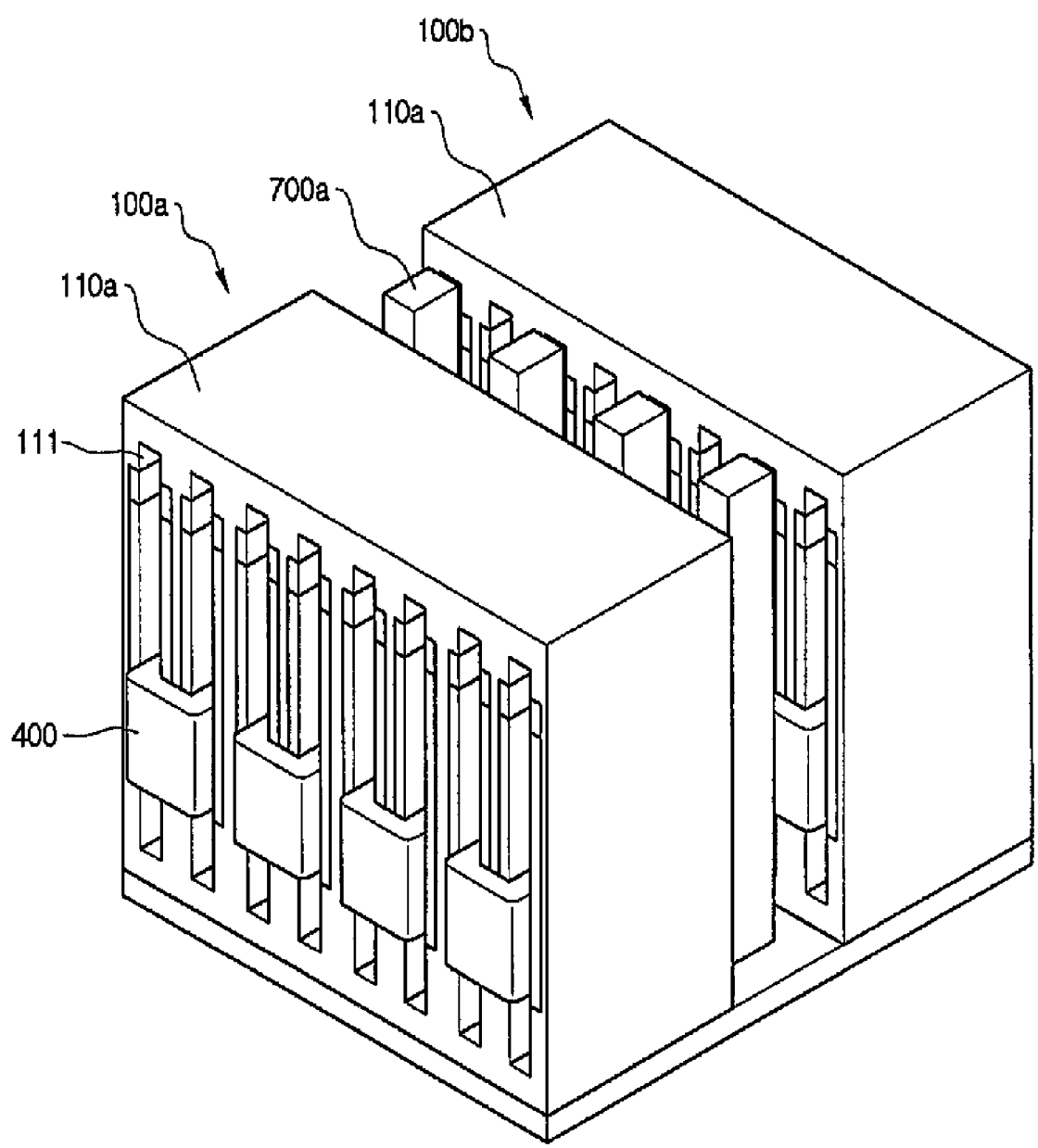
【Figure 21】

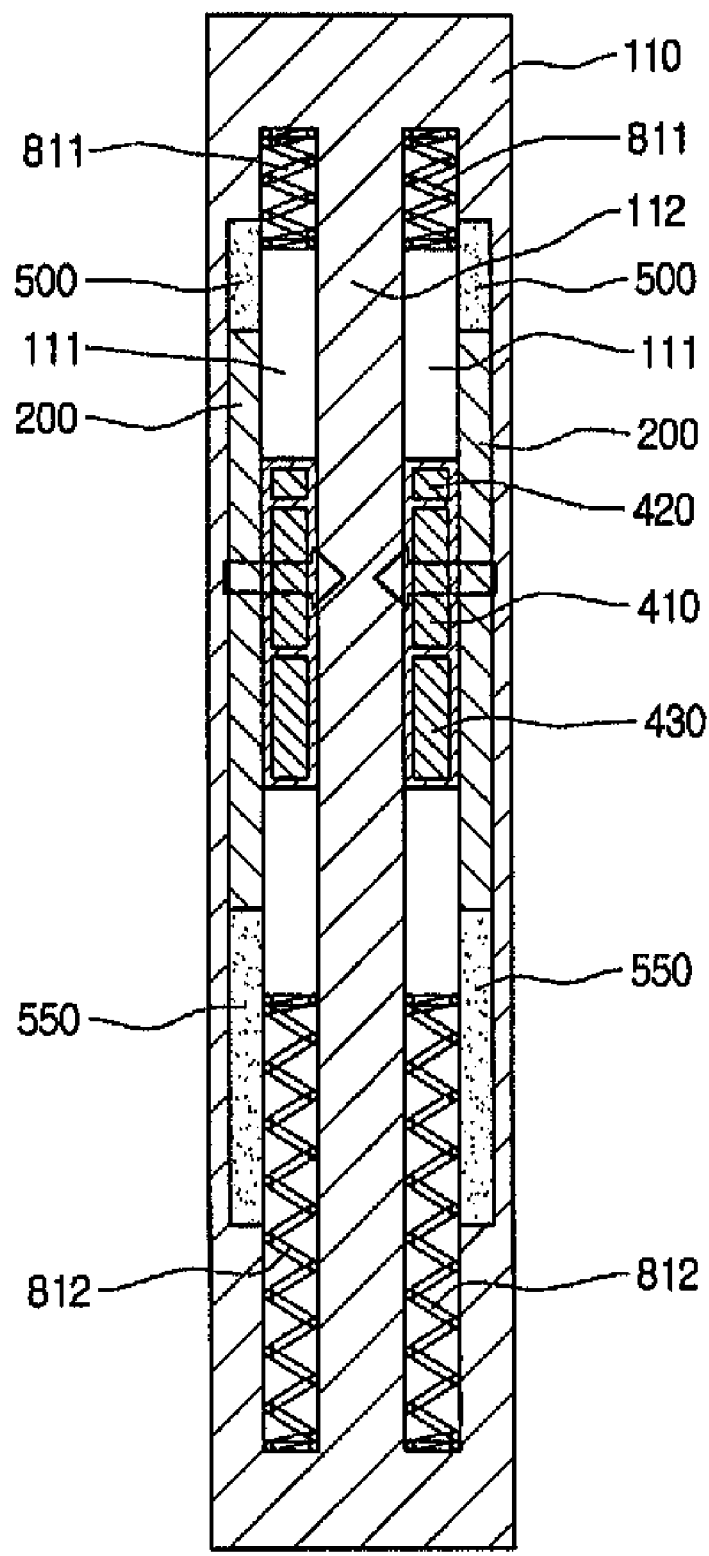
[Figure 22]

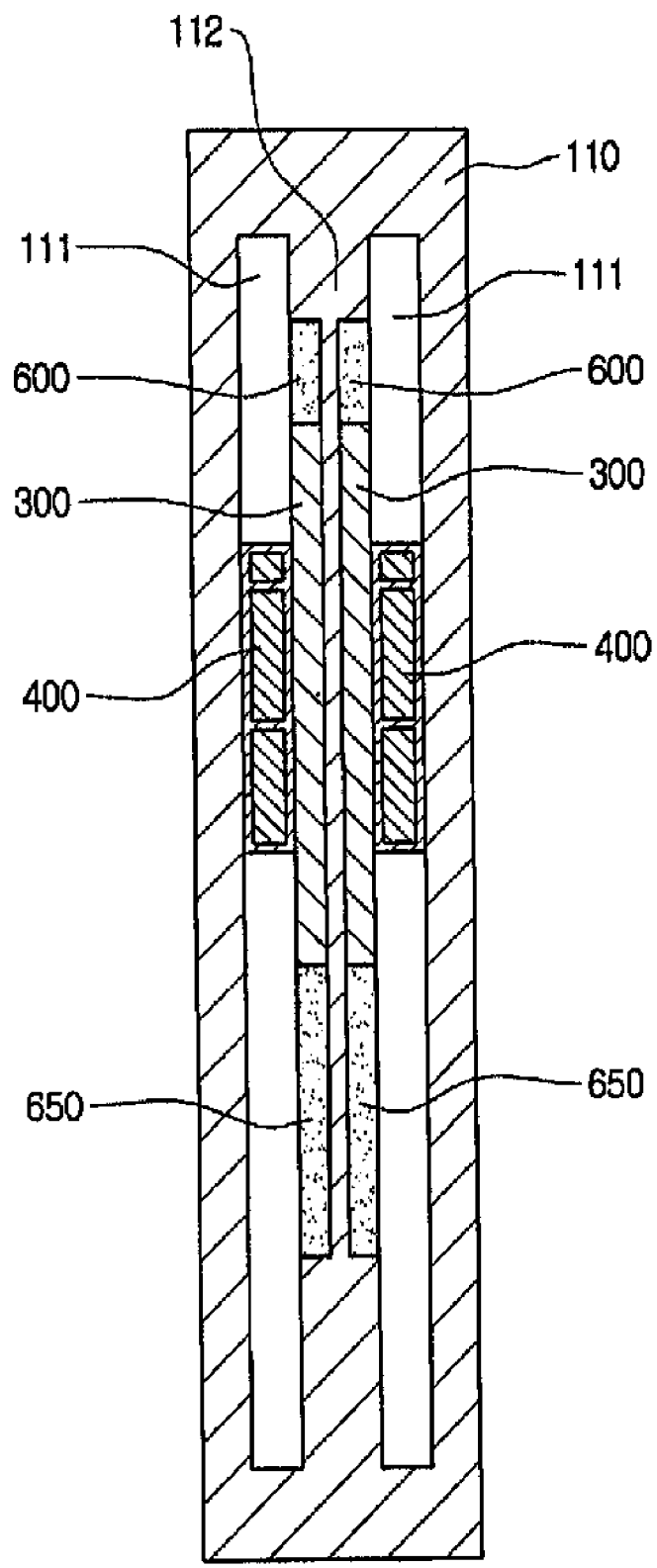
【Figure 23】

[Figure 24]
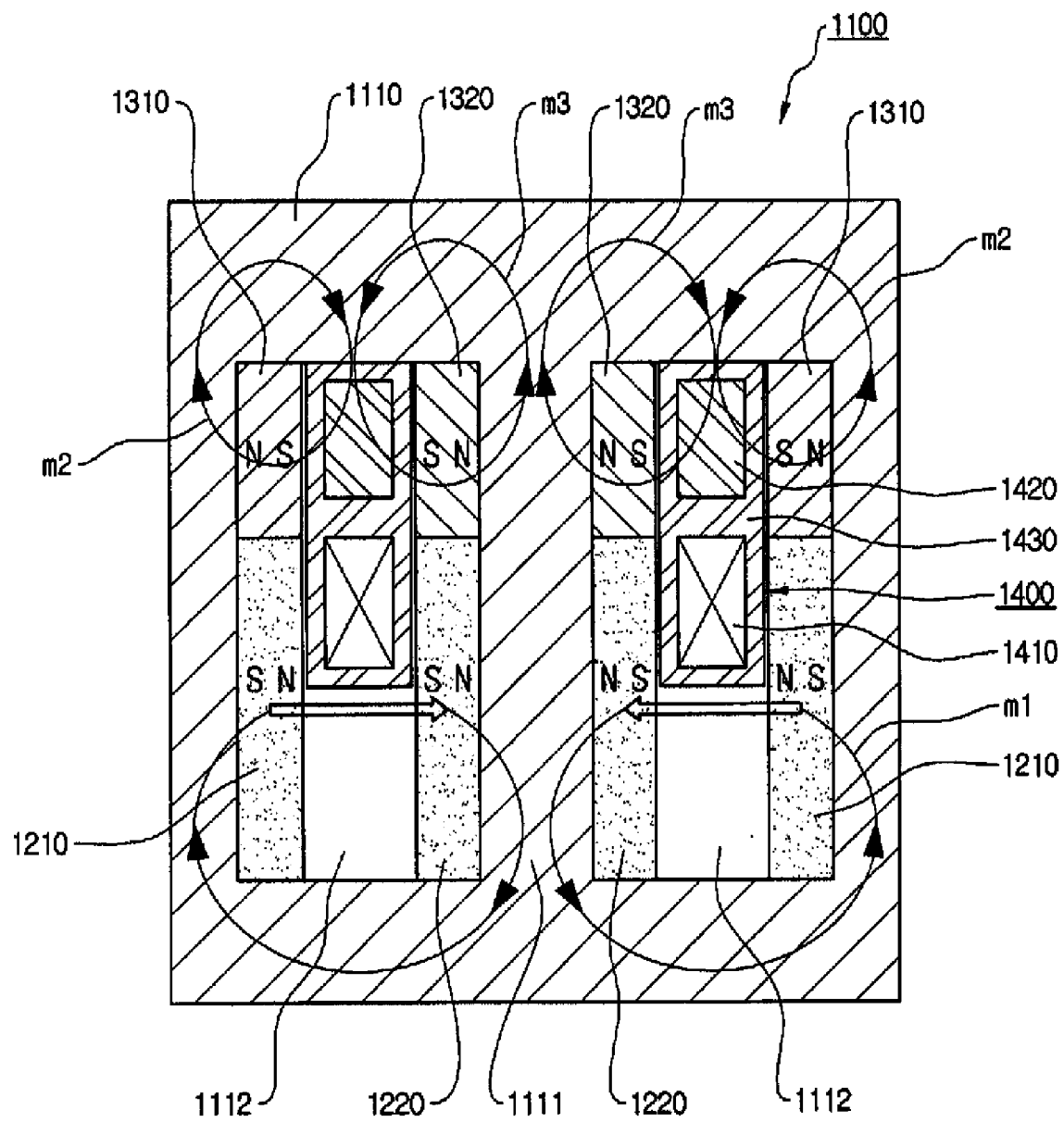

[Figure 25]
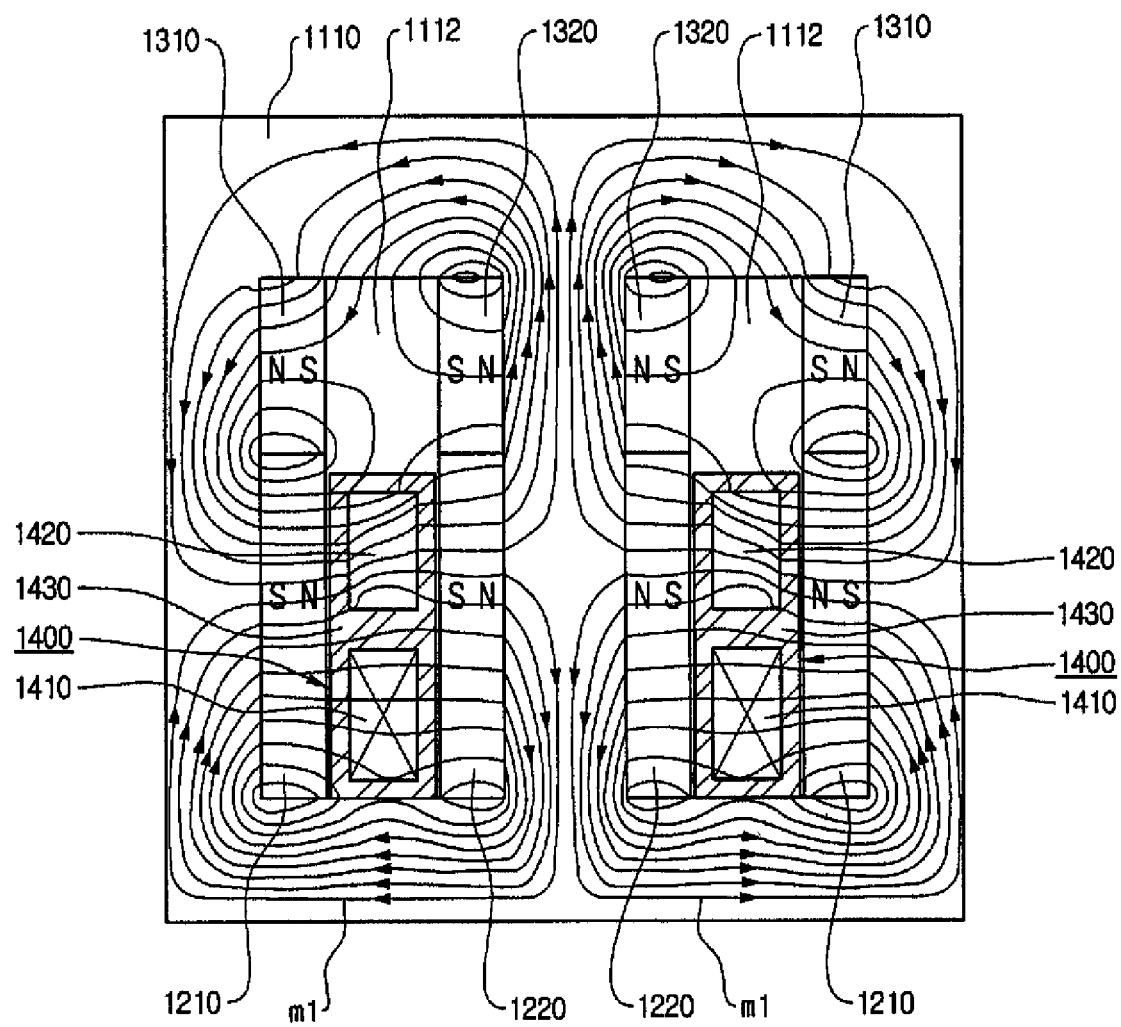

[Figure 26]
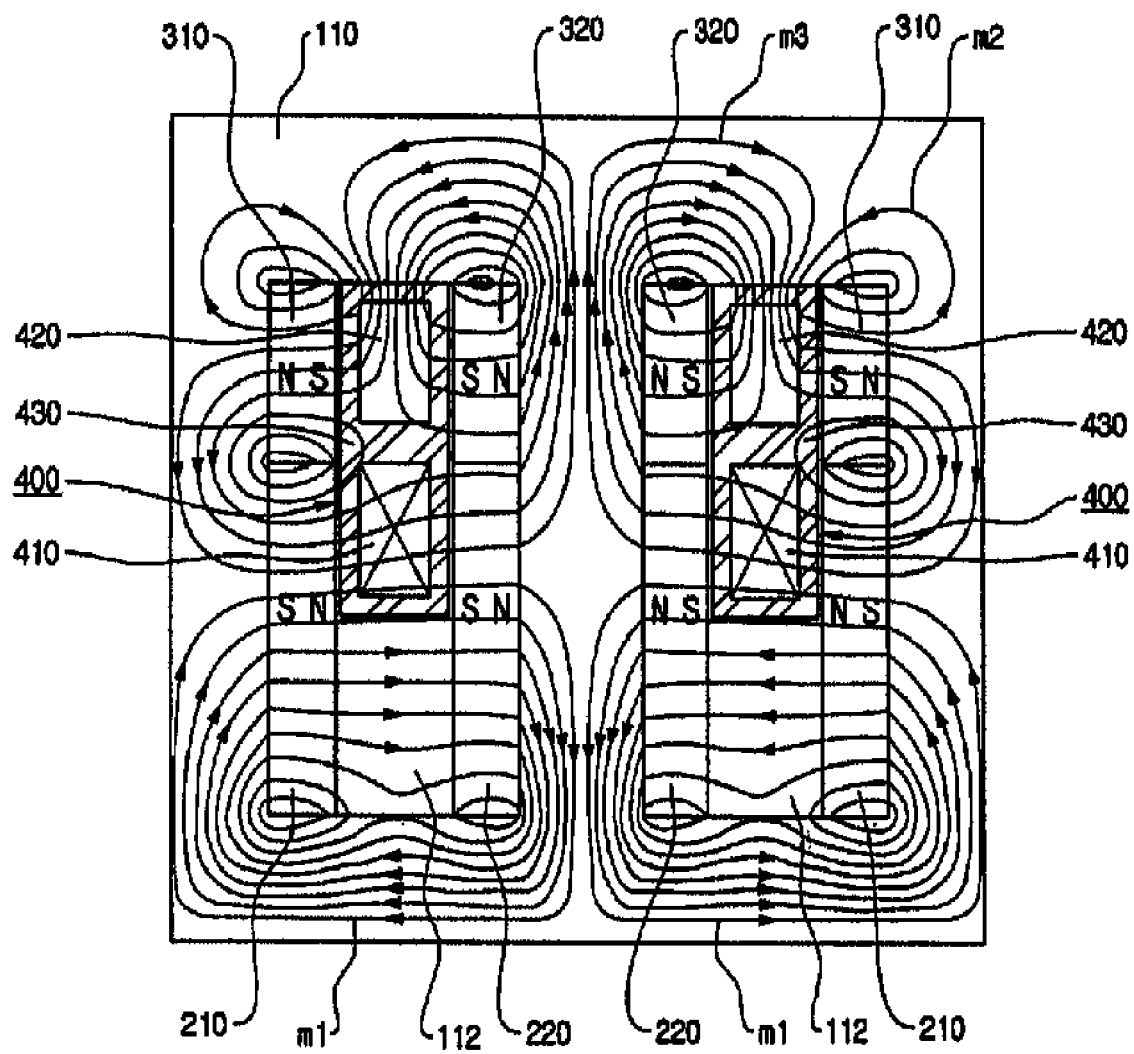

[Figure 27]
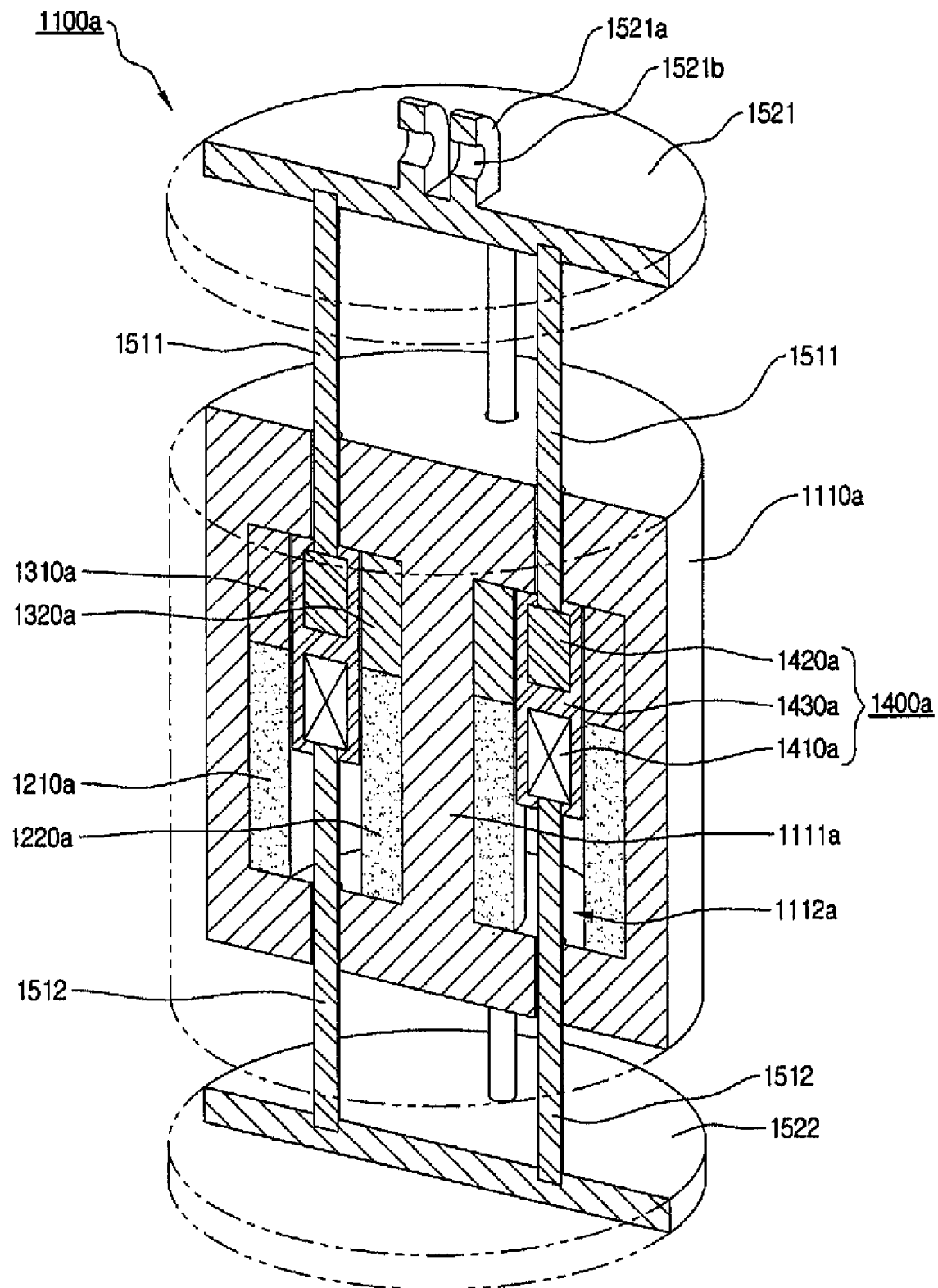

【Figure 28】
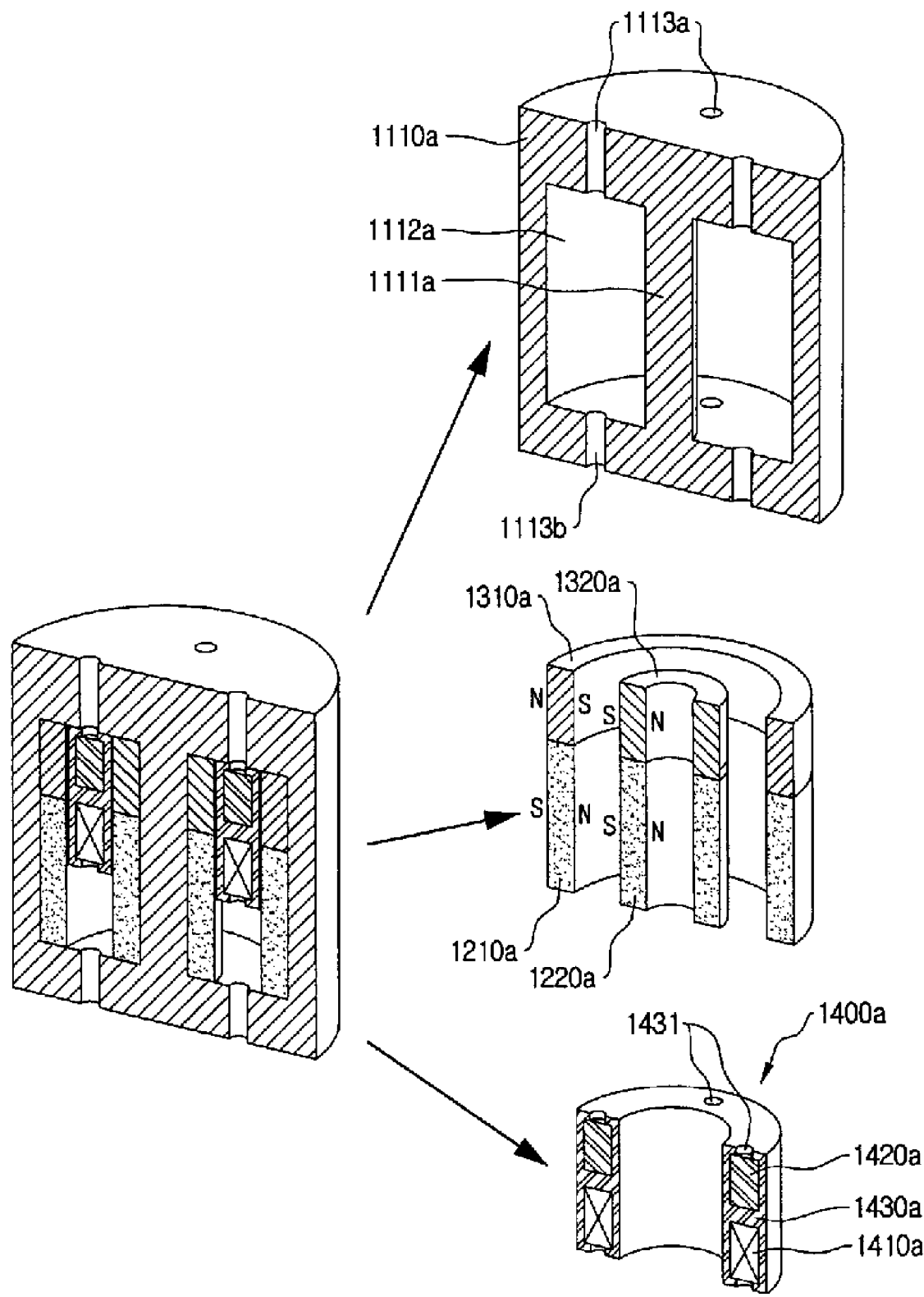

[Figure 29]
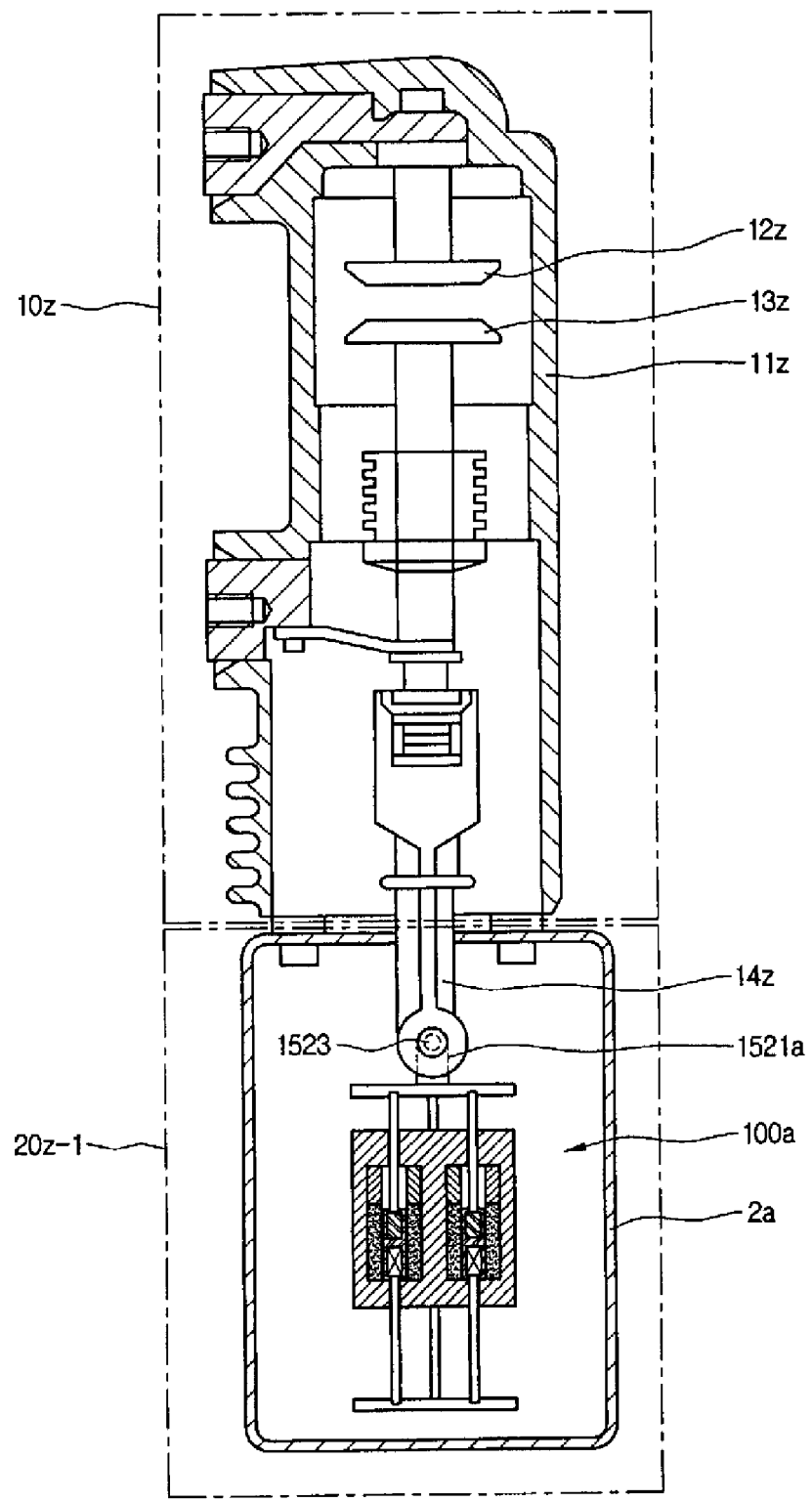

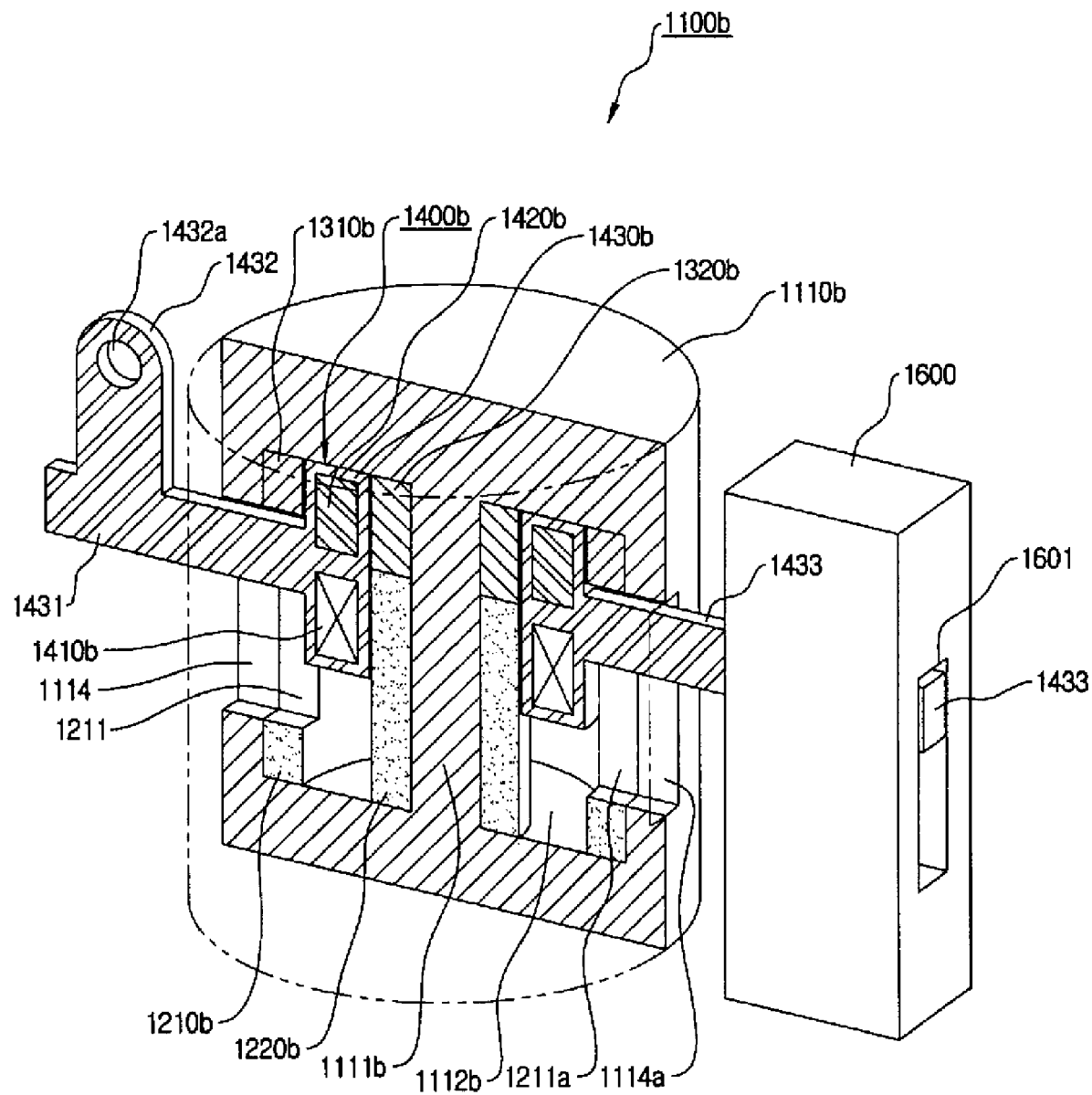
[Figure 30]

【Figure 31】
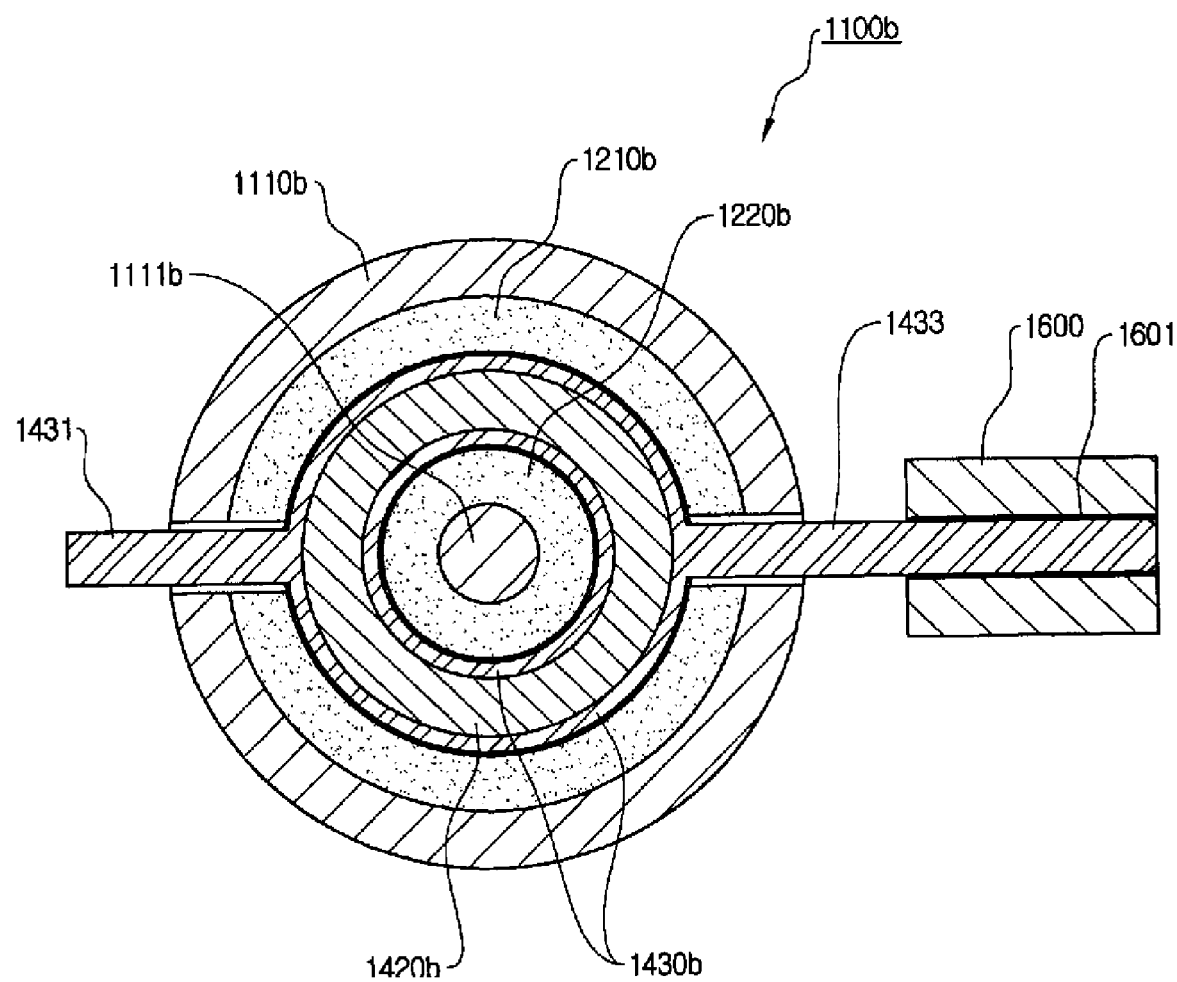

[Figure 32]
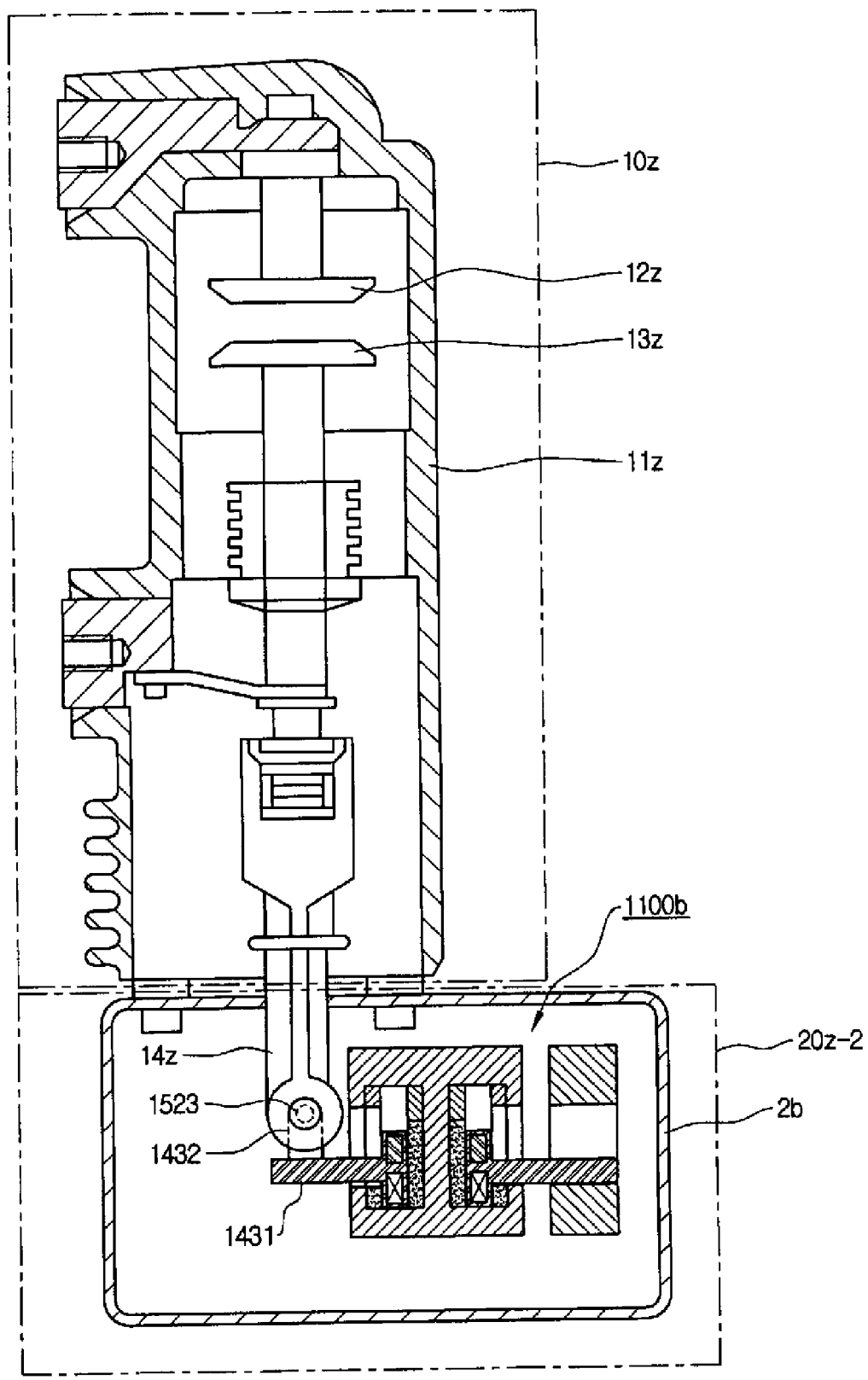

[Figure 33]
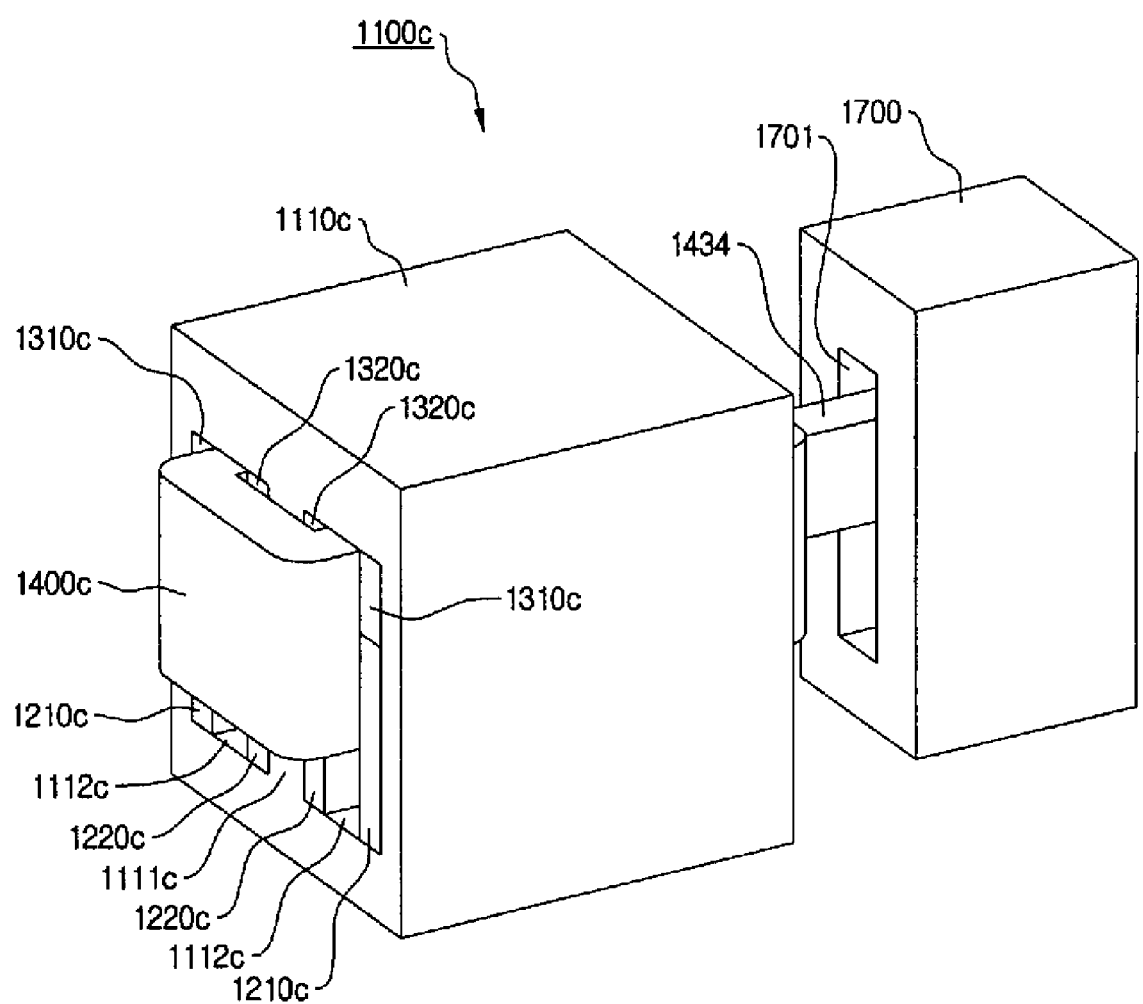

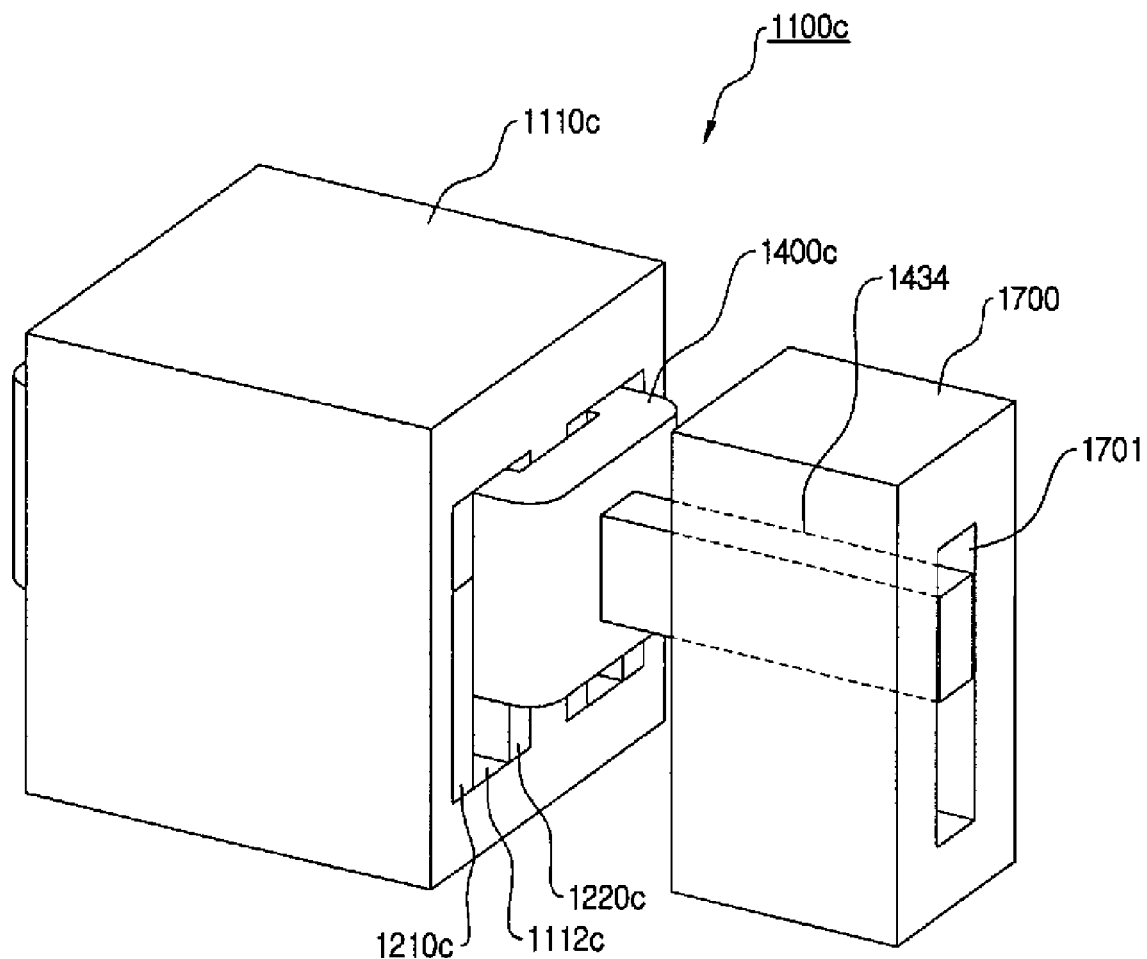
[Figure 34]

【Figure 35】
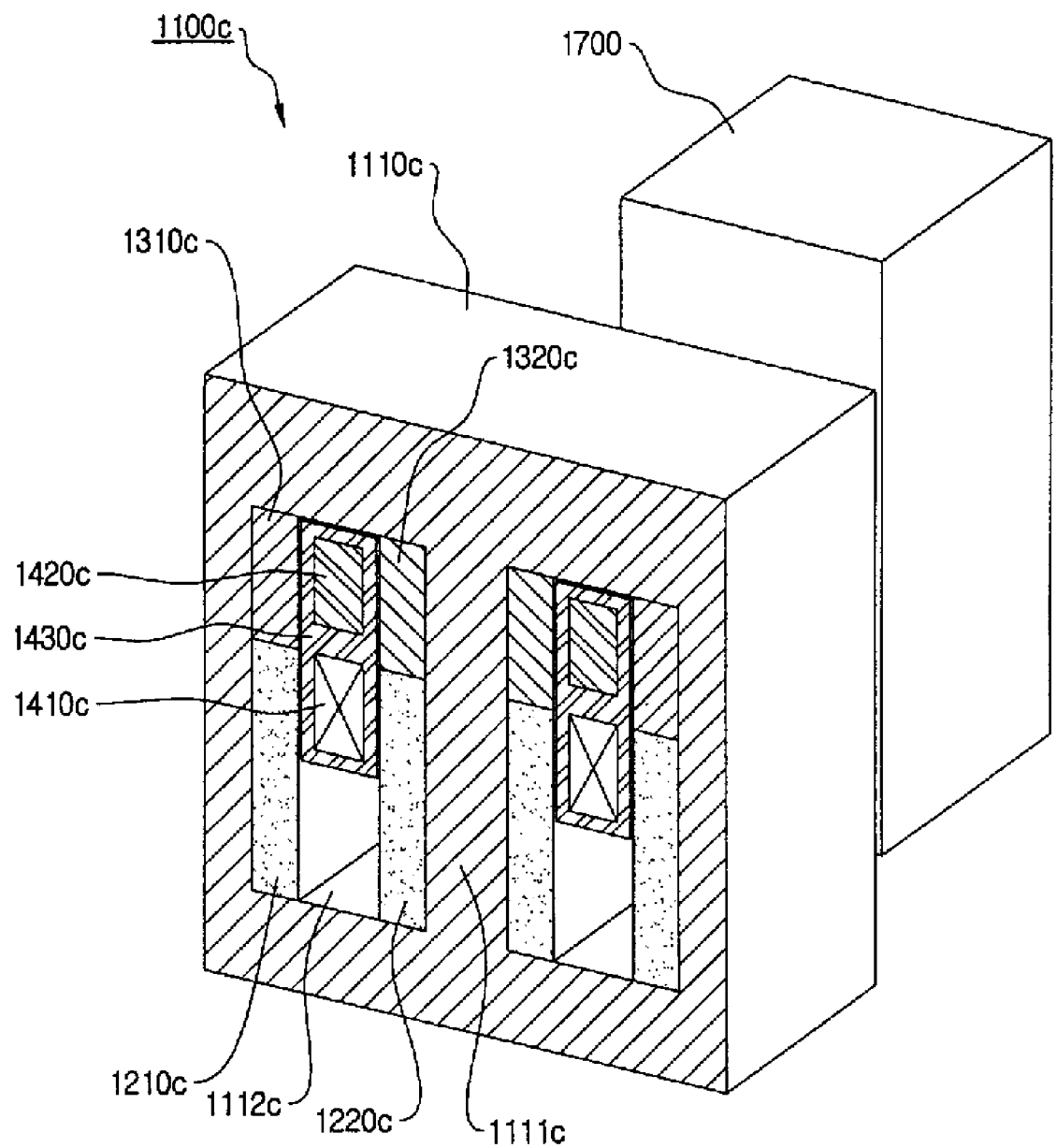

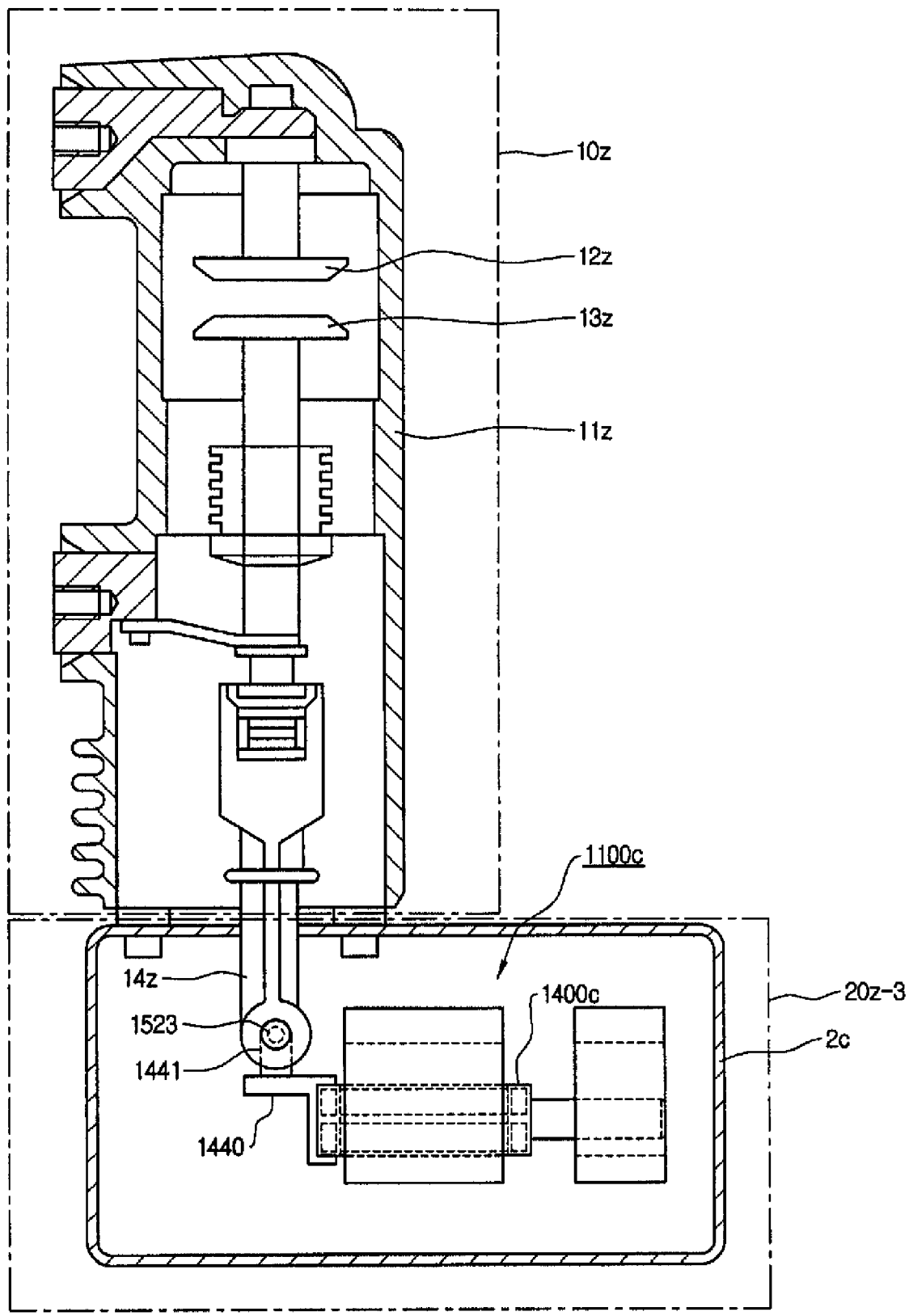
【Figure 36】

[Figure 37]
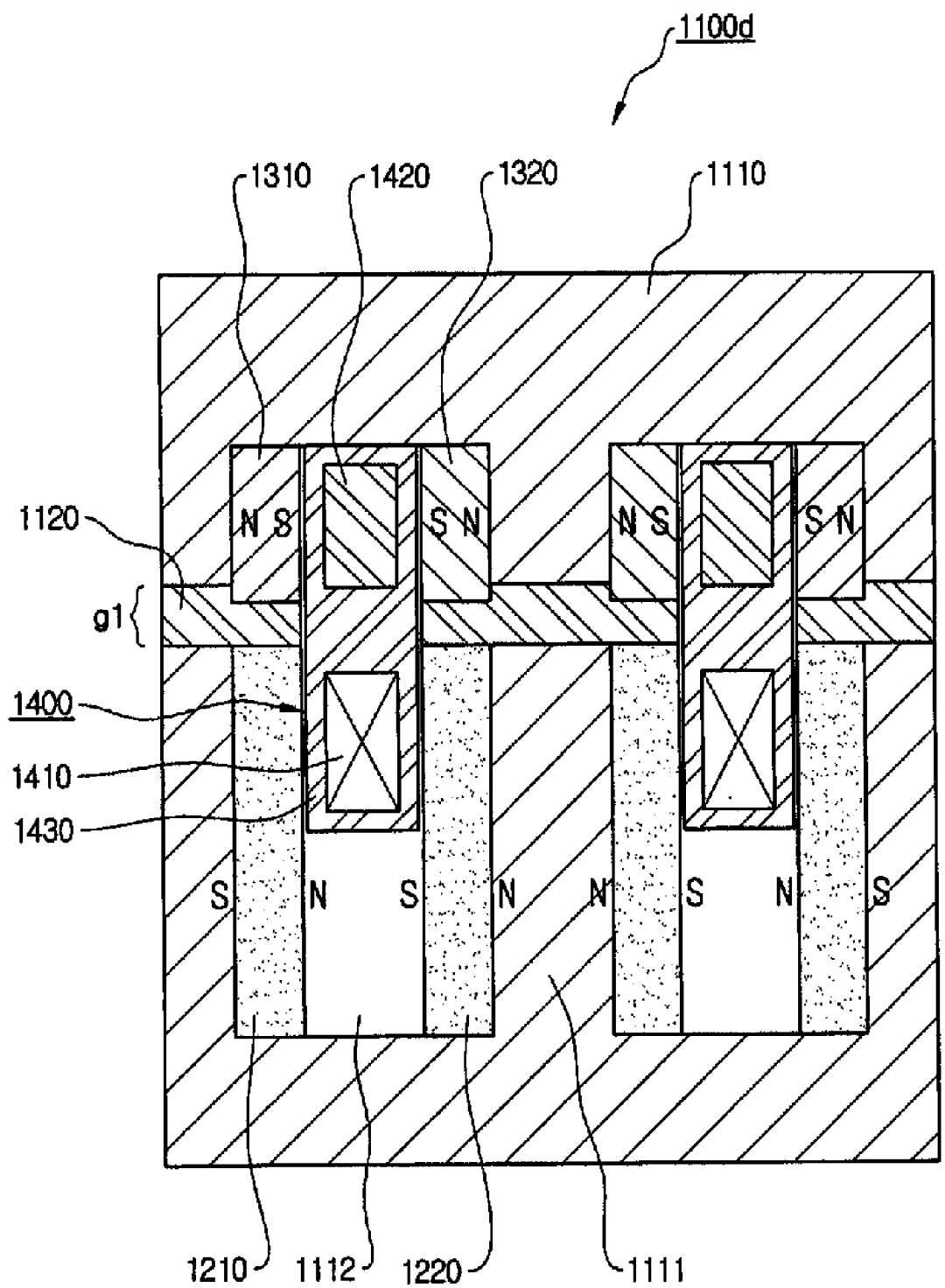

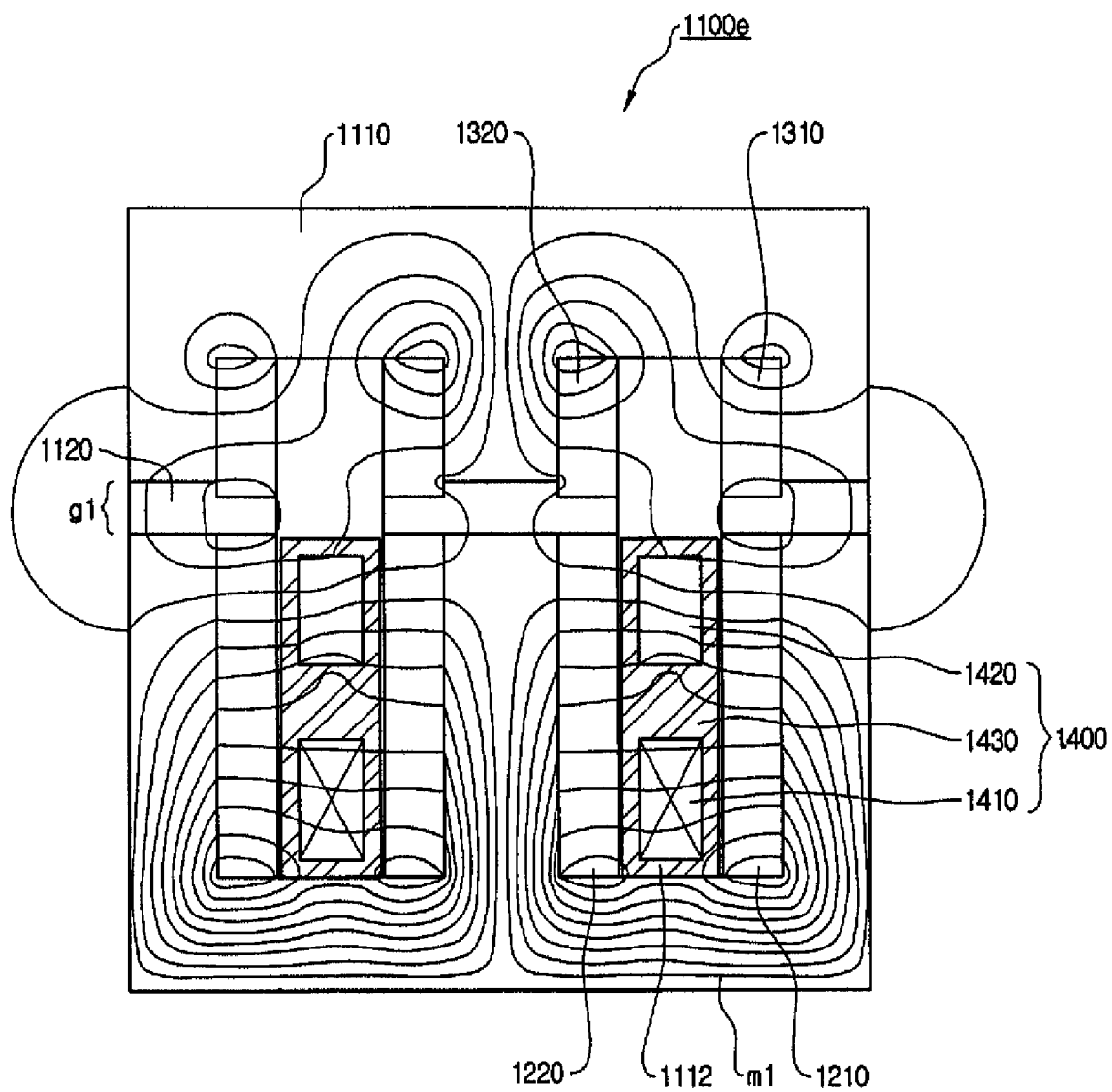
[Figure 38]

[Figure 39]
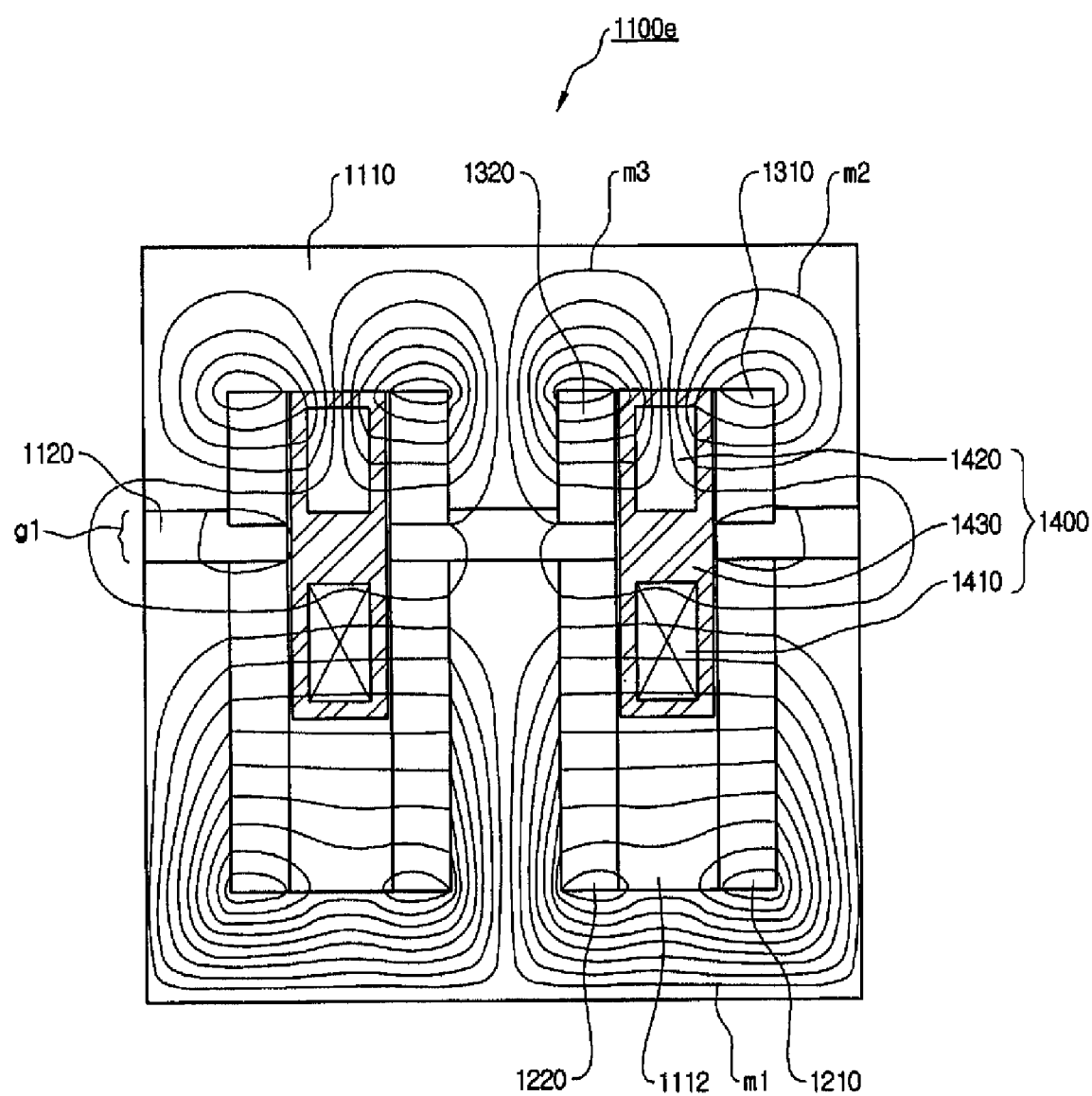

【Figure 40】
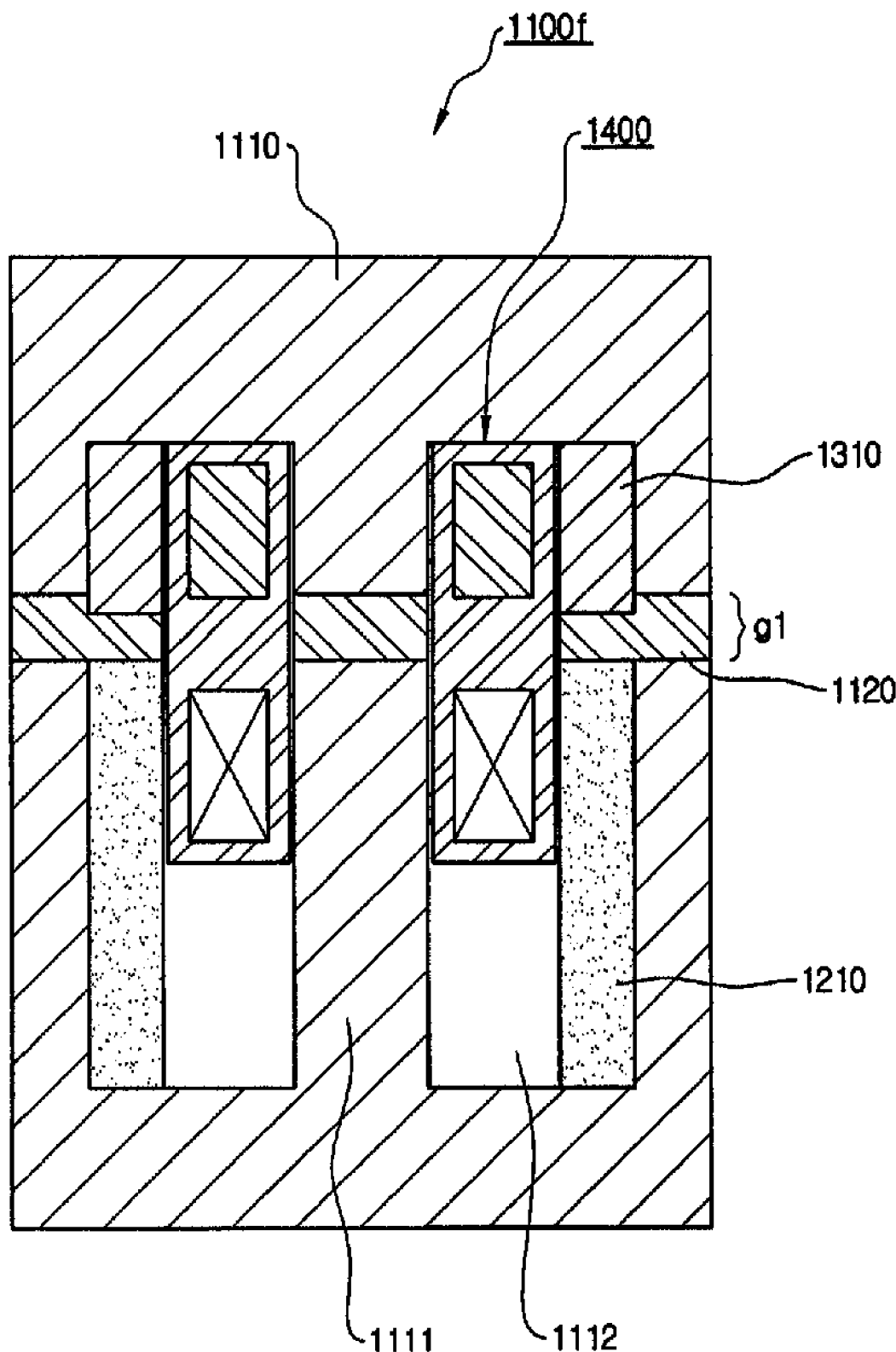

[Figure 41]
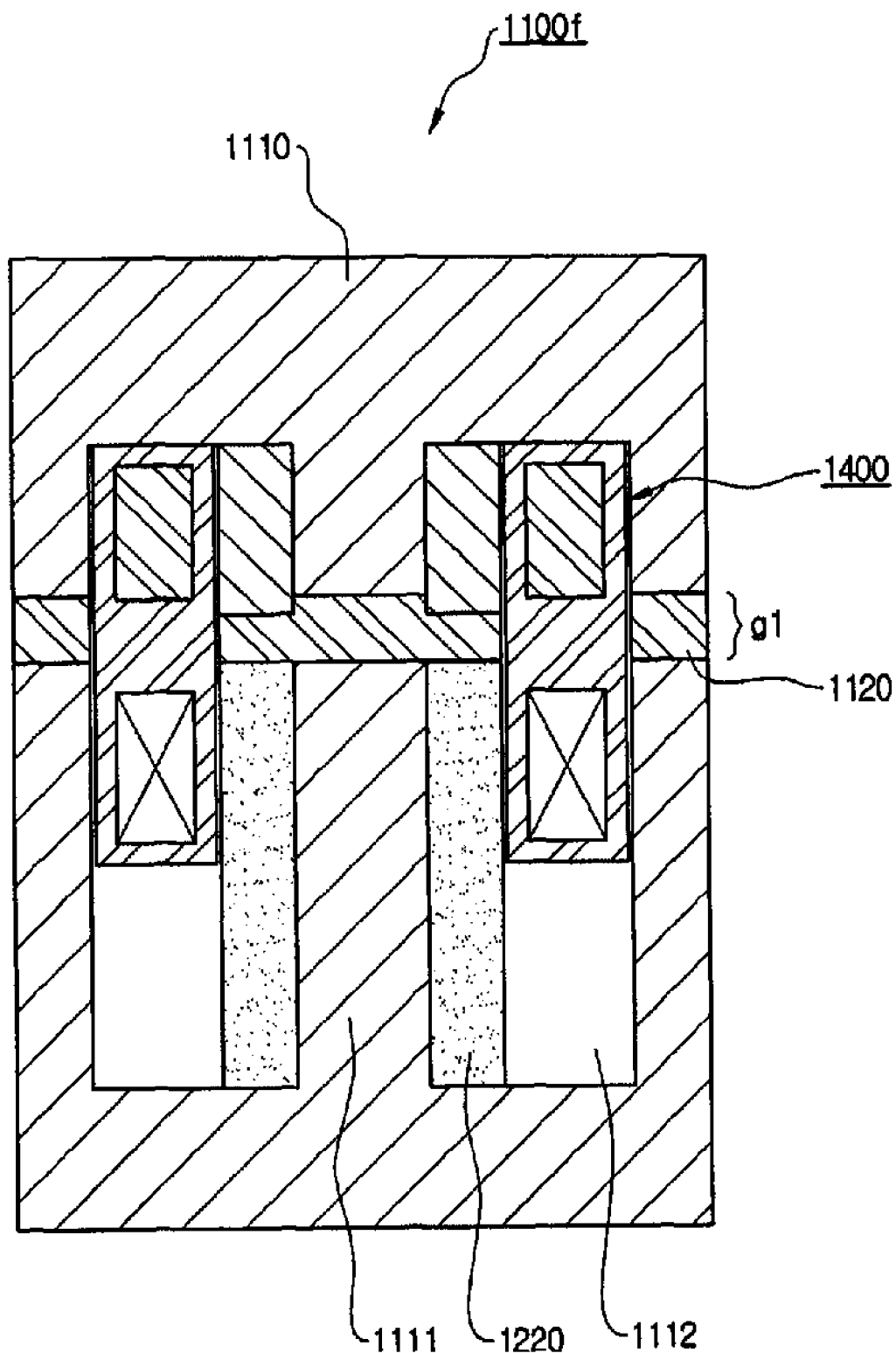

[Figure 42]
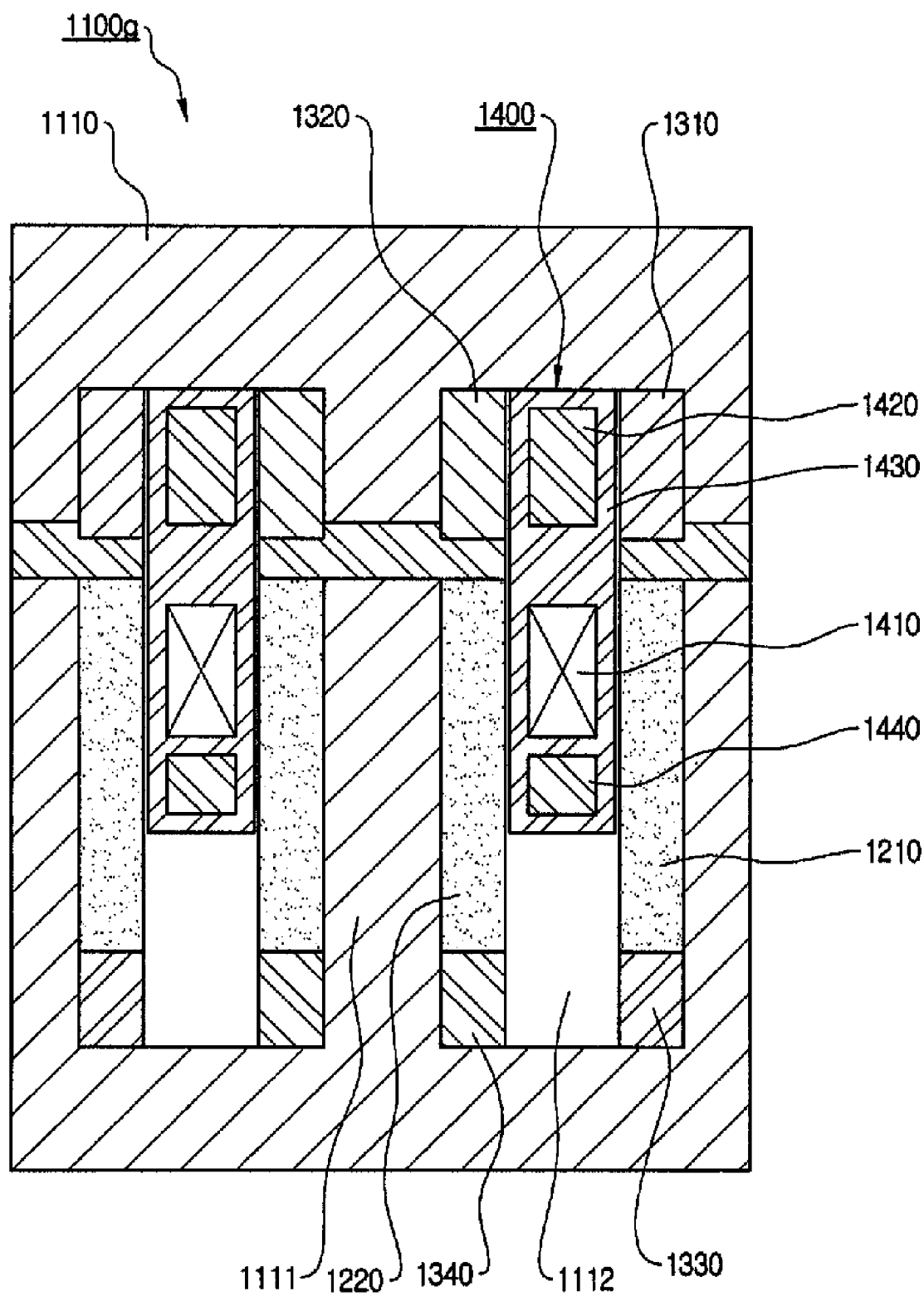

[Figure 43]
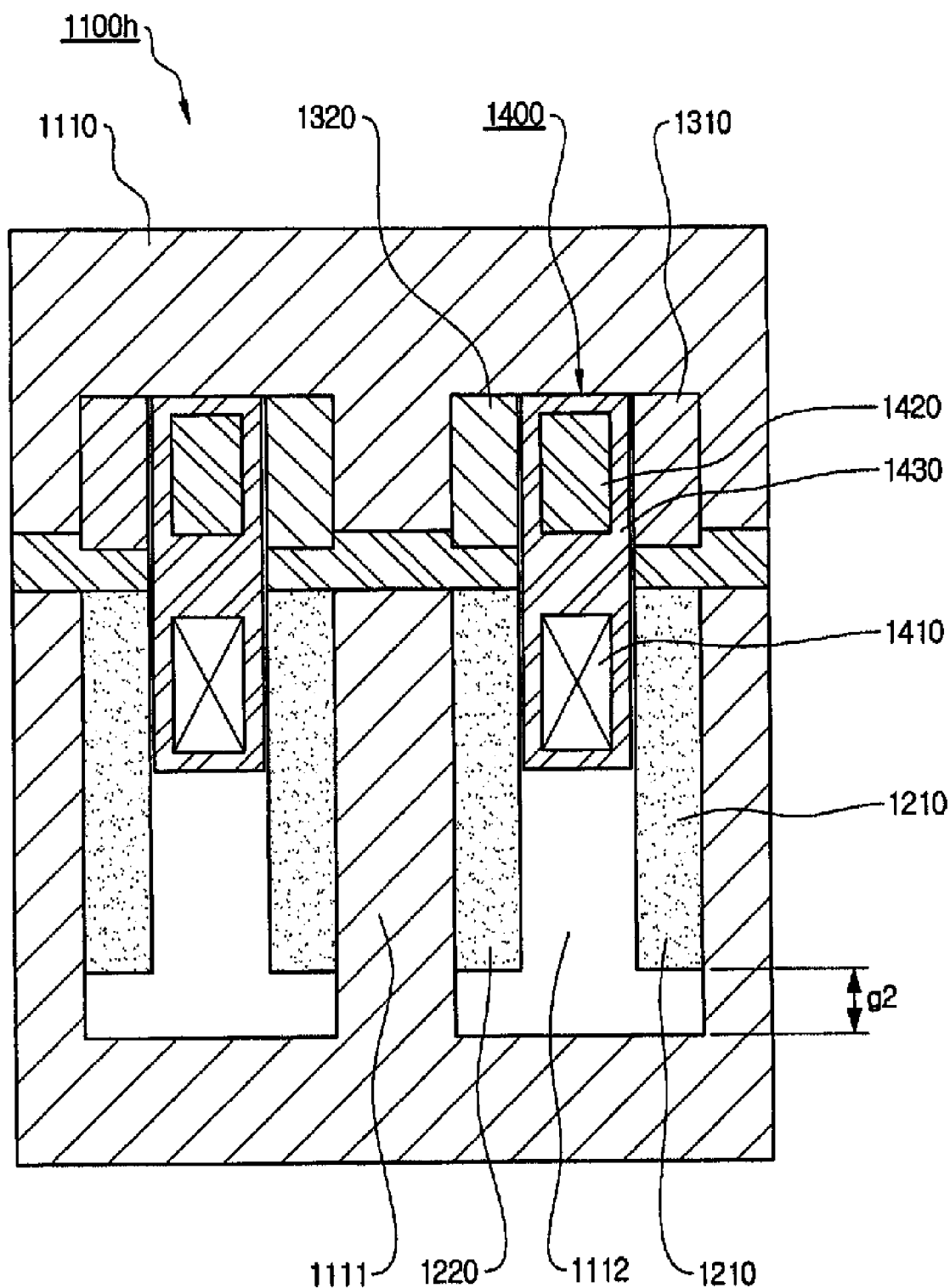

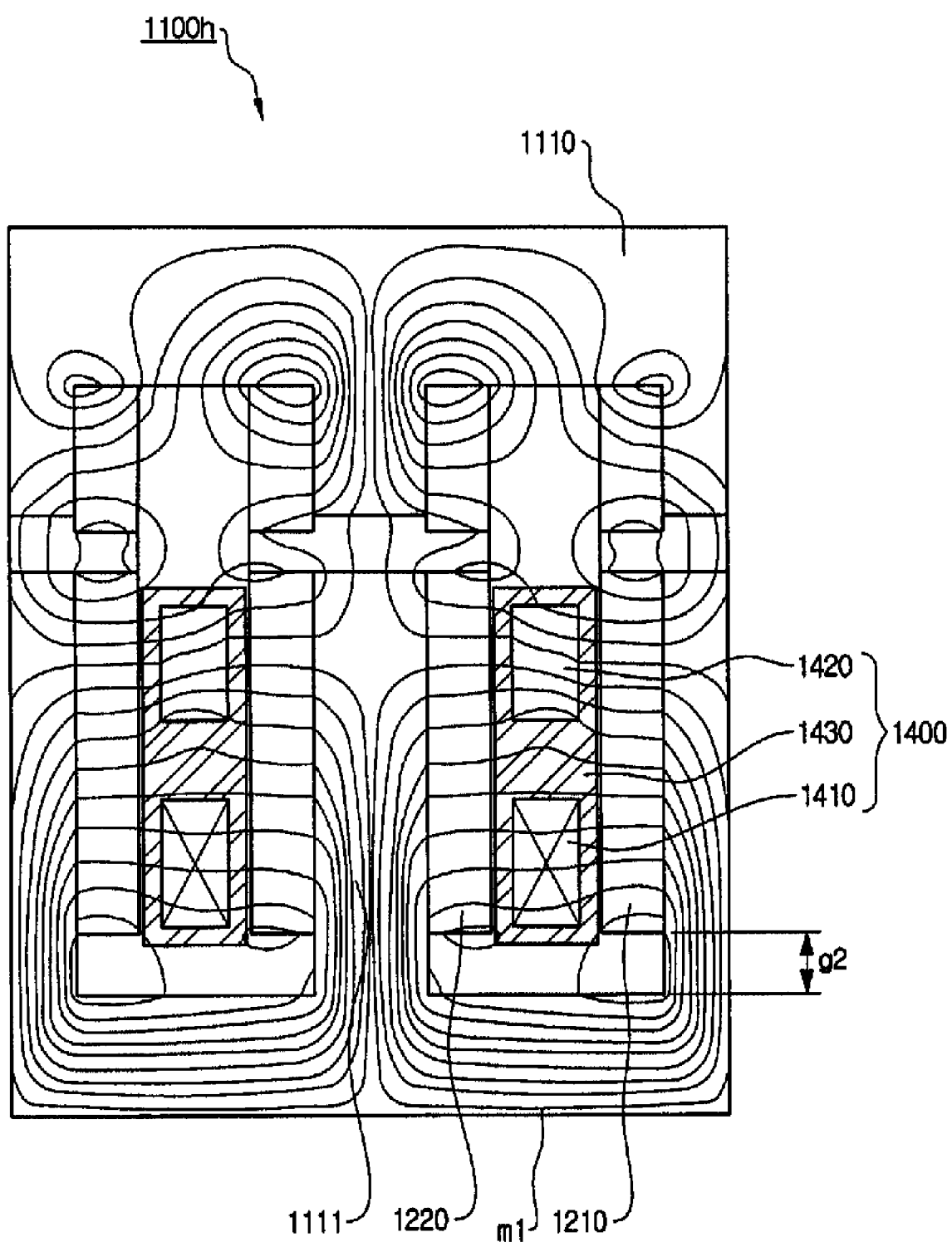
[Figure 44]

ELECTRO-MAGNETIC FORCE DRIVING ACTUATOR AND CIRCUIT BREAKER USING THE SAME

CROSS-REFERENCE TO RELATED APPLICATIONS

This application is a continuation of a PCT/KR2006/004384, filed Oct. 25, 2006, and claims the benefit under 35 U.S.C. §119(a) of Korean Patent Application Nos. 10-2005-0100755 and 10-2005-0121207, filed Oct. 25, 2005 and Dec. 10, 2005, respectively, in the Korean Intellectual Property Office, the entire disclosures of which are incorporated herein by reference for all purposes.

TECHNICAL FIELD

The invention relates to an electromagnetic force driving actuator and circuit breaker using the same for driving passive elements by having a driver with a coil move forward and backward by magnetic field by a magnetic generation element and electric repulsion force by current density of the coil.

BACKGROUND

The circuit breaker, which is mainly mounted in the transmission end or receiving end of a power transmission line, not only opens or closes normal current when there is no break down in the transmission system, protects the system and many power devices (or loads) by breaking the break-down current when a break down like short-circuit occurs.

These circuit breaker is classified a vacuum circuit breaker (VCB), oil circuit breaker (OCB), and gas circuit breaker (GCB), etc, according to extinguishing/insulating media.

When the breaker isolates break-down current, arc that occurs between electric contacts should be extinguished. The gas circuit breaker is classified puffer type, rotating arc type, thermal expansion type, hybrid extinction type, etc, according to types of extinguishing the arc.

FIG. 1 and FIG. 2 depict a puffer type gas circuit breaker as an example.

The puffer type gas circuit breaker uses SF6 gas (hereafter extinction gases) as extinction/isolation media, and is mainly used for an ultra-high circuit breaker (commonly more than 72.5 KV).

As depicted in FIG. 1 and FIG. 2, the puffer type gas breaker is composed of a breaking part (10), and an actuator (50) for actuating the breaking part (10).

The breaking part (10) is composed of a fixed part and moving part, in which a container (2) stored with SF6 gas is installed. In the breaking part (10), the fixed part includes a fixed arc contacting part (11) and fixed main contacting part (12), and furthermore includes an isolation cylinder (13), fixed piston (14), a holding part (15) and a holding insulator (16), etc.

In the breaking part (10), the moving part includes a moving arc contactor (21), a moving main contactor (22), an insulation nozzle (23), a puffer cylinder (24), and an insulation actuating rod (25).

To the insulation actuating rod (25), an acting rod of the actuator (50) is connected. And to the rod (25), the moving arc contactor (21), the moving main contactor (22), the isolation nozzle (23), and the puffer cylinder (24) are connected as a single body.

Therefore, if the actuator (50) is actuated, the insulation actuating rod (25) moves by the acting rod (51). Then, according to movement of the insulation actuating rod (25), the moving arc contactor (21), the moving main contactor (22), the insulation nozzle (23), and the puffer cylinder (24) moves as a single body, and performs a closing pole action (inserting current) and a opening pole action (cutting off current).

In the concrete, in the steady state, closing state is maintained and steady state current flows.

When a break down occurs in a power transmission system and break-down current, which is many times of normal current (for example, about 10 times), flows, the actuator (50) acts by the break-down current. Then, as depicted in FIG. 2, the acting rod (51) is pulled by the actuator (50), and the acting rod (51) pulls the insulating acting rod (25). Therefore, the moving arc contactor (21) is separated from the fixed arc contactor (11), and the moving main contactor (22) is separated form the fixed main contactor (12).

Concurrently, the puffer cylinder (24) compresses the extinguishing gas in the puffer cylinder (24) by being pulled against the direction of the fixed cylinder (14). The compressed extinguishing gas passes through an inhaling hole (17) and a fluid drain (18), is spouted to the arrow direction in FIG. 2, and promptly extinguishes arc plasma that occurs between the fixed arc contactor and the moving arc contactor (21), then the current is cut off (open pole state).

Like this, for cutting off break-down current and recovering isolation between poles promptly, for the circuit breaker, opening action should be performed on high speed. But as arc plasma is formed, just by separating gap of the opening poles, arc extinction is not performed completely. So, extinction gas should be ejected as described above. Therefore, the actuator (50) is responsible to force for compressing extinction gas, that is, the force for actuating the puffer cylinder against the fixed cylinder (14).

That is, in order to increase actuation power much more to speed up opening pole speed, the actuator (50) needs much more force and speed. For example, a circuit breaker for high/ultra high voltage (commonly more than 365 KV) has stroke length of about 250 mm, needs so big power and speed that it can complete the operation such a little time as 45 ms.

Presently, as a passive element like high/ultra high voltage circuit breaker, mostly oil-pressure actuator or air-pressure actuator is used. But, these actuators are so high that the price of them is about ⅓ of the total price of a circuit breaker. And, this oil-pressure or air-pressure actuator has concern of leaking acting fluid according to temperature change of surroundings. And, as they have a lot of components, the actuator can not operate even if just one of the components is out of order.

Therefore, researches for developing an actuator that can replace the oil-pressure or air-pressure actuator are performed frequently. As results of the research, a spring actuator (spiral spring), motor drive (a system using a motor to convert rotating movement to linear movement), and Permanent magnetic Actuator (PMA) are used typically. As the spring actuator is a system that compresses the spring and gains power by releasing the compressed power, the price of manufacturing is low, but the actuator has a shortcoming that reliability for operation state is low because the elasticity of spring is uneven. For this reason, not only it is not applicable to high voltage or ultra high voltage that should eject extinction gas, but possibility of failure is very high if it is applied.

Even though the motor drive has low manufacturing cost compared to air-pressure or oil-pressure actuator, it is still very high. And it can not make big power, so it can be used for low voltage but can not be used as high voltage or ultra high voltage.

In the PMA, an actuator is driven by electromagnetic force from magnetic force coming from a permanent magnet and electric field generated from a coil. Therefore as it has a very simple structure, has good efficiency for actuation, and can expect a stable and even operation, recently, it is used popularly for actuators for low voltage. But, as the PMA actuator an actuator is driven by electromagnetic force from magnetic force coming from a permanent magnet and electric field generated from a coil, not only a path for flowing magnetic field should be installed by a magnetic material, the acting actuator should be made by a magnetic material. So, when the actuator needs much more force according to increment of cutting off capacity, much magnetic field should be generated, as the magnetic material should be bigger in order not to be magnetic saturation and flow, the size of actuator would be bigger. And since magnetic field density is in inverse proportional to square of gap length, it has limitation to be applied to high or ultra high voltage actuator that has big contact length.

For example, when PMA is applied to an actuator for low voltage that has stroke length of about 20 mm, since the optimal size of the model (length ?width ?depth) is 200×250× 100 mm, its weight will be more than 10 Kg. Therefore, when the PMA is used in ultra-high voltage, the size should be much bigger, its weight will be much heavier than that of oil-pressure or air-pressure actuator, and manufacturing cost is increased. For this reason, until now, PMA is not a measure for a high and ultra high voltage actuator.

By solving the problems in conventional actuators, a new actuator, named as EMFA (Electro-Magnetic Force Driving Actuator), having the actuator have small size and weight and maximize operation speed and force, is introduced on the Korea patent application of 10-2005-11263 that was applied by the inventor of this application.

The EMFA includes an inner cylinder and outer cylinder made of magnetic material, inner and outer magnetic field generation element (e.g. permanent magnet) is allocated between the inner and outer cylinder, a coil and a movable body made of non-magnetic material that operates with the coil is allocated between the inner and outer magnetic field generation elements. The EMFA is a new type of actuator that when current is applied to the coil, by electromagnetic repulsion force due to current density of the coil and the magnetic field due to the inner and outer magnetic field generation elements, the coil and actuator move linearly according to axis direction between the inner magnetic field generation element and the outer magnetic field generation element.

As the coil moves as a moving element, the EMFA can maximize actuation forces and speed even though it has small size and weight, increase stroke length of the moving element. Therefore, the actuator using electromagnetic force, not only shows prominent performance in a passive element that needs big actuation force, high speed, and long stroke length like high or ultra high voltage circuit breaker for transmission, to which PMA can not be applied, but can be applied extensively to the passive element like low-voltage circuit breaker.

But, in the EMFA, as the coil is located inside of outer cylinder enclosed from outside, it is not easy to wire for providing current for the coil. And, since allocated wire moves to the direction of axis according to linear movement of the coil, even though the wire is connected, as the speed of the coil is fast, so the wire is experienced with fatigue due to compression and stretching and worried about disconnection of the wire.

And, in the EMFA, as the moving element is located between hollowed inner cylinder and outer cylinder, in order to connect it to outer acting elements, not only a moving axis or a connecting axis should be extended from the moving element, extended length should be long enough to secure the stroke length of the moving element. For this reason, as total height of the actuator, that is, the length of the actuator should be long, be used many ones, or the one that has large radius, the actuator would be heavier.

And, as the coil and the moving element simply are located between the inner and outer magnetic field generation elements without any guiding device, when the coil and the moving element move to axis direction, they make friction with the inner and outer magnetic field generation elements, and due to that, as the actuation force is lost or movement is not good, new consideration is necessary for stable driving of the actuator.

And, in the EMFA, the inner and outer magnetic field generation elements and subordinate magnetic field generation element should be fabricated in cylindrical form. But, in case that the magnetic field generation element is made of a permanent magnet, since it is not easy to be made in a single cylindrical form, there is a difficulty that after actually many parts are made along with direction of cylinder, the several parts should be allocated inside of a casing.

Meanwhile, as described before, not only the actuator should have high acting speed and force, but sometimes have big holding force.

One of passive elements that need big holding power in addition to high acting speed and force is Vacuum Circuit Breaker (VCB).

In FIG. 3, VCR that needs big holding force is depicted.

As depicted in FIG. 3, VCB is divided largely into a contacting part ($10z$) and actuation part ($20z$). In the actuation part ($20z$), conventional PMA ($21z$) is depicted as an example. The PMA ($21z$) is located for a moving part ($24z$), which is composed of magnetic material, to be able to move forward and backward in the longitudinal direction in the path formed in the middle of fixed iron core, in the middle part of the path, a permanent magnet ($25z$) is located, a closing side coil ($26z$) and opening side coil ($27z$) are located in the upper side and lower side of the permanent magnet. The moving part ($24z$) is connected to the contacting part ($10z$) by means of link element, etc.

And, in the contacting part ($10z$), a fixed contacting part ($12z$) and a moving contacting part ($13z$) are prepared inside of a insulator that maintains vacuum. The moving contacting part ($13z$) is responsible for force to drive a link element ($30z$).

Like FIG. 3, when the moving part ($24z$) is in the upper side in the figure, the moving contactor ($13z$) is separated from the fixed contactor ($12z$), and maintains open pole state (current is cut off). At this time, arc plasma at the contacting part is extinguished by vacuum of insulation material. At this state, when current is inputted in the input coil, the moving part ($24z$) moves to lower direction of the figure by the magnetic field induced from the input coil and the magnetic field from permanent magnet ($25z$), and the moving contactor ($13z$) contacts the fixed contactor ($12z$) and makes closed pole state (current flowing state, or input state). At closed pole state, in order for the fixed contactor ($12z$) and the moving contactor ($13z$) flow current well like a conductor, two contactors should be pressed by powerful force. The force that contacts two contactors ($12z$) ($13z$), which is called as the contact force, is responsible for the actuator ($20z$). Therefore, the actuator should provide enough energy to maintain continuously contacted state with powerful pressure. As such, the energy that the actuator should have is called as holding force. Ordinarily, the holding power of the actuator should be 20% greater than the contacting pressure in order that the contactors don't break away when radical shock from outside such as earthquake is transmitted.

In the point of holding force, in the EMFA that is disclosed in Korea patent application 2005-11263, the actuator is maintained to the moving side state (open state or closed state when applied to the actuator) by the force of magnetic field from magnetic field generation element. The EMFA, as described above, is able to maximize stroke force, stroke speed, and stroke length, and has many merits of having superior performance to PMA. But, holding force that holds the moving part at a moved state is not enough, it is not easily applicable to VCB as it is. For this reason, as a passive element that needs huge holding force should employ a holding force increment means like a double-power apparatus, structure of it is complicated and cost becomes high.

SUMMARY

The invention is developed in the situation of considering many problems emerging from the EMFA using conventional electromagnetic force.

Therefore, the first object of the invention is to provide a EMFA that has improved quality and liability by means that current provision for the moving coil and wire allocation are easy, is compact by reducing size and height, manufacturing is easy, and operation of the moving part becomes stable.

The second object of the invention is, by maximizing holding force of the actuator using electromagnetic force, to easily apply a passive element that needs big holding force.

The third object of the invention is to provide a improved circuit breaker using EMFA.

To achieve the first object, the actuator according to an aspect of the invention comprises, a casing that forms two paths having a certain length in longitudinal direction, and forms a middle wall by the two paths; a main magnetic field generation element that is allocated on more than one wall face in the both face wall of the two paths of the casing; and a moving element that, as the middle wall is located in the center, a coil, which is bound in the orthogonal direction to longitudinal direction of the paths, is in a body that its left and right sides passes through the paths and its front and back side are exposed to outside, when forward direction or reverse direction current is provided in the coil, moves forward and backward along the longitudinal direction of the paths.

Where, preferably the casing is composed of iron core, and the main magnetic field generating element is composed of permanent magnet.

The actuator according to an aspect of the invention comprises, a casing that forms two paths having a certain length in longitudinal direction, and forms a middle wall by the two paths; a planar shaped outer main magnetic field generation element and inner main magnetic field generation element that are allocated on the both face wall of the two paths of the casing; and a moving element that, as the middle wall is located in the center, a coil, which is bound in the orthogonal direction to longitudinal direction of the paths, is in a body that its left and right sides passes through the paths and its front and back side are exposed to outside, when forward direction or reverse direction current is provided in the coil, moves forward and backward along the longitudinal direction of the paths.

Wherein, preferably the casing is composed of iron core, and the main magnetic field generating element is composed of permanent magnet as well.

On the upper and lower end of the inner and outer side main magnetic field generation element, respectively the first inner and outer side subsidiary magnetic field generation element and the second inner and outer side subsidiary magnetic field generation element can be installed additionally.

Preferably, the polar direction of the first inner and outer side subsidiary magnetic field generation element and the second inner and outer side subsidiary magnetic field generation element should be the opposite direction of the inner and outer side main magnetic field generation element.

In the moving element, at the upper and lower end of its coil, preferably the first magnetic material and the second magnetic material are allocated, the coil and the first and second magnetic materials forms a body. As the coil and the first and second magnetic materials are inserted inside housing of non-magnetic material, the one-bodied moving element can be performed.

In the exposed part to outside of the casing of the moving element, a guiding axis is formed extendedly, and the guiding axis of the moving element is coupled to be able to slide in the adjacent location of the casing, a guide that guides forward and backward movement of the moving element.

And, at the end of longitudinal direction movement to the path of the moving element, to prevent the moving element from hitting the casing composing the upper and lower end of the paths, preferably the first and second absorbing material should be located.

In the actuator using electromagnetic force according to an aspect of the invention, to allocate wire for providing current for the coil of the moving element moving back and forth movement in the upper and power direction, a cable bay should be installed in the one outer side of the actuator.

In the actuator using electromagnetic force according to an aspect of the invention, the actuator is composed of combined form with many units, and each moving part of the actuator combined are connected in a body and can move backward and forward like a body.

The second object of the invention is to provide an actuator using electromagnetic force that comprises, a casing that forms two paths having a certain length in longitudinal direction, between the middle wall on the longitudinal cross sectional surface; a outer main magnetic field generation element and inner main magnetic generation element that are allocated on outer and inner wall surface of the left and right paths of the casing; an outer subsidiary magnetic field generation element and an inner subsidiary magnetic field generation element that, in the both end of a outer main magnetic field generation element and inner main magnetic generation element, adjacent to the end corresponding to the direction that needs more holding force than when connected to a passive element to be driven; and a moving element that, as the middle wall is located in the center, a coil, which is bound in the orthogonal direction to longitudinal direction of the paths, is in a body that its left and right sides passes through the paths and its front and back side are exposed to outside, when forward direction or reverse direction current is provided in the coil, moves forward and backward along the longitudinal direction of the paths.

The polar of the outer main magnetic generation element and inner element is opposite of facing side between the paths, the polar of the outer subsidiary magnetic generation element and inner subsidiary element is same of facing side between the paths, when the magnetic material of the moving element is situated between the outer subsidiary magnetic generation element and inner subsidiary element, inside and outside with reference to middle of left-right direction of cross-sectional surface of the magnetic material, the magnetic flux configuring an independent magnetic field flows perpendicular to the middle part of left and right direction on the cross sectional surface of the magnetic material.

Where, the casing preferably should be made of iron core, the outer and inner side main and subsidiary magnetic field generation element should be made of permanent magnetic field.

The middle wall is formed in a cylinder at the inner center of the casing; the path is formed in a ring having co-center with the middle wall of cylinder form, the outer main magnetic generation element and inner main magnetic generation element, which are ring type having a same center with the middle wall of cylinder form and the ring-type path, are located on inner path surface and outer path surface of ring type, the moving element forms a ring type, which coil are wound in the perpendicular direction to the longitudinal direction of the inner path of the ring type between the inner main magnetic field generation element of ring type, and which magnetic material forms a ring type facing the coil, the ring type coil and ring type magnetic material are enclosed by non-magnetic material housing and forms a ring type on the whole.

The several non-magnetic rods is connected to the end of the longitudinal direction of the moving element, the non-magnetic rod passes through the casing from inside of it, and are exposed outside; the outside passive element is connected to the end of the exposed rod.

A extension part is equipped, which is extended from one side of circle of the moving part, penetrates the surface of the casing, and is exposed outside, and the passive element is connected to the extension part.

The two paths of the casing, penetrates the casing in the front-back direction, between the two paths, a middle wall is formed; the outer, inner main magnetic field generation element and the outer, inner subsidiary magnetic field generation element are allocated on inner, outer surface in the left and right direction of the paths penetrating the casing in the front-back direction; the moving element pass through the paths between the outer main/subsidiary magnetic field generation element and the inner main/subsidiary magnetic field generation element in the form of enclosing the left and right side of inner main magnetic field generation element, and its front and rear sides are exposed to the outside of the casing; the passive element is able to be connected to the exposed part of the moving element.

For providing big holding force for the opposite side of the outer subsidiary magnetic field generation element, at the opposite side of the outer subsidiary magnetic field generation element in the end of longitudinal direction of the outer main magnetic field generation element, the second outer subsidiary magnetic field generation element is allocated in addition; at the moving element, in the opposite side of the magnetic field material, the second magnetic material facing the second outer subsidiary magnetic field generation element can be allocated in addition.

For providing big holding force for the opposite side of the inner subsidiary magnetic field generation element, at the opposite side of the inner subsidiary magnetic field generation element in the end of longitudinal direction of the inner main magnetic field generation element, the second inner subsidiary magnetic field generation element is allocated in addition; at the moving element, in the opposite side of the magnetic field material, the second magnetic material facing the second inner subsidiary magnetic field generation element can be allocated in addition.

Between the outer, inner main magnetic field generation element and the outer, inner subsidiary magnetic field generation element, by separating the casing magnetically from upper side and lower side, a magnetic field air gap isolating the magnetic field from the outer, inner main magnetic field generation element and the magnetic field from the outer, inner subsidiary magnetic field generation element can be inserted.

In the magnetic field air gap, a gap holding material of non-magnetic material can be inserted.

From the opposite end side of the side of the outer, inner main magnetic field generation element and the outer, inner subsidiary magnetic field generation element, the second magnetic air gap can be formed additionally by eliminating some length of the casing in the upper and lower direction.

From the opposite end side of the side of the outer, inner main magnetic field generation element and the outer, inner subsidiary magnetic field generation element, the second magnetic air gap can be formed additionally by eliminating some length of the casing in the upper and lower direction.

For the outer, inner main magnetic field generation element and the outer, inner subsidiary magnetic field generation element, either side can be equipped between the outer side and inner side.

Meanwhile, the circuit breaker according to an aspect of the invention, the insulation actuation rod for actuating its breaking part is connected to the moving element of the actuator, and by the reciprocating motion, closing circuit motion and opening circuit motion can be performed.

DESCRIPTION OF THE DRAWINGS

FIG. 4 depicts a drawing from front side of the actuator for showing the constitution of the actuator according to the first embodiment of the invention.

FIG. 5 depicts a drawing from rear side of the actuator for showing the constitution of the actuator according to the first embodiment of the invention.

FIG. 6 depicts a separated drawing for showing the casing of the actuator, and the inner, outer side main magnetic field generation element according to the first embodiment of the invention.

FIG. 7 depicts a separated drawing for showing the constitution of the actuator coil according to the first embodiment of the invention.

FIG. 8 depicts a cross-sectional drawing showing the assembled status of the actuator according to the first embodiment of the invention.

FIG. 9 is the front view of FIG. 8.

FIG. 10 depicts a planar cross-sectional showing the assembled status of the actuator according to the first embodiment of the invention.

FIG. 11 depicts a drawing showing an example that is implemented for a actuator connectable to the passive element according to the first embodiment of the invention.

FIG. 12 is a side drawing of FIG. 11.

FIG. 13 is a planar cross-sectional drawing of FIG. 11.

FIG. 14 is a cross-sectional drawing briefly showing that the actuator is connected to the gas circuit breaker of puffer extinguishing type.

FIG. 15 is a drawing, for illustrating operation process of the actuator according to the first embodiment of the invention, showing intermediate status that the moving part is moving downside of the drawing.

FIG. 16 is a drawing, for illustrating operation process of the actuator according to the first embodiment of the invention, showing the state that the moving part has moved maximally downside of the drawing.

FIG. 17 is a drawing, for illustrating operation process of the actuator according to the first embodiment of the invention, showing the state that the moving part has moved maximally upper side of the drawing.

FIG. 18 is a drawing, for illustrating operation process of the actuator according to the first embodiment of the invention, showing the state that the moving part is maintaining balanced state in the downside of the drawing.

FIG. 19 is a drawing showing the actuator according to the second embodiment of the invention, and showing an example that several actuators are merged according to the first embodiment.

FIG. 20 is a planar cross-sectional drawing of FIG. 19.

FIG. 21 is a drawing showing the actuator according to the second embodiment of the invention, and showing another example that several actuators are merged according to the first embodiment.

FIG. 22 is a front cross-sectional drawing showing an example of the actuator according to the third embodiment.

FIG. 23 is a front cross-sectional drawing showing an example of the actuator according to the fourth embodiment.

FIG. 24 is a cross-sectional drawing showing the constitution of the actuator according to the fifth embodiment.

FIG. 25 is a cross-sectional drawing showing magnetic field distribution at the state that the moving element has moved to down side of the drawing in the example of the actuator according to the fifth embodiment.

FIG. 26 is a cross-sectional drawing showing magnetic field distribution at the state that the moving element has moved to upper side of the drawing in the example of the actuator according to the fifth embodiment.

FIG. 27 is an actuator according to the sixth embodiment of the invention, a total cross-sectional drawing showing an example that is implemented to a form that the actuator is connectable to a passive element.

FIG. 28 is a separated cross-sectional diagonal drawing.

FIG. 29 is a cross-sectional drawing briefly showing an example that the actuator is installed in the vacuum circuit breaker according to the sixth embodiment of the invention.

FIG. 30 is an actuator according to the seventh embodiment of the invention, a total cross-sectional diagonal drawing showing an example that is implemented to a form that the actuator is actually connectable to a passive element.

FIG. 31 is a separated cross-sectional diagonal drawing of FIG. 30.

FIG. 32 is a cross-sectional drawing briefly showing an example that the actuator is installed in the vacuum circuit breaker according to the seventh embodiment of the invention.

FIG. 33 depicts a diagonal drawing from front side of the actuator according to the eighth embodiment of the invention.

FIG. 34 depicts a diagonal drawing from rear side of the actuator according to the eighth embodiment of the invention.

FIG. 35 depicts a cross-sectional diagonal drawing from front side of the actuator according to the eighth embodiment of the invention.

FIG. 36 depicts a cross-sectional diagonal drawing from rear side of the actuator according to the eighth embodiment of the invention.

FIG. 37 is a cross-sectional drawing showing the constitution of the actuator according to the ninth embodiment.

FIG. 38 is a cross-sectional drawing showing magnetic field distribution at the state that the moving element has moved to down side of the drawing in the example of the actuator according to the ninth embodiment.

FIG. 39 is a cross-sectional drawing showing magnetic field distribution at the state that the moving element has moved to upper side of the drawing in the example of the actuator according to the ninth embodiment.

FIG. 40 is a cross-sectional drawing showing the actuator according to the tenth embodiment.

FIG. 41 is a cross-sectional drawing showing the actuator according to the eleventh embodiment.

FIG. 42 is a cross-sectional drawing showing the actuator according to the twelfth embodiment.

FIG. 43 is a cross-sectional drawing showing the actuator according to the thirteenth embodiment.

FIG. 44 is a cross-sectional drawing showing magnetic field distribution at the state that the moving element has moved to down side of the drawing in the example of the actuator according to the thirteenth embodiment.

DETAILED DESCRIPTION

Figure 1:
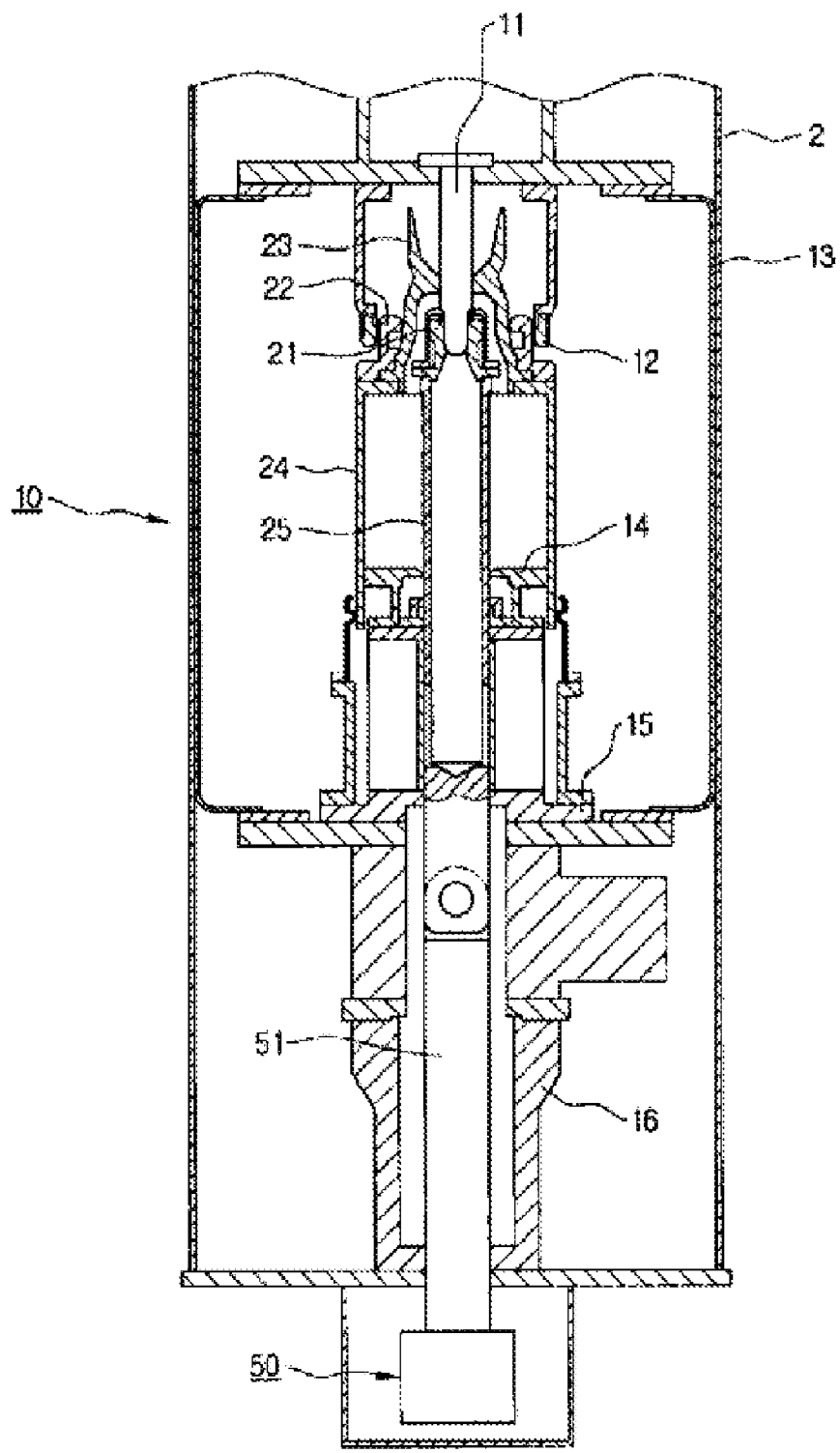
FIG. 1 depicts a cross-sectional drawing that shows a closed circuit state of the puffer extinguishing type circuit breaker of conventional circuit breakers (passive element).
Figure 2:
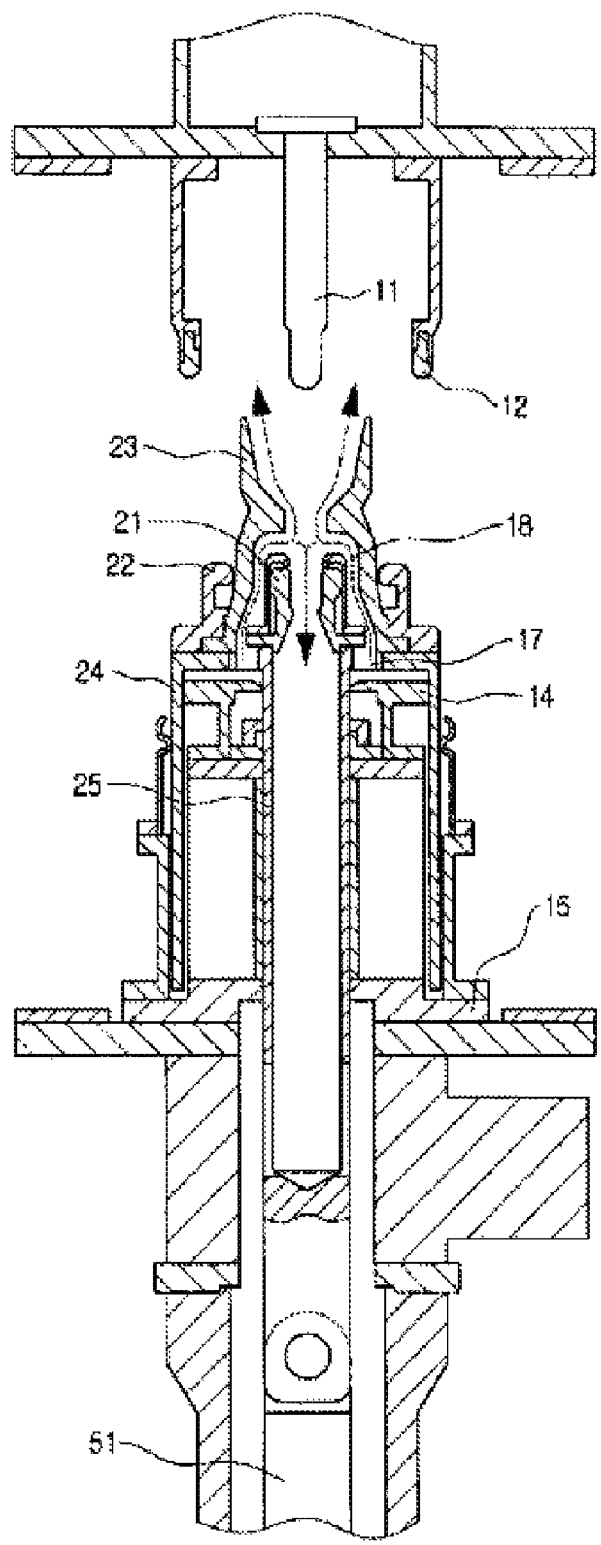
FIG. 2 depicts a magnified drawing that shows an open circuit (extinguished) state of the puffer extinguishing type circuit breaker of conventional circuit breakers (passive element).
Figure 3:
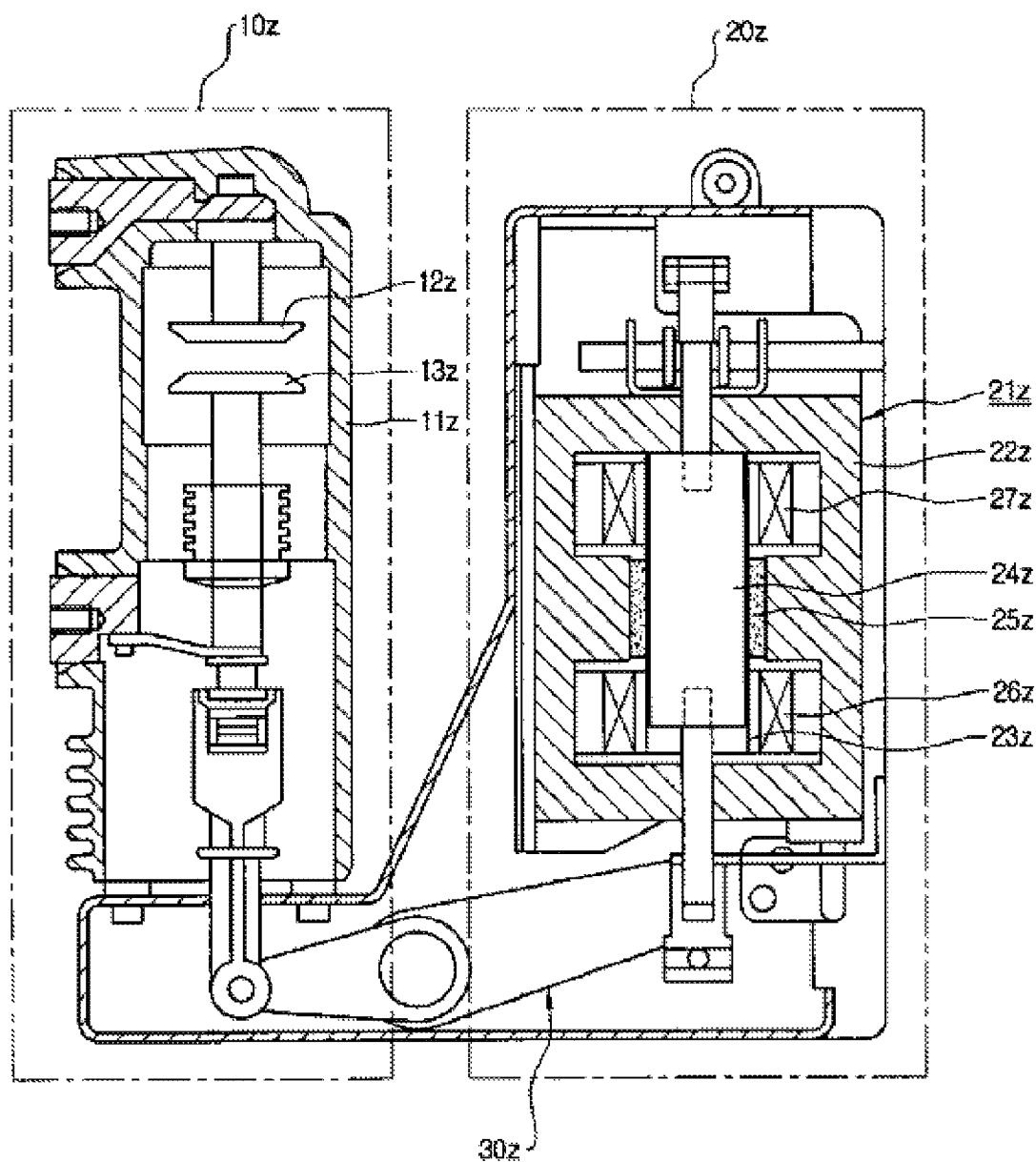
FIG. 3 depicts a cross-sectional drawing that shows a vacuum type circuit breaker and conventional permanent magnet type actuator of conventional circuit breakers (passive element).

Hereafter, embodiments of the invention are explained in more detail with reference to drawings.

Example 1

In attached FIG. 4 to FIG. 10, a constitution of an actuation is illustrated according to preferred embodiments of the invention.

As depicted in FIG. 4 to FIG. 10, EMFA (100) according to an aspect of the invention includes the casing (110). The casing (110) constitutes total outside form of the actuator. The casing (110) can be made of various materials such as iron core, plastic, etc. But, iron core is preferable in order to become a role of magnetic path. The casing (110) includes: two paths (111) penetrating in the front-back direction, having a certain length in the upper and lower direction; a middle wall (112) that is formed in the middle by the paths (111) that penetrates the two. In the embodiment in the drawings, the casing (110) is illustrated in planar type form of hexagonal, but is not confined to the form in the drawings, and can be various forms such as side of cylinder is opened.

And on the both sides of the paths (111) formed in the casing (110), the outer main magnetic field generation element (200) and the inner main magnetic field generation element (300) are allocated. The inner, outer main magnetic field generation element (200, 300) can be composed of permanent magnet and electro magnet. Permanent magnet is preferable to simplify and reduce out-of order.

Where, the outer main magnetic field generation element (200) or the inner main magnetic field generation element (300) is installed optionally. That will be explained as another embodiment of the invention according to FIG. 22 and FIG. 23.

And, at the two paths (111) of the casing (110), the moving element (400) is allocated as a form that is movable of sliding reciprocating movement in the longitudinal direction (upper and lower side in the drawing). To the moving element (400), the middle is located between, the coil (410), which is wound in the perpendicular direction to the longitudinal direction of the direction that is perpendicular to the outer main magnetic field generation element (200) and inner main magnetic field generation element (300), forms a body. Therefore, when forward or reverse current is applied to the coil (410), by the magnetic field of the outer and inner main magnetic field generation element (200) (300) and the electromagnetic repulsion from current density of the coil (410), the coil (410) and moving part (400) moves in a body to the longitudinal direction (in the drawing, upper and lower direction) of the paths (111).

The moving element (400), as in FIG. 6 and FIG. 8, by allocation the first magnetic material (420) and the second magnetic material (430) at the upper side and lower side of its coil respectively, can be integrated with the coil (410). That can be implemented in the form of having the coil (410) and the first, second magnetic material (420, 430) buried inside of the housing of the magnetic material. That can be easily implemented by the method of placing the coil (410) and the first, second magnetic material (420, 430) in the middle, and molding the outside.

And, at the each end of the outer and inner main magnetic field generation element (200) (300) (the upper and lower ends in the figure), the first outer and inner subsidiary magnetic field generation element (500, 600) and the second outer and inner subsidiary magnetic field generation element (550, 650) can be allocated.

Where, the polarities of the first outer and inner subsidiary magnetic field generation element (500, 600) and the second outer and inner subsidiary magnetic field generation element (550, 650) are opposite to those of the outer main magnetic field generation element (200) and the inner main magnetic field generation element (300) (FIG. 8). In the situation, the direction of magnetic flux of the first outer and inner subsidiary magnetic field generation element (500, 600) and the direction of magnetic flux of the second outer and inner subsidiary magnetic field generation element (550, 650) are opposite to those of the outer main magnetic field generation element (200) and the inner main magnetic field generation element (300). By doing this, when the moving element (400) moves upward in the figure, the first magnetic material (420) is held by the magnetic field of the first outer and inner subsidiary magnetic field generation element (500, 600). By this, even though supply of current for the coil (410) is cut off, the state that the moving element (400) has moved to the upper side can be maintained. In the same way, when the moving element (400) moves downward in the figure, the second magnetic material (430) is held by the magnetic field of the second outer and inner subsidiary magnetic field generation element (550, 650). Therefore, even though supply of current for the coil (410) is cut off, the state that the moving element (400) has moved to the lower side can be maintained. The size (height) of first, second magnetic material (420, 430) can be different according to the holding force that the passive element such as the circuit breaker needs. For example, that can be differentiated according to the difference between the holding force for holding continuously the closed state of the circuit breaker and the holding force necessary for continuously holding the open state of the circuit breaker.

And, according to preferred embodiment of the invention, at the one side of the moving element (400) exposed to the outside of the casing (110), the guiding axis (450) can extendedly formed (FIG. 5 and FIG. 10). And, at the adjacent point of the casing (110), as the guiding axis (450) of the moving element (400) is put together to be able to slide, the guide (700) guiding the movement of the moving element (400) can be installed. The guiding axis (450) moves according to the guiding groove formed in the guide (700). By the structure that the reciprocating movement of the moving element (400) is guided by the guiding axis (450) and the guide (700), the left and right shaking of the moving element (400) is pre-vented. For this reason, without the problem that the moving element (400) cause losses by contacting to the side wall of the paths (111) or the outer, inner main magnetic field generation element (200, 300), the moving element (400) can move stably and precisely. As depicted in the embodiment of FIG. 10, there can be a structure that the guiding axis (450) and the guide (700) are guided by an axis of planar type and guiding groove. But, in the invention, it is not confined to these kinds of forms. For example, publicly known, dove tail guiding structure or linear movement guide, etc, can be applied. And, when the moving locus of the moving element (400) can be a nonlinear (e.g. arc), in this case, guiding structure of the moving element (400) is to be nonlinear.

According to preferred embodiment of the invention, in order that the moving element (400) should not collide to the casing (110) composing the upper and lower end of the paths (111) at the end of the longitudinal movement to the paths (111), the first and second absorbing material (811, 812) can be installed at the upper and lower end of the paths (111). In the embodiment depicted in the figure, the first, second absorbing materials (811, 812) are made of compressed coil spring. But it is not confined to this in the invention, shock attenuating means such as air pressure or oil pressure dampers, etc, can be applicable. And as embodiment in the figure, instead of installing at the end of inside of the paths (111) of the casing (110), it can be installed at the upper and lower side of the moving element (400), and installed outside of the casing (110).

In the FIG. 11 to FIG. 14, there are figures that shows an preferred example that EMFA according to an aspect of the invention is formed to be connectable to an outside passive element such as a circuit breaker.

As explained above, EMFA (100) according to an aspect of the invention drives the outside passive part such as a circuit breaker by the moving element (400) with the coil (410) moving up and down. Where to connect the moving element (400) to the circuit breaker, etc, it 될good to connect the moving element (400) to the circuit breaker directly, as depicted in FIG. 11 to FIG. 13, after fixing additional supporting frame (460) of nonmagnetic material, at the supporting frame (46), a connecting part (461) can be installed for connecting to a connection part such as the insulation actuating rod (25, FIG. 14) of the circuit breaker.

Where, by putting the supporting frame together to the casing (110) by the sliding guidance apparatus (462, 463), it can be constituted for the movement of the supporting frame to be stable.

And extending the rear end of the casing (110), the guide (700) can be replaced by forming the guiding groove (710) at the extended part for guiding the guiding axis (450) of the moving element (400).

And in the embodiment, for wiring to provide current from the outside to the coil (410) of the moving element (400), it is preferable to install a cable veyor (910) well-known at the outside of the EMFA. The cable veyor (910) can follow up the up and down movement of the supporting frame (460), one end of which is fixed to extra bracket (920), and the other end of which is fixed to the supporting frame (460). In the embodiment of the invention, the wire (900) extended from the outside power supply device is installed on the cable veyor (910), penetrates the supporting frame (460), and is connected to the coil (410) of the moving element (400). As such, the reason being able to use the cable veyor (460), the actuator (100) according to an aspect of the invention, the paths penetrating from front to rear side in the casing (110), has constitution of the moving part (400) with the coil (410) is exposed to the outside. Therefore, even though the cable veyor (910) is not used, wiring from the outside is easier. Especially, when the cable veyor (910) is applied, the wire (900) is more convenient and standing in line, and it has an advantage that the moving element (400) and the supporting frame (460) can move naturally. Contrast to this, conventionally, as the oil is allocated inside of outer cylinder enclosed from the outside, it is not easy to wire the inside of the outer side. Additionally, the wired line has many problems such as disconnection by fatigue from repeating compression and stretching. This problem can be solved by the constitution that the moving element (400) is exposed to the outside, as explained above, constituting the form that the paths penetrates from front to rear side, and having the coil (410) and the moving element (400) located at the paths (111) penetrated from front to rear side.

And, in the FIG. 14, the state that EMFA (100) is connected to the circuit breaker, that is, the circuit breaker having EMFA (100) according to an aspect of the invention is depicted. The circuit breaker depicted in FIG. 14 is different from the circuit breaker just in the actuator, and same constitution in the other parts. FIG. 14 shows when the circuit breaker remains closed circuit.

As shown in FIG. 14, in the circuit breaker according the embodiment, an acting rod (60) is connected to the insulation actuation rod (25) of the breaker; the acting rod (60) is connected to the connecting axis (461) that is formed at the supporting frame of the actuator (100). In case that the supporting frame (460) is not prepared in the moving element (400), the acting rod (60) can be connected directly to the moving element (400).

By this connecting structure, the insulation actuation rod (25) performs a closing action and opening action by being driven by the up-down movement of the supporting frame (460), that is, the up-down movement of the moving element (400).

General characteristics of the EMFA are as described in the background technology of the invention. That is, EMFA is a new form of an actuator using the electromagnetic force that has the moving element (400) with the coil (410) move coming and going, applying the left-hand rule of Fleming, by the magnetic field of the magnetic field generation element (200, 300) and electromagnetic repulsion by current density of the coil (410). That is, when forward and reverse current are applied to the coil (410), the force that has the coil (410) move up and down by the magnetic field of the magnetic field generation element (200, 300) and electromagnetic repulsion by current density of the coil (410). Then, as the moving element (450) the coil (410) is integrated with moves up and down, it drives the outside operation element like a circuit breaker connected to the actuator (450).

Meanwhile, as described above, EMFA according to an aspect of the invention has a principle that gives the coil (410) force moving in axis direction by flowing current in the coil (410) in the right angle of the magnetic field, which is located in the space where the magnetic field according to the magnetic field generation elements (200, 300).

General EMFA (100) described in the background technology of the invention, as it is a system that the moving element moves by the magnetic force that is generated from a magnetic field generation element like a permanent magnet and a magnetic field force from current of a coil, not only should be made the paths where magnetic flux flows as a magnetic material, the moving element driven should be made as a magnetic field material.

Therefore, in PMA, for getting more actuation force, more current should be applied to a coil, more than a certain level of actuation force can not be achieved even though the current is increased continuously because of saturation of magnetic material. To solve that kind of problem, as the size of the magnetic material should be big, the actuator should be too big, as magnetic field density induced by the permanent magnet and coil current is inversely proportional to square of gap length, it has limit to be applied to a circuit breaker for high and ultra high voltage, which has long gap of the circuit breaker.

But the left-hand rule of Fleming is applied; EMFA has principle of getting force, that is, current is applied to the perpendicular direction to magnetic field.

In the conventional PMA, magnetic field has saturation problem of magnetic material as described above, magnetic field density is largely influenced by gap length. But EMFA uses the electromagnetic force that has the moving element (400) with the coil (410) move coming and going, applying the left-hand rule of Fleming, by the magnetic field of the magnetic field generation element (200, 300) and electromagnetic repulsion by current density of the coil (410). That is, when forward and reverse current are applied to the coil (410), the force that has the coil (410) move up and down by the magnetic field of the magnetic field generation element (200, 300) and electromagnetic repulsion by current density of the coil (410). So, the more current is applied to the coil (410), the more force can be earned.

Therefore, the EMFA (100) don't use the force that the electromagnetic force generated from magnetic field induced by current of the coil (410), but uses the electromagnetic repulsion force by outer magnetic field density and current density in the coil region (410). So, without considering the saturation problem of magnetic material within electromagnetic force, as just if having many wind of the coil (410), and increasing intensity of current, much bigger actuation force can be earned, the size and weight of the actuator can be reduced enormously. In other words, compared to size and weight, much bigger actuation force can be earned.

Meanwhile, conventional PMA should have enough magnetic field density in the gap. Since the magnetic field density is reversely proportional to square of the distance of the gap, to have enough magnetic field density, a lot of current should be applied to the coil. Therefore, response, that is, initial operation speed is slow. But, the actuator according to an aspect of the invention has fast and forceful initial speed, because, at the instance that current is applied to the coil (410), electromagnetic force is generated at the same time.

The EMFA according to an aspect of the invention has the paths (111) that penetrate the casing in front-to-rear direction. So, in order that the one part of the moving element (400) is exposed to the outside, as outer operation element such as a circuit breaker is connected to the moving element exposed outside, the size (height) of the actuator can be reduced remarkably. And, as the moving element (400) has structure that the moving element (400) is guided by the guiding axis (450) and the guide (700), operation is stable. And the connecting axis and moving axis is not necessary, consideration to its rigidity is not necessary.

And, conventional EMFA has a cylindrical type of the inner and outer main, subsidiary magnetic field generation element. But it is not easy to make the magnetic field generation element as one cylinder, so, actually, it is made in several pieces and put together inside of the casing.

But the EMFA according to an aspect of the invention, the casing and every magnetic material generation element can be constituted in planar type; fabrication and structure of it are simple.

The operation process of the EMFA according to an aspect of the invention is explained with referenced to FIG. 15 to FIG. 18. The explanation of characteristics of the EMFA is applied as the circuit breaker in FIG. 14.

FIG. 15 shows that the moving element (400) moves maximally to the first outer and inner subsidiary magnetic field generation element, that is, the upper side of the figure. In the down side, as the operation rod (60, FIG. 14) is pushed maximally by the moving element (400), the circuit breaker is maintained in closing circuit state.

Where, the direction of the magnetic flux of the outer, inner main magnetic field generation element is denoted as arrow m1, the direction of the magnetic flux of the second outer, inner subsidiary magnetic field generation element is denoted as arrow m2, and the direction of the magnetic flux of the first outer, inner subsidiary magnetic field generation element is denoted as arrow m3. As depicted in FIG. 15, when the moving element (400) moves upward and the breaker maintains a closed state, supply of current is cut off in the coil (410) of the moving element (400). The first magnetic material (420) is as a roll of flowing path for magnetic flux of the outer, inner main magnetic field generation element and the magnetic flux of the first outer, inner subsidiary magnetic field generation element. At the same time, as the first magnetic material (420) is sided to the first outer, inner subsidiary magnetic field generation element, the magnetic force due to the first outer, inner subsidiary magnetic field generation element reaches to the first magnetic material (420). This force works as holding force that holds the first magnetic material (420), and the moving element (400) maintains state of being moved to upper side of the drawing. Therefore, the circuit breaker can maintain the closed state continuously. As a result, the first outer, inner subsidiary magnetic field generation element (500, 600) and the first magnetic material (420) of the moving element (400) provides current for the coil (410), or works as a role that rocks the moving element (400) without additional rocking apparatus.

And, in the above state, the moving element (400) can not go up more than a certain level due to elastic recovering force of the first absorbing material (811), and is stopped to the point that the holding force by the first outer, inner subsidiary magnetic field generation element (500, 600) and the elastic recovering force by the first magnetic material (420) are in equilibrium.

In the state, when abnormal state occurs in the power transmission system, current is supplied to the coil (410) to open the circuit of the circuit breaker. Then, due to the magnetic field of the magnetic field generation element (200, 300) and electromagnetic repulsion by current density of the coil (410), repulsion (downward force in the figure or axis-direction force) works to the coil (410), and it moves downward. In the situation, the current to be provided in the coil (410) is provided enough to overcome the holding force that holds the first magnetic material (420) by the first outer, inner subsidiary magnetic field generation element (500, 600) in the closed circuit state.

Like this, the moving element (400) moves downward to the location depicted in FIG. 16, as the repulsion force worked to the coil (410) and axis-direction movement force by inertia that the moving element (400) moves, is much greater than the force that pulls the first magnetic material (420) upward, the moving element (400) can proceed downward continuously.

As the force that the second outer, inner subsidiary magnetic field generation element (550, 560) attracts downward the second magnetic material (430) is increasingly bigger, the moving element (400) is forced more and accelerated. This time is when EMFA (100) is generating most powerful force. So, it is desirable to design in order that this time is coincident to the time that gas repulsion force at the contact point of a circuit breaker (in FIG. 14, the force that pulls the popper cylinder (24) against the direction of the fixed piston (14)) is maximized.

Like this, when the speed of the moving element (400) is increasing, and the moving element (400) has passed the point depicted in FIG. 16, current that is supplied to the coil (410) is shut off promptly. Then, the moving element (400) is moved only by the inertia and the force that the second outer, inner subsidiary magnetic field generation element (550, 560) attracts downward.

Then, when the moving element (400) has gone down to the position of FIG. 17, the second outer, inner subsidiary magnetic field generation element (550, 560) repulse the second magnetic material (430) in reverse direction (upward) of moving. That is, after the second magnetic element (430) of the moving element (400) has been passing the middle point of axis direction of the second outer, inner subsidiary magnetic field generation element (550, 560), the force that is opposite direction of movement of the moving element (400) is generated and starts to damp the moving element (400). At this point, the open circuit operation at the contacting point of the circuit breaker has completed, the more the damping force is, the less the problem that the lower point of the moving element (400) is run against the inner end point of path (111) of the casing (110) happens, so mechanical stability can be achieved. But, actually, the moving element (400) is designed to move in speed of more than 6 m/s, the moving element (400) can have passed the second outer, inner subsidiary magnetic field generation element (550, 560) and collided against the casing (110). In this situation, by the second absorbing material (812), the moving element (400) can be decelerated stably.

At the end of operation the moving element (400) is moving downward, commonly, the force that pushes the moving element (400) in the opposite direction of movement by the second absorbing material (812) and the second outer, inner subsidiary magnetic field generation element (550, 560) is greater than the holding force that holds the second magnetic material (430) by the second outer, inner subsidiary magnetic field generation element (550, 560).

Then, as depicted in FIG. 18, the moving element (400), the moving element (400) moves up by the force of restitution of the second absorbing material. Conclusively, the moving element (400) becomes stop to the point that the elasticity restitution force of the second absorbing material (812) and the holding force of the second magnetic material (430) by the second outer, inner subsidiary magnetic field generation element (550, 560) are equaled. This time is that opening circuit of a circuit breaker has completed.

Example 2

Attached FIG. 19 to FIG. 21 are depicted to show EMFA according to the second embodiment of the invention, and shows examples merging some EMFAs according to the first embodiment of the invention. This shows that by combination of several actuators, a form of combination having unitary movement can be performed.

In this case, the moving element (400), not depicted in the figures, is constituted to be connected in a body by a separate rod and to move as a body. The unitary body connection form of the moving element (400), as explained in FIG. 11 to FIG. 13, can be applied to a supporting material like a supporting frame (460) to be expanded appropriate to the whole moving element (400).

The front actuator, in addition, can share the guide (700*a*) with the corresponding back actuator. In this case, instead of that the actuators (100*a*)(100*b*) are allocated adjacent to side of several actuators, as depicted in the figures, each actuator (100*a*)(100*b*) can be equipped with a big magnetic material, in which several paths (111) are equipped to install several actuators in each magnetic material (110*a*). And, the guide (700*a*) can be constructed with one-bodied frame (in the figure, that is constructed in a separate frame), where several guiding home (710) that guides the actuator (400) is constructed.

Like this, merging several actuators makes increment of actuation force according as the number of actuator is increased.

Example 3

FIG. 22 shows EMFA according to the third embodiment of the invention.

The EMFA depicted in FIG. 22 is a form that, in the actuator (100) according to the first embodiment disclosed in FIG. 4 to FIG. 10, just the outer main magnetic field generation element (200) and the first, second outer subsidiary magnetic field generation element (500, 550) is installed and the inner main magnetic field generation element (200) and the first, second inner subsidiary magnetic field generation element (500, 550) are absent. Like this, even though the inner main magnetic field generation element (200) and the first, second inner subsidiary magnetic field generation element (500, 550) are absented, by having the magnetic field of the outer main magnetic field generation element (200) reach the middle wall (112) of the casing (110), the moving element (400) can be moved by the force. Still, assuming that the size of the actuator is same, the actuation force (the electromagnetic force or axis-direction force) produced by the coil (400) is smaller than when the inner main magnetic field generation element (300) is along with it.

Example 4

In FIG. 23, the EMFA according to the fourth embodiment of the invention is depicted.

This shows that, instead of the EMFA depicted in FIG. 22, the inner main magnetic field generation element (200) and the first, second inner subsidiary magnetic field generation element (500, 550) is installed and the outer main magnetic field generation element (200) and the first, second outer subsidiary magnetic field generation element (500, 550) are absent. Like this, even though the outer main magnetic field generation element (200) and the first, second outer subsidiary magnetic field generation element (500, 550) are absented, by having the magnetic field of the inner main magnetic field generation element (200) reach the middle wall (112) of the casing (110), the moving element (400) can be moved by the force.

In addition, the embodiment shows that upper and lower absorbing frame (811, 812: FIG. 22) are not equipped. In case that an absorbing frame is not equipped, additional shock-attenuation means can be installed at the part of guide (450) of the moving element (400).

Example 5

In FIG. 24, a cross-sectional drawing that shows EMFA according to the fifth embodiment of the invention is depicted.

As shown in FIG. 24, the casing (1110) in the EMFA according to an aspect of the invention has a form that the path (1112) which has a predetermined length in vertical direction at its left and right sides, and a middle wall inside of vertical cross-section is located in the middle, which forms whole outer figure of the actuator.

On the outer and inner surface of vertical cross-section of the left and right paths (1112), the outer main magnetic field generation element (1210) and the inner main magnetic field generation element (1220) are allocated. And on the outer or inner surface of longitudinal direction ends (vertical direction) of the outer main magnetic field generation element (1210) and the inner main magnetic field generation element (1220), respectively the outer subsidiary magnetic field generation element (1310) and the inner subsidiary magnetic field generation element (1320).

Where, the outer main magnetic field generation element (1210), the inner main magnetic field generation element (1220) and the outer subsidiary magnetic field generation element (1310), the inner subsidiary magnetic field generation element (1320) can be allocated either side. That is, just the outer main magnetic field generation element (1210) and the outer subsidiary magnetic field generation element (1310) can be installed or the inner main magnetic field generation element (1220) and the inner subsidiary magnetic field generation element (1320) can be installed. That will be explained later in another embodiment.

The moving element (1400) is inserted inside paths (1112) between the outer main/subsidiary magnetic field generation element (1210/1310) and the inner main/subsidiary magnetic field generation element (1220/1320) to be able to move linearly. The moving element (1400), in the center of which the left and right side inner main magnetic field generation element (1220) are located, forms in a body with the coil (1410) that is wound inside of the paths (1112) in the perpendicular direction of the outer main magnetic field generation element (1210) and the inner main magnetic field generation element (1220), and with the magnetic material (1420) that is forced by magnetic field of the outer and inner subsidiary magnetic field generation element (1310/1320).

Where, the polarity of the outer main magnetic field generation element (1210) and the inner main magnetic field generation element (1220) is opposite between paths (1112), direction of magnetic flux is formed to cross the paths (1112). In FIG. 24, as the polarity of the outer main magnetic field generation element (1210) is N pole and polarity of the inner main magnetic field generation element (1220) is S, magnetic flux is flowing from the outer main magnetic field generation element (1210) to the inner main magnetic field generation element (1220), that is, from outside to inside in the left-right direction. Contrary to that, the polarity of the outer main magnetic field generation element (1210) is S pole and polarity of the inner main magnetic field generation element (1220) is N, magnetic flux is flowing from the inner main magnetic field generation element (1210) to the outer main magnetic field generation element (1220), that is, from inside to outside in the left-right direction. That can be achieved by reversing direction of current of the coil (1410).

By that structure, when forward or reverse direction of current flows in the coil (1410) of the moving element (1400), by electromagnetic force by magnetic field from the inner main magnetic field generation element (1210) and the outer main magnetic field generation element (1220), and by current intensity of the coil (1410), force that has the coil move in perpendicular direction of magnetic flux is excited, and the moving element (1400) with the coil (1410) moves linearly in the longitudinal direction (vertical direction) of paths (1112).

In the moving element (1400), a method that the coil (1410) and the magnetic material (1420) is formed in a body, as depicted in FIG. 24, can be implemented as a form that the coil (1410) and the magnetic material (1420) are reclaimed inside of housing (1430) of the magnetic material. That can be achieved easily by a method of molding the coil (1410) and the magnetic material (1420) and forming the housing (1430).

Where, the polarity of the outer subsidiary magnetic field generation element (1310) and the inner subsidiary magnetic field generation element (1320) is same. In FIG. 24, as the facing polarity of the outer subsidiary magnetic field generation element (1310) and the inner main magnetic field generation element (1320) can be all N.

Then, in case that the facing polarity of the outer subsidiary magnetic field generation element (1310) and the inner main magnetic field generation element (1320) is same, magnetic flux cannot flow through the paths (1112) between the outer subsidiary magnetic field generation element (1310) and the inner subsidiary magnetic field generation element (1220). In FIG. 24, the magnetic material (1420) of the moving element (1400) is located between the outer subsidiary magnetic field generation element (1310) and the inner main magnetic field generation element (1320), each independent magnetic field is formed in left and right side in the middle of cross section of the magnetic material (1420). As depicted in FIG. 24, in case that facing polarity of the outer subsidiary magnetic field generation element (1310) and the inner subsidiary magnetic field generation element (1320) is S, magnetic field (m2) formed outside of cross section of magnetic material (1420) circulates through the outer subsidiary magnetic field generation element (1310)->casing (1110)->the magnetic material of the moving element (1400)->the outer subsidiary magnetic field generation element (1310). And magnetic field (m2) formed inside of cross section of magnetic material (1420) circulates through the inner subsidiary magnetic field generation element (1320)->casing (1110)->the magnetic material of the moving element (1400)->the inner subsidiary magnetic field generation element (1320). When the facing polarity of the outer subsidiary magnetic field generation element (1310) and the inner main magnetic field generation element (1320) can be all N, direction of magnetic flux is opposite of it.

In case that the facing polarity of the outer subsidiary magnetic field generation element (1310) and the inner main magnetic field generation element (1320) is not same, but opposite, magnetic field formed in left and right side in the middle of cross section of the magnetic material (1420) is not independent, a big magnetic flow is formed. In this case, there is little force that has the magnetic material (1420) move to the direction of its movement (downward in FIG. 24), the force that has the magnetic material (1420) located in the middle of the outer and inner main magnetic field generation element (1210) (1220) is most of it.

But, as illustrated above, as the facing polarity of the outer subsidiary magnetic field generation element (1310) and the inner main magnetic field generation element (1320) is same, magnetic field formed in left and right side in the middle of cross section of the magnetic material (1420) is independent. Therefore, magnetic field flows (m2, m3) have perpendicular directions in the left and right hand side on cross section surface of the magnetic material (1420), the force that pulls further toward movement (upper direction in FIG. 24), not the force that has the magnetic material (1420) located in the middle of the outer and inner main magnetic field generation element (1210) (1220). In addition, if magnetic field formed in left and right side in the middle of cross section of the magnetic material (1420) is independent, path length of the magnetic flux (m2, m3) can be shorter; the force that attracts the magnetic material (1420) can be powerful as such. Like this, the force that pulls the magnetic material (1420) becomes holding force that holds a state that the moving element (1400) has moved, and it becomes a pressure when it is applied to a passive element like a circuit breaker.

In the mean time, as the EMFA (1100) depicted in FIG. 24 needs to have holding force toward upper direction of the figure, the outer subsidiary magnetic field generation element (1310), the inner main magnetic field generation element (1320), and the magnetic material (1420) are depicted in the upper side. So, if big holding force is necessary in both upper and lower directions, the outer subsidiary magnetic field generation element (1310), the inner main magnetic field generation element (1320), and the magnetic material (1420) need to located in upper and lower directions.

The operation procedure of the EMFA according to the fifth embodiment according to an aspect of the invention is going to be explained.

In FIGS. 25 and 26, a brief cross-sectional figure that shows the result of simulation over the magnetic field distribution according to operation location of the actuator using electromagnetic force according to the fifth embodiment of the invention is depicted.

First, in FIG. 8a, the state that the moving element (1400) has moved to the maximum downward direction is depicted. When the moving element (1400) is maximally moved upward and current is supplied to the coil (1410) of the moving element (1400) to move downward, by electromagnetic force by magnetic field from the inner main magnetic field generation element (1210) and the outer main magnetic field generation element (1220), and by current intensity of the coil (1410), force that has the coil move in perpendicular direction of magnetic flux is excited, and the moving element (1400) with the coil (1410) is moved toward downward direction and becomes the state in FIG. 25. In this time, the force that has the coil (1410) move downward is sufficiently bigger than the holding force that holds the magnetic material (1420) of the moving element (1410).

In this situation, when the moving element has moved downward maximally, current supplied to the coil (1410) is shut off. When current shut off, moving force by operation of the coil and the outer and inner main magnetic field generation element (1210) disappears, the force by magnetic field from the inner main magnetic field generation element (1210) and the outer main magnetic field generation element (1220) influences the magnetic material (1420) of the moving element (1400). This force works as holding force that holds the magnetic material (1420) and the moving element (1400) can stay the downward moved state continuously. In FIG. 25, the magnetic material (1420) of the moving element (1400) is located upper to the middle point of longitudinal direction of the outer main magnetic field generation element (1210) and the inner main magnetic field generation element (1220). Where, the magnetic material (1420) is forced to be located in the middle of longitudinal direction of the outer main magnetic field generation element (1210) and the inner main magnetic field generation element (1220). Therefore, as in FIG. 25, when the moving element (1400) has moved maximally downward, when the magnetic material (1420) of the moving element (1400) is set to be located upper to the middle point of longitudinal direction of the outer main magnetic field generation element (1210) and the inner main magnetic field generation element (1220), the magnetic material (1420) is forced to be located in the middle of longitudinal direction of the outer main magnetic field generation element (1210) and the inner main magnetic field generation element (1220).

FIG. 26 depicts that the moving element (1400) has moved upward maximally. When the moving element is located downside maximally, current is supplied to the coil (1410) of the moving element (1400) in the opposite direction, by electromagnetic force by magnetic field from the inner main magnetic field generation element (1210) and the outer main magnetic field generation element (1220), and by current intensity of the coil (1410), force that has the coil move in perpendicular direction of magnetic flux is excited, and the moving element (1400) with the coil (1410) is moved toward upward direction. In this time, when the moving element has moved upside maximally, current supplied to the coil (1410) is shut off.

Therefore, in the state that the moving element (1400) has moved upward maximally, magnetic field formed in left and right side in the middle of cross section of the magnetic material (1420) is independent, path length of the magnetic flux (m2, m3) can be shorter; the force that attracts the magnetic material (1420) can be powerful as such. Like this, the force that pulls the magnetic material (1420) becomes holding force that holds a state that the moving element (1400) has moved, and it becomes a pressure when it is applied to a passive element like a circuit breaker.

Example 6

FIG. 27 to 29 illustrates an example that shows a form for EMFA to be able to connect to a passive element; FIG. 27 is a total cross-sectional drawing; FIG. 28 is a separated cross-sectional diagonal drawing; FIG. 29 is a cross-sectional drawing briefly showing an example that the actuator is installed in the vacuum circuit breaker.

The actuator in FIGS. 27 and 28 has the EMFA according to the sixth embodiment of the invention as a basic element, a total cross-sectional drawing showing an example that is implemented to a form that the actuator is connectable to a passive element.

As depicted in FIGS. 27 and 28, the EMFA according to the sixth embodiment is constructed in cylindrical form in the actuator (1100) according to the fifth embodiment. That is, the outer/inner main magnetic field generation element (1210, 1220) and the outer/inner subsidiary magnetic field generation element (1310, 1320), and the moving element is formed in a cylinder.

Where, outer figure of the casing (1110a) has not any limitation. So besides cylindrical form, that can be hexagonal.

The middle wall (1111a) is formed in a column in the center of the casing (1110a). The paths (1112a) are formed in a ring that has co-center with the middle wall (1111a) with cylindrical form and has a certain width in radius direction. The outer/inner main magnetic field generation element (1210, 1220) is forms of a ring that has co-center and is located outside and inside surface of the ring type paths (1112a).

In the moving element, the coil (1410a), the ring type inner main magnetic field generation element (1220a) is situated in the middle, is a ring type wound in the perpendicular direction of the outer and inner main magnetic field generation element (1210a) (1220a). The magnetic material (1420a) is formed in ring type like the coil (1420a). This coil (1410a) and the magnetic material (1420a) constitute a moving element that is enclosed with housing (1430a) of nonmagnetic material. The moving element is inserted to be able to move in the longitudinal direction (vertical direction) slide in the inside of paths (1112a) formed between the outer and inner main magnetic field generation element (1210a) (1220a) and the outer and inner subsidiary magnetic field generation element (1310a) (1320a).

In FIG. 27, to connect the moving element (1400a) to the outer passive element, the one end of the moving element (1400a) (upper side of the figure) is connected to several nonmagnetic rods (1511), and the end of the rods projected upper outside of the casing (1110a) is connected to a passive element. The several rods (1511) can be connected directly to the passive element, or as depicted in the figure, connecting plane is formed at the end of the rod (1511), the connecting part (1512a) is formed at the connecting plane (1521), a hole (1521b) is formed in the connecting part (1512a), and the hole (1521b) of the connecting part (1512a) can be connected with a passive element by method of pin-joint.

And, the opposite side of the moving element (1400a) can be connected to other passive element or an operation device of a passive element. To that end, as depicted in FIG. 27, it can be constructed in structure of connecting the rod of nonmagnetic material or forming the connection plane (1522) at the rod (1512). In the upper and lower sides of the casing (1110a), the penetration holes (1113a) (1113b) are formed and the rods (1511) (1512) can be penetrated to the penetration holes (1113a) (1113b).

Explanation of the operation process and magnetic field distribution is omitted because it is same as that of EMFA according to the fifth embodiment.

FIG. 29 shows that the EMFA (1100a) is applied to a vacuum circuit breaker, which is a passive element. The EMFA according to the embodiment, as explained in the fifth embodiment, can be connected directly to a passive element without additional magnifying force devices, as it has very big holding force when the moving element (1400a) moves completely. Therefore, the housing part (2a) of the actuator (20z-1) can be installed right behind contacting part (10z) and, because the size of the EMFA (1100a) is small, the whole size of the system can be reduced.

And, the EMFA (1100a) has the subsidiary magnetic field generation element (1310a) (1320a) and the magnetic material (1420a), and has maximum holding force when the magnetic material (1420a) is moved at the upper side, when the subsidiary magnetic field generation element (1310a) (1320a) and the magnetic material (1420a) move upward, the connecting part (1520a) can be connected directly to the end of actuation rod of the movable contacting part (13z) by means of the connecting pin (1523).

When the moving element of the EMFA (1100a) has moved to upper side, the movable contacting parts (13z) is attached to the fixed contacting part (12z) and maintain closed circuit current flows. In this closed circuit state, to flow current like a conductor, pressure that presses the two contacting parts (12z) (13z) should be big. In the invention, when the motion of the moving element (1400a) has completed, as the moving element is pulled with very big force, pressure between two contacting part (12z) (13z) can be maximized and current flows well and the contacting parts do not be separate even when severe shock from out side like earthquake is transferred.

Example 7

FIG. 30 to 32 shows another example that the EMFA according to the third embodiment and base on the fifth embodiment can be connected to a passive element. FIG. 30 is, a total cross-sectional diagonal, FIG. 31 is a separated cross-sectional diagonal drawing, and FIG. 32 is a cross-sectional drawing.

As depicted in FIGS. 30 and 31, the EMFA (1100b) according to the embodiment is the same type of cylindrical form according to the sixth embodiment, just connecting structure with outer passive element and guiding structure of the moving element (1400b) are different form that.

That is, the casing (1110b), the outer/inner main magnetic field generation element (1210, 1220) and the outer/inner subsidiary magnetic field generation element (1310, 1320), and the moving element (1400b) have the same structures as the sixth embodiment.

The structure to connect the moving element (1400b) to outer passive element is the one that, whereas in the sixth embodiment, several rods of nonmagnetic material are connected to the end of the moving element (1400a), in this embodiment, a extension part that is extended from one radius side of the moving element (1400b) to outer side of the radius. Furthermore, a projected part (1432) that is extended in moving direction of the moving element (1400b) is formed at the extended part (1431), a hole is formed at the projected part (1432), and the hole (1432a) in the projected part (1432) can be connected to passive element by means of pin joint.

To penetrate the extended part (1431) from the moving element (1400b), in peripheral side of the outer/inner subsidiary magnetic field generation element (1310, 1320), a little bigger penetrating hole than cycle distance of the moving element (1400b) is formed along with moving direction of the moving element (1400b), a penetrating hole (1114) is formed in peripheral side of the casing (1110b).

Meanwhile, to guide the motion of the moving element more stably, a guiding rod (1433) that is projected from the opposite side of the projected part (1432) to outer side of radius direction is extended, at the end of the guiding rod (1433), a guiding frame (1600) that a guiding home (1601) is formed that the guiding rod (1433) is connected to be able to slide up and down.

As such, the EMFA (1100b) according to the seventh embodiment, as the extended part (1431) is projected in peripheral side of the casing (1110b), can be reduce the total size in vertical direction in comparison with the structure that the rod (1511) is projected to the end of the casing (1110a). And as it has a structure that the motion of the moving element (1400b) is guided by the guiding frame (1600), motion of the moving element (1400b) is performed well and stably.

The operation process and magnetic field distribution according to the seventh embodiment is omitted because it is the same as the ones of the sixth embodiment.

FIG. 32 shows the EMFA according to the seventh embodiment (1100b) that is applied to a vacuum circuit breaker, one of passive elements. The housing (2b) that constitutes the case of the actuation part (20z-2) of a vacuum circuit breaker is allocated adjacent to power side of the contacting part (10z), the EMFA (1100b) according to an aspect of the invention is installed inside of the housing (2b). The projected part (1432) of the extended part (1431) that is projected to peripheral side of the casing (1110b) of the EMFA (1100b) is connected to the end of the actuation rod (14z) of the movable contacting part (13z) of the circuit breaker by means of the connecting pin (1532).

Example 8

FIG. 33 to 36 shows another example that the EMFA according to the eight embodiment and base on the fifth embodiment can be connected to a passive element. FIG. 33 depicts a diagonal drawing from front side of the actuator, FIG. 34 depicts a diagonal drawing from rear side of the actuator, FIG. 35 depicts a cross-sectional diagonal drawing from front side of the actuator, and FIG. 36 depicts a cross-sectional diagonal drawing from rear side of the actuator according to the eighth embodiment of the invention.

As depicted in FIGS. 33 and 35, the EMFA (1100b) according to the embodiment is a form that the moving element (1400c) according to the actuator (1100) of the fifth embodiment is exposed outside.

The vertical cross-sectional constitution, as depicted in FIG. 35, is same as that of the fifth to seventh embodiment. That is, the casing (1110c) in the EMFA according to an aspect of the invention has a form that the path (1112c) which has a predetermined length in vertical direction at its left and right sides, and a middle wall inside of vertical cross-section is located in the middle, which forms whole outer figure of the actuator. On the outer and inner surface of vertical cross-section of the left and right paths (1112c), the outer main magnetic field generation element (1210c) and the inner main magnetic field generation element (1220c) are allocated. And on the outer or inner surface of longitudinal direction ends (vertical direction) of the outer main magnetic field generation element (1210c) and the inner main magnetic field generation element (1220c), respectively the outer subsidiary magnetic field generation element (1310c) and the inner subsidiary magnetic field generation element (1320c).

The moving element (1400c) is inserted inside paths (1112c) between the outer main/subsidiary magnetic field generation element (1210c/1310c) and the inner main/subsidiary magnetic field generation element (1220c/1320c) to be able to move linearly. The moving element (1400c), in the center of which the left and right side inner main magnetic field generation element (1220c) are located, forms in a body with the coil (1410c) that is wound inside of the paths (1112c) in the perpendicular direction of the outer main magnetic field generation element (1210c) and the inner main magnetic field generation element (1220c), and with the magnetic material (1420c) that is forced by magnetic field of the outer and inner subsidiary magnetic field generation element (1310c/1320c).

The EMFA (1100c) according to the embodiment of the invention is a depicted in FIG. 33 to 35. The path (1112c) of the casing (1110c) is penetrated in the front-rear direction of the casing (1110c), the middle wall (111c) is formed between two paths (1112c). Where the casing is depicted in hexagonal type, it doesn't matter forms when it can form the paths (1112c) and the coil (1410c) can be wound on it.

The outer/inner main magnetic field generation element (1210c, 1220c) and the outer/inner subsidiary magnetic field generation element (1310c, 1320c) are installed on the inner and outer surfaces in the left and right direction of the paths (1112c) penetrated in front-rear direction of the casing (1110c).

And the moving element (1400c) is formed to pass through the paths (1112c) between the outer/inner main magnetic field generation element (1210c, 1220c) and the outer/inner subsidiary magnetic field generation element (1310c, 1320c) in the form of enclosing and passing the peripheral of the inner subsidiary magnetic field generation element at the left and right sides.

Meanwhile, to guide the motion of the moving element more stably, a guiding axis (1434) is extended from the exposed part of the casing (1110c) of the moving element (1400c), the guide that guides up-down movement of the guiding axis (1434) can be installed. The guiding axis (1434) is inserted in the guiding home (1700) to be able to slide in the upper-lower direction.

The EMFA (1100c) according to the eight embodiment of the invention is constructed for the paths (1112c) to penetrate the casing (1110c) and for the moving element (1400c) to be exposed outside. Therefore, as the fifth embodiment, it has big holding force and is easy to connect wires to the coil (1410c) of the moving element (1400c) and manufacturing of it is easy. As a wire can be connected directly to the moving element (1400c), overstrain over the wire can be eliminated when the moving element (1400c) moves.

As the operation characteristics of the EMFA (1100c) are similar to that of the fifth to eighth embodiment, explanation of it is omitted.

FIG. 36 shows the EMFA according to the eighth embodiment (100c) that is applied to a vacuum circuit breaker, one of passive elements. The housing (2c) that constitutes the case of the actuation part (20z-3) of a vacuum circuit breaker is allocated adjacent to power side of the contacting part (10z), the EMFA (1100c) according to an aspect of the invention is installed inside of the housing (2c). The connecting frame (1440) is formed in one side of the moving element exposed outside of the EMFA (1100c), the projected part (1441) is formed in the connecting frame (1440) and it can be connected to the end of the actuation rod (14z) of the movable contacting part (13z) of the circuit breaker by means of the connecting pin (1523). Like this, as outer passive elements like a circuit breaker can be connected to outer exposed moving element, connection is easy and process is simple.

Example 9

FIG. 37 is a cross sectional drawing showing the EMFA according to the ninth embodiment of the invention.

The EMFA (1100d) depicted in FIG. 37 is different from the EMFAs according to the fifth to eighth embodiments in additional constitution of magnetic gap (g1), others are same. The same references are served for the same parts with the fifth embodiment (FIGS. 24, 26, 27).

As depicted in FIG. 37, the EMFA (1100d) according to the ninth embodiment further includes a magnetic gap (g1) that separates upside and downside magnetically the casing (1110) between the outer/inner main magnetic field generation element (1210c, 1220c) and the outer/inner subsidiary magnetic field generation element (1310c, 1320c). By separating the magnetic field from the main magnetic field generation element (1210c, 1220c) and the magnetic field form the subsidiary magnetic field generation element (1310c, 1320c), the magnetic gap (g1) maximizes holding force by eliminating magnetic loss by the outer/inner subsidiary magnetic field generation element (1310c, 1320c).

The magnetic gap (g1) can be constructed as a simple space, or as depicted in FIG. 37, as a gap sustaining material (1120) of nonmagnetic material inside of the magnetic gap (g1).

A simulation outcome for magnetic field distribution according to the ninth embodiment is displayed in FIGS. 38 and 39. By comparing FIG. 38 with FIG. 25 and FIG. 39 with FIG. 26, the effect of the magnetic gap (g1) can be figured out.

That is, as depicted in FIG. 38, current supplied to the coil (1410) is shut off when the moving element (1400) has moved maximally, the moving force by the coil (1410) and the outer/inner main magnetic field generation element (1210, 1220) has disappeared and the force by magnetic field (m1) of the outer/inner main magnetic field generation element (1210, 1220) forces the magnetic material (1420) of the moving element (1400) and works as holding force that holds the magnetic material (1420). In this embodiment, a magnetic gap (g1) is constructed between the outer/inner main magnetic field generation element (1210, 1220) and the outer/inner subsidiary magnetic field generation element (1310, 1320). By this, magnetic flux (m1) that forms magnetic field of the main magnetic field generation element (1210, 1220) is screened by the magnetic gap (g1), cannot influence upside of the magnetic gap (g1), and influences the moving element (1400) mostly. Therefore, as the magnetic field of the main magnetic field generation element (1210, 1220) is used as force pulling the magnetic material (1420) of the moving element (1400) without loss, holding force is maximized.

And, as depicted in FIG. 39, current supplied to the coil (1410) is shut off when the moving element (1400) has moved maximally, the moving force by the coil (1410) and the outer/inner main magnetic field generation element (1210, 1220) has disappeared and the force by magnetic field (m2, m3) of the outer/inner subsidiary magnetic field generation element (1310, 1320) forces the magnetic material (1420) of the moving element (1400) and works as holding force that holds the magnetic material (1420). In this embodiment, a magnetic gap (g1) is constructed between the outer/inner main magnetic field generation element (1210, 1220) and the outer/inner subsidiary magnetic field generation element (1310, 1320). By this, magnetic flux (m1) that forms magnetic field of the main magnetic field generation element (1210, 1220) is screened by the magnetic gap (g1), cannot influence lower side of the magnetic gap (g1), and forms upper side of the magnetic gap (g1) mostly. Therefore, as the magnetic field of the main magnetic field generation element (1210, 1220) is used as force pulling the magnetic material (1420) of the moving element (1400) without loss, holding force is maximized. And, as magnetic paths of magnetic field (m2, m3) are much shorter than those in FIG. 26, holding force can be maximized.

Example 10

FIG. 40 is a cross sectional drawing that shows the EMFA (1100e) according to the $10^{th}$ embodiment. Same references are applied to the same parts of the $8^{th}$ embodiment.

The EMFA shows that, in EMFA according to the $8^{th}$ embodiment, the outer main magnetic field generation element (1210) and the outer subsidiary magnetic field generation element (1310) are installed, and the inner main magnetic field generation element (1220) and the inner subsidiary magnetic field generation element (1320) are not installed.

That is, as the magnetic force of the outer main magnetic field generation element (1210) influences the middle wall of the casing (1110), there is no problem with reciprocating motion of the moving element (1400). Still, assuming that the size of an actuator is same, as the electromagnetic force having the coil (1420) move is smaller than that along with the inner main magnetic field generation element (1220), the actuation speed and force have reduced as much. And so is holding force.

Meanwhile, while the EMFA (1100e) according to $10^{th}$ embodiment includes the magnetic gap (g1), it can be included (like the $9^{th}$ embodiment), or not included like the $5^{th}$ to $8^{th}$ embodiments.

Example 11

FIG. 41 is a cross sectional drawing that shows the EMFA (1100f) according to the $11^{th}$ embodiment. Same references are applied for the same parts with the $8^{th}$ embodiment.

The EMFA shows that, in EMFA according to the $8^{th}$ embodiment, the inner main magnetic field generation element (1210) and the inner subsidiary magnetic field generation element (1310) are installed, and the outer main magnetic field generation element (1220) and the outer subsidiary magnetic field generation element (1320) are not installed.

That is, as the magnetic force of the inner main magnetic field generation element (1210) influences the middle wall of the casing (1110), there is no problem with reciprocating motion of the moving element (1400). Still, assuming that the size of an actuator is same, as the electromagnetic force having the coil (1420) move is smaller than that along with the outer main magnetic field generation element (1220), the actuation speed and force have reduced as much. And so is holding force.

Meanwhile, while the EMFA (1100*f*) according to 11$^{th}$ embodiment includes the magnetic gap (g1), it can be included (like the 9$^{th}$ embodiment), or not included like the 5$^{th}$ to 8$^{th}$ embodiments.

Example 12

FIG. 42 is a cross sectional drawing that shows the EMFA according to the 12$^{th}$ embodiment.

The EMFA (1100*g*) in the invention shows an embodiment desirable to increase holding force when the moving element has moved at lower side. FIG. 42 is depicted based on the actuator (1100*d*) depicted in FIG. 37 according to the 9$^{th}$ embodiment. Same references are applied to the same parts in FIG. 37 and repeated explanation is omitted. And the 12$^{th}$ embodiment of the invention is a variation of the 5$^{th}$ to 8$^{th}$ embodiments.

The EMFA (1100*d*) according to the 9$^{th}$ embodiment in FIG. 37 and the EMFA (1100) in FIG. 24, as holding force is necessary toward upper direction on the drawing, just include the outer/inner subsidiary magnetic field generation element (1310, 1320) and the magnetic material (1420) in the upper side.

Whereas, in the EMFA according to the 12$^{th}$ embodiment, as holding force is necessary in upward and downward direction on the drawing, the second outer/inner subsidiary magnetic field generation element (1330, 1340) are installed behind the outer/inner main magnetic field generation element (1210, 1220), and the second magnetic material (1440) is equipped at the lower end of the magnetic material (1420).

Therefore, when the moving element has moved downward maximally, as the magnetic force from the second outer/inner subsidiary magnetic field generation element (1330, 1340) influences the second magnetic material (1440) of the moving element (1400), the holding force that holds the second magnetic material (1440) is bigger.

Though not depicted in FIG. 42, the facing polarities of the second outer/inner subsidiary magnetic field generation element (1330, 1340) are same like those of the outer/inner subsidiary magnetic field generation element (1310, 1320).

Meanwhile, in FIG. 42, the size (the length of vertical direction) of the second outer/inner subsidiary magnetic field generation element (1330, 1340) is smaller than those of the outer/inner subsidiary magnetic field generation element (1310, 1320). It is suitable for a situation that the holding force required when the moving element (1400) has moved toward upside is bigger than the force required when downward.

Like this, the sizes of the outer/inner subsidiary magnetic field generation element (1310, 1320) and the second outer/inner subsidiary magnetic field generation element (1330, 1340) the outer/inner subsidiary magnetic field generation element (1310, 1320) can be discriminated according to holding force required to passive elements like a circuit breaker. For example, when the moving element (1400) has moved upside is a closing circuit state, then as the movable contacting part should be pressed a lot to the fixed contacting part, it needs bigger force than a open circuit state of a circuit breaker, when the moving element (1400) has moved downside. In the situation, the sizes of the outer/inner subsidiary magnetic field generation element (1310, 1320) located at upside are bigger than that of the second outer/inner subsidiary magnetic field generation element (1330, 1340) at downside.

Example 13

FIGS. 43 and 44 shows the EMFA (1100*h*) according to the 13$^{th}$ embodiment, FIG. 43 is a cross sectional drawing, and FIG. 44 is a brief cross sectional drawing showing magnetic field distribution.

The EMFA according to the 13$^{th}$ embodiment is an example for increasing holding force when the moving element has moved downside, shows a different embodiment form the actuator (1100*g*) according to the 12$^{th}$ embodiment.

Whereas above the 12$^{th}$ embodiment includes the second outer/inner subsidiary magnetic field generation element (1330, 1340) at the lower end of the outer/inner main magnetic field generation element (1210, 1220), and includes the second magnetic material (1440) at the downside of the coil (1410) of the moving element (1400), this embodiment includes the second magnetic gap (g2), which is constructed by eliminating a certain length in vertical direction of the casing at the lower end of the outer/inner main magnetic field generation element (1210, 1220).

As the second magnetic gap (g2) makes magnetic path between the outer/inner main magnetic field generation element (1210, 1220) and the casing (1110) be longer, the magnetic field by the outer/inner main magnetic field generation element (1210, 1220) influences the magnetic material (1420) much more.

In FIG. 44, magnetic field distribution when the moving element (1400) has moved maximally is depicted. This will be explained in comparison with FIG. 38.

In FIG. 38, when the moving element (1400) has moved maximally downside, magnetic flux (m1) flows concentrated in downside of the outer/inner main magnetic field generation element (1210, 1220) two sides of which are enclosed by the casing (1110).

Like this, that magnetic field (m1) is concentrated on the downside of the outer/inner main magnetic field generation element (1210, 1220) is, as two sides of the outer/inner main magnetic field generation element (1210, 1220) are enclosed by the casing (1110) and the casing (1110) is a good magnetic field path, because, in the part, resistance for flowing of the magnetic field (m1) is small and the length of the path is short.

Compared to this, as depicted in FIG. 44 according to the 13$^{th}$ embodiment, when the second magnetic gap (g2) is formed by eliminating a certain length of the casing (1110) in the vertical direction, as the second magnetic gap (g2) cut off the magnetic flux (m1), the path of magnetic flux (m1), which is formed at the lower end of the outer/inner main magnetic field generation element (1210, 1220) is longer. As the length of magnetic path is longer, resistance of magnetic flux (m1) is bigger, the magnetic flux (m1) doesn't go around far and seeks near route. So, some part of the magnetic flux that flows at the lower end of the outer/inner main magnetic field generation element (1210, 1220) when the second magnetic gap (g2) is absented, change its route and flows the magnetic material (1420). Therefore the magnetic force that influences the magnetic material (1420) gets more, the holding force to have the magnetic material (1420) move downward gets bigger.

Until now, though concrete embodiments depicted in attached figures are explained in detail, they are just examples of preferred embodiments; and don't confine the protected area of the invention. The embodiments can be performed in various variations and equivalent embodiments by a person with ordinary knowledge in the art, and the variation and equivalent other embodiments are within the scope of claims attached in the invention.

Furthermore, in attached figures in the invention, though a circuit breaker (a passive element) is explained with example of a gas circuit breaker or a vacuum circuit breaker of puffer extinction type, the invention can be applied to not only the circuit breaker listed above, but any other passive element such as an oil circuit breaker or other operation apparatus, and it can be applied to from a low voltage circuit breaker to a high voltage circuit breaker all.

As explained above, as the EMFA using electromagnetic force according to an aspect of the invention has the moving element operated by the magnetic field of magnetic field generation element and electromagnetic repulsion by current density of a coil, though with small size and weight, is an actuator having big actuation force and high speed.

Especially, as, in the EMFA using electromagnetic force according to an aspect of the invention, the one side of the moving element is exposed outside, wiring to feed current from outside to the coil is easy and fabrication is also easy. In addition, as the wire is connected directly from outside, there is little problem like overstrain of the wire due to the movement of the moving element.

And, as the moving element can be connected directly to a circuit breaker, height or size of an actuator can be reduced. As making a body by connecting exposed moving elements, the embodiment of merging several actuators can be implemented easily.

And, as it has a structure of guiding the movement of the moving element by a guide, the motion of the moving element becomes stable, loss of driving is reduced, and quality and reliability has improved.

And, the actuator according to an aspect of the invention can work bigger holding force continuously when the moving element has moved. Therefore, as the invention has merits of the EMFA using electromagnetic force, which performs operation with big force and high speed, and can add big holding force, it can be usefully applied to various passive elements including a circuit breaker requiring big holding force.

The invention claimed is:

1. An actuator using electromagnetic force, the actuator comprising:
    a casing that forms two paths having a certain length in longitudinal direction, and forms a middle wall by the two paths;
    a main magnetic field generation element that is allocated on both faces of the middle wall of the two paths of the casing; and
    a moving element having a coil which is wound in the orthogonal direction to longitudinal direction of the paths and is in a body that its left and right sides passes through the paths and its front and back side are exposed to outside, the moving element moving upward along the longitudinal direction of the paths when forward direction current is provided in a coil, and the moving element moving downward along the longitudinal direction of the paths when backward direction current is provided in the coil; and
    an outer subsidiary magnetic field generation element and an inner subsidiary magnetic field generation element disposed at an upper end or a lower end of the main magnetic field generation element, a position of the moving element being maintainable by magnetic forces of the outer subsidiary magnetic field generation element and the inner subsidiary magnetic field generation element even though supply of current for the coil is cut off.

2. The actuator of claim 1, wherein the casing is composed of an iron core.

3. The actuator of claim 1, wherein the main magnetic field generation element is composed of a permanent magnet.

4. An actuator using electromagnetic force, the actuator comprising:
    a casing that forms two paths having a certain length in longitudinal direction, and forms a middle wall by the two paths;
    a planar shaped outer main magnetic field generation element and inner main magnetic field generation element that are allocated respectively on both of the middle wall-surfaces of the two paths of the casing; and
    a moving element having a coil which is wound in the orthogonal direction to longitudinal direction of the paths and is in a body that its left and right sides passes through the paths and its front and back side are exposed to outside, the moving element moving upward along the longitudinal direction of the paths when forward direction current is provided in a coil, and the moving element moving downward along the longitudinal direction of the paths when backward direction current is provided in the coil;
    an outer subsidiary magnetic field generation element disposed at an upper end or a lower end of the outer main magnetic field generation element; and
    an inner subsidiary magnetic field generation element disposed at an upper end or a lower end of the inner main magnetic field generation element,
    wherein a position of the moving element can be maintained by magnetic forces of the outer subsidiary magnetic field generation element and the inner subsidiary magnetic field generation element even though supply of current for the coil is cut off.

5. The actuator of claim 4, wherein the casing is composed of an iron core.

6. The actuator of claim 4, wherein the main magnetic field generation element is composed of a permanent magnet.

7. The actuator of claim 4, wherein the outer subsidiary magnetic field generation element comprises a first outer subsidiary magnetic field generation element and a second outer subsidiary magnetic field generation element, and the inner subsidiary magnetic field generation element comprises a first inner subsidiary magnetic field generation element and a second inner subsidiary magnetic field generation element.

8. The actuator of claim 7, wherein the polar direction of the first inner and outer side subsidiary magnetic field generation element and the second inner and outer side subsidiary magnetic field generation element are opposite to the polar directions of the outer and inner main magnetic field generation element respectively.

9. The actuator of claim 7, wherein a first magnetic material and a second magnetic material are disposed at an upper end and a lower end of the coil, and the coil, the first magnetic material and the second magnetic material form a body.

10. The actuator of claim 9, wherein the one-bodied moving element can be performed by means that the coil and the first and second magnetic materials are inserted inside the housing of non-magnetic material.

11. The actuator of claim 4, wherein at the exposed part to outside of the casing of the moving element, a guiding axis that is formed extendedly, wherein at the adjacent location of the casing, the guide axis of the moving element is coupled to be able to slide in and a guide that guides upward and downward movement of the moving element is formed.

12. The actuator of claim 4, wherein a first absorbing material and a second absorbing material are located on an upper end and a lower end of the paths to prevent the moving element from hitting the casing.

13. The actuator of claim 4, wherein in the one outer side of the actuator, a cable bay is installed to allocate wire for providing current for the coil of the moving element moving back and forth movement in the upper and power direction.

14. The actuator of claim 4, wherein the actuator is composed of combined form with many units, and each moving part of the actuator combined are connected in a body and can move upward and downward like a body.

15. An actuator using electromagnetic force, the actuator comprising:
- a casing forming two paths having a certain length in longitudinal direction, and forms a middle wall by the two paths;
- an outer main magnetic field generation element and inner main magnetic generation element allocated on outer and inner wall surface of the left and right paths of the casing;
- an outer subsidiary magnetic field generation element and an inner subsidiary magnetic field generation element formed respectively in outer and inner wall surface of the outer main magnetic field generation element and inner main magnetic generation element, adjacent to the end corresponding to the direction that needs more holding force than when connected to a passive element to be driven; and
- a moving element having a coil which is wound in the orthogonal direction to longitudinal direction of the paths and is in a body that its left and right sides passes through the paths and its front and back side are exposed to outside, the moving element moving upward along the longitudinal direction of the paths when forward direction current is provided in a coil, and the moving element moving downward along the longitudinal direction of the paths when backward direction current is provided in the coil,
- wherein the polarity of the outer main magnetic generation element and inner element is opposite of facing side between the paths, the polarity of the outer subsidiary magnetic generation element and inner subsidiary element is same of facing side between the paths, when a magnetic material of the moving element is situated between the outer subsidiary magnetic generation element and inner subsidiary element, inside and outside with reference to the middle of left-right direction of cross-sectional surface of the magnetic material, the magnetic flux forming an independent magnetic field flows perpendicular to the middle part of left and right direction on the cross sectional surface of the magnetic material.

16. The actuator according to claim 15, wherein the casing is composed of an iron core.

17. The actuator according to claim 15, wherein the main magnetic field generation element is composed of a permanent magnet.

18. The actuator according to claim 15, wherein the middle wall is formed in a cylinder at the inner center of the casing; the path is formed in a ring having co-center with the middle wall of cylinder form,
- wherein the outer main magnetic generation element and inner main magnetic generation element, which are ring type having a same center with the middle wall of cylinder form and the ring-type path, are located on inner path surface and outer path surface of ring type, and
- wherein the moving element forms a ring type, which coil are wound in the perpendicular direction to the longitudinal direction of the inner path of the ring type between the inner main magnetic field generation element of ring type, and which magnetic material forms a ring type facing the coil, the ring type coil and ring type magnetic material are enclosed by non-magnetic material housing and forms a ring type on the whole.

19. The actuator of claim 18, wherein the several non-magnetic rods is connected to the end of the longitudinal direction of the moving element, the non-magnetic rod passes through the casing from inside of it, and are exposed outside; the outside passive element is connected to the end of the exposed rod.

20. The actuator of claim 18, wherein an extension part is equipped which is extended from one side of circle of the moving part to outer side of radius direction, penetrates the surface of the casing, and is exposed to the outside, and the passive element is connected to the extension part.

21. The actuator of claim 15, wherein the two paths of the casing, penetrates the casing in the front-back direction, between the two paths, a middle wall is formed,
- wherein the outer, inner main magnetic field generation element and the outer, inner subsidiary magnetic field generation element are allocated on inner, outer surface in the left and right direction of the paths penetrating the casing in the front-back direction,
- wherein the moving element pass through the paths between the outer main/subsidiary magnetic field generation element and the inner main/subsidiary magnetic field generation element in the form of enclosing the left and right side of inner main magnetic field generation element, and its front and rear sides are exposed to the outside of the casing, and
- wherein the passive element is able to be connected to the exposed part of the moving element.

22. The actuator according to claim 15, wherein for providing big holding force for the opposite side of the outer subsidiary magnetic field generation element, at the opposite side of the outer subsidiary magnetic field generation element in the end of longitudinal direction of the outer main magnetic field generation element, the second outer subsidiary magnetic field generation element is further allocated,
- wherein at the moving element, in the opposite side of the magnetic field material, the second magnetic material facing the second outer subsidiary magnetic field generation element can be further allocated.

23. The actuator of claim 15, wherein for providing big holding force for the opposite side of the inner subsidiary magnetic field generation element, at the opposite side of the inner subsidiary magnetic field generation element in the end of longitudinal direction of the inner main magnetic field generation element, the second inner subsidiary magnetic field generation element is further allocated, and
- wherein at the moving element, in the opposite side of the magnetic field material, the second magnetic material facing the second inner subsidiary magnetic field generation element can be allocated in addition.

24. The actuator of claim 15, wherein between the outer, inner main magnetic field generation element and the outer, inner subsidiary magnetic field generation element, by separating the casing magnetically the upper side from the lower side, a magnetic field gap isolating the magnetic field by the outer, inner main magnetic field generation element from the magnetic field by the outer, inner subsidiary magnetic field generation element is inserted.

25. The actuator of claim 24, wherein in the magnetic field gap, a nonmagnetic gap holding material is inserted.

26. The actuator of claim 24, wherein at the opposite end side of the side of the outer, inner main magnetic field generation element and the outer, inner subsidiary magnetic field generation element, the second magnetic gap is formed additionally by eliminating some length of the casing in the upper and lower direction.

27. The actuator of claim 15, wherein at the opposite end side of the side of the outer, inner main magnetic field generation element and the outer, inner subsidiary magnetic field generation element, the second magnetic gap is formed additionally by eliminating some length of the casing in the upper and lower direction.

28. The actuator of claim 15, wherein in the outer, inner main magnetic field generation element and the outer, inner subsidiary magnetic field generation element, only one side is equipped from the outer side and the inner side.

29. A circuit breaker, comprising:
   an actuator comprising:
      a casing that forms two paths having a certain length in longitudinal direction, and forms a middle wall by the two paths;
      a main magnetic field generation element that is allocated on both faces of the middle wall of the two paths of the casing; and
      a moving element having a coil which is wound in the orthogonal direction to longitudinal direction of the paths and is in a body that its left and right sides passes through the paths and its front and back side are exposed to outside, the moving element moving upward along the longitudinal direction of the paths when forward direction current is provided in a coil, and the moving element moving downward along the longitudinal direction of the paths when backward direction current is provided in the coil; and
   an outer subsidiary magnetic field generation element and an inner subsidiary magnetic field generation element disposed at an upper end or a lower end of the main magnetic field generation element, a position of the moving element being maintainable by magnetic forces of the outer subsidiary magnetic field generation element and the inner subsidiary magnetic field generation element even though supply of current for the coil is cut off; and
   an insulation actuation rod for actuating its breaking part connected to the moving element of the actuator, wherein a reciprocating motion causes a closed circuit position or an opening circuit position.

* * * * *